United States Patent [19]

Kosaka et al.

[11] Patent Number: 5,216,459
[45] Date of Patent: Jun. 1, 1993

[54] OPERATION CONTROL DEVICE FOR A CAMERA

[75] Inventors: Toru Kosaka, Zama; Tatsuo Amanuma, Tokyo; Yoshiaki Ohtsubo, Yokohama; Akira Katayama, Koganei; Jun Nagai, Chigasaki; Hiroshi Wakabayashi; Hideya Inoue, both of Yokohama; Naoki Watanabe, Kawasaki, all of Japan

[73] Assignee: Nikon Corporation, Tokyo, Japan

[21] Appl. No.: 653,475

[22] Filed: Feb. 11, 1991

Related U.S. Application Data

[63] Continuation of Ser. No. 333,009, Apr. 4, 1989, abandoned, which is a continuation-in-part of Ser. No. 307,264, Feb. 7, 1989, abandoned.

[30] Foreign Application Priority Data

| Feb. 10, 1988 | [JP] | Japan | 63-30588 |
| Apr. 7, 1988 | [JP] | Japan | 63-46951[U] |
| Apr. 12, 1988 | [JP] | Japan | 63-90957 |
| Apr. 15, 1988 | [JP] | Japan | 63-93091 |
| Apr. 25, 1988 | [JP] | Japan | 63-103634 |
| Jun. 7, 1988 | [JP] | Japan | 63-76073[U] |
| Jul. 1, 1988 | [JP] | Japan | 63-88191[U] |
| Jul. 4, 1988 | [JP] | Japan | 63-88623[U] |
| Sep. 5, 1988 | [JP] | Japan | 63-116628[U] |
| Sep. 6, 1988 | [JP] | Japan | 63-223253 |
| Sep. 7, 1988 | [JP] | Japan | 63-225155 |
| Sep. 7, 1988 | [JP] | Japan | 63-225156 |

[51] Int. Cl.$^5$ .................................................. G03B 13/36
[52] U.S. Cl. ............................................................. 354/400
[58] Field of Search ............................... 354/400, 402

[56] References Cited

U.S. PATENT DOCUMENTS

| 4,212,523 | 7/1980 | Yamada et al. | 354/400 |
| 4,669,849 | 6/1987 | Ohtsuka et al. | 354/400 |
| 4,841,324 | 6/1989 | Ogasawara | 354/402 |

Primary Examiner—W. B. Perkey
Attorney, Agent, or Firm—Shapiro and Shapiro

[57] ABSTRACT

An automatic-focus camera has a focus lock system that stores focus adjusting information so that a photo-taking lens may be kept focused on an object during one or more exposures. The camera has a self timer, an automatic exposure system with different program modes, and has continuous as well as single-frame operating modes. The focus lock system, which has different focus lock modes, influences the manner in which various operations of the camera are performed.

8 Claims, 44 Drawing Sheets

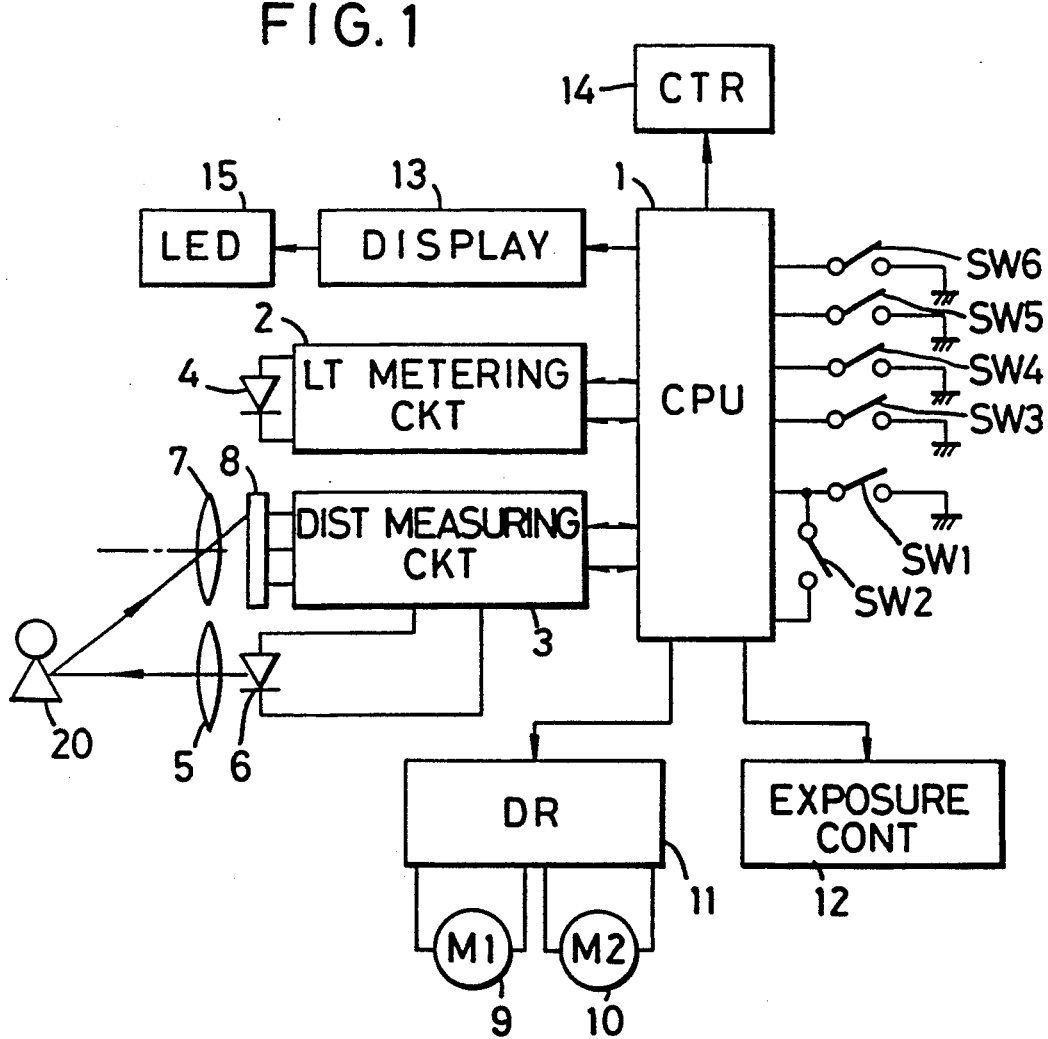

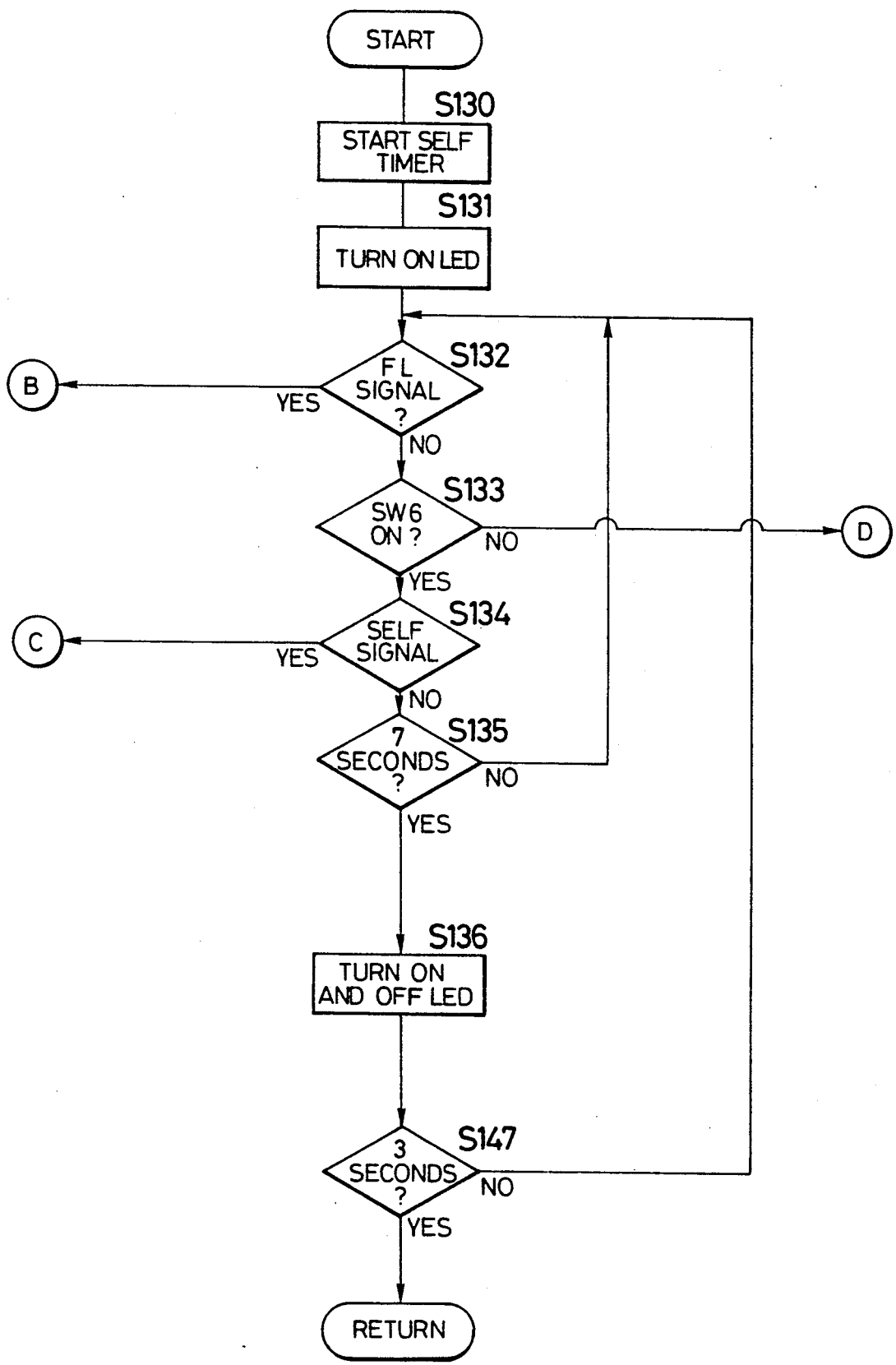

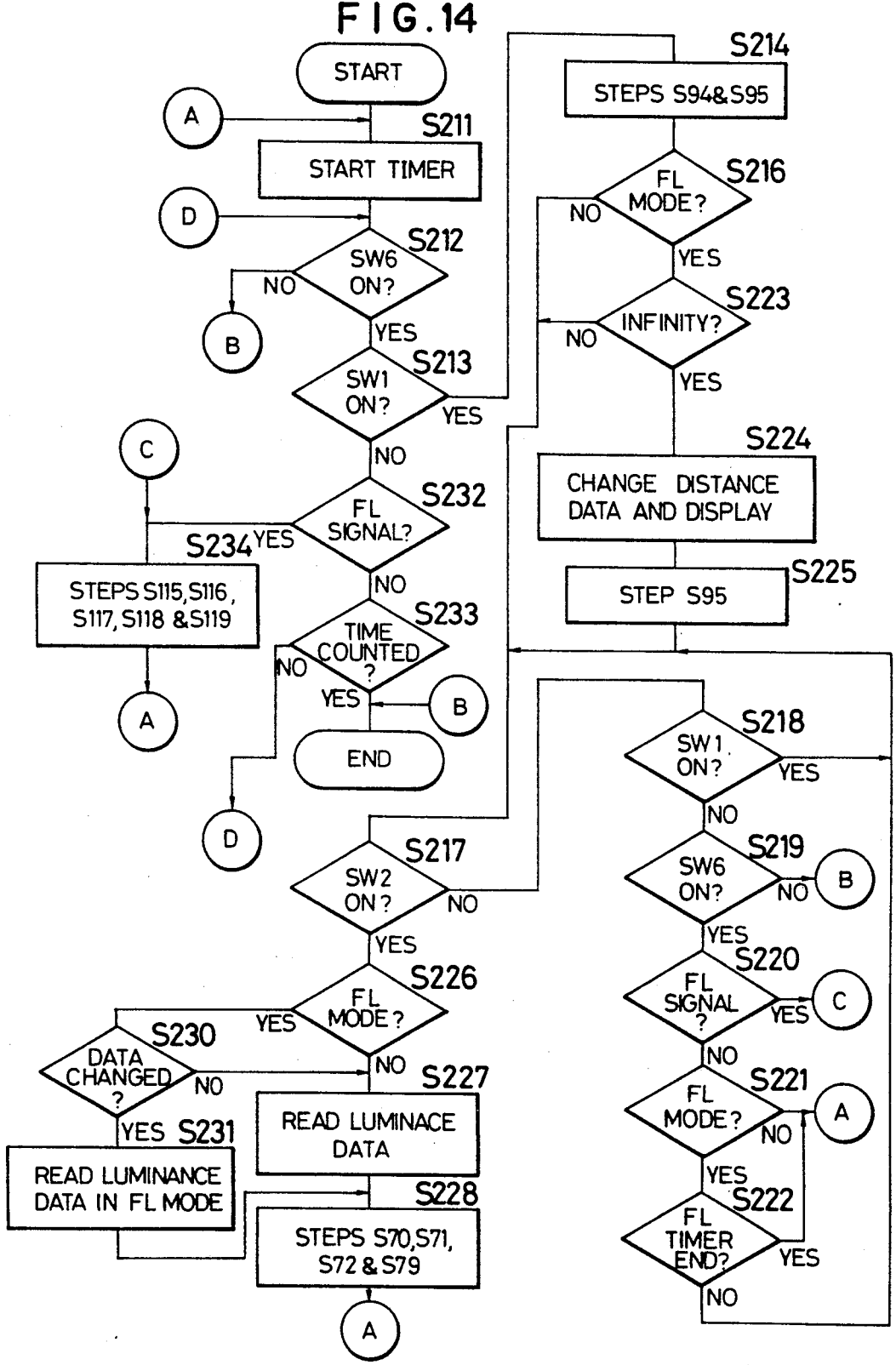

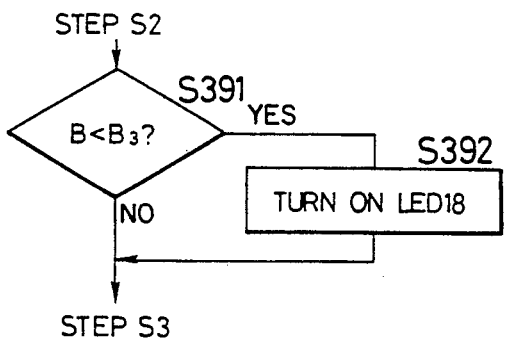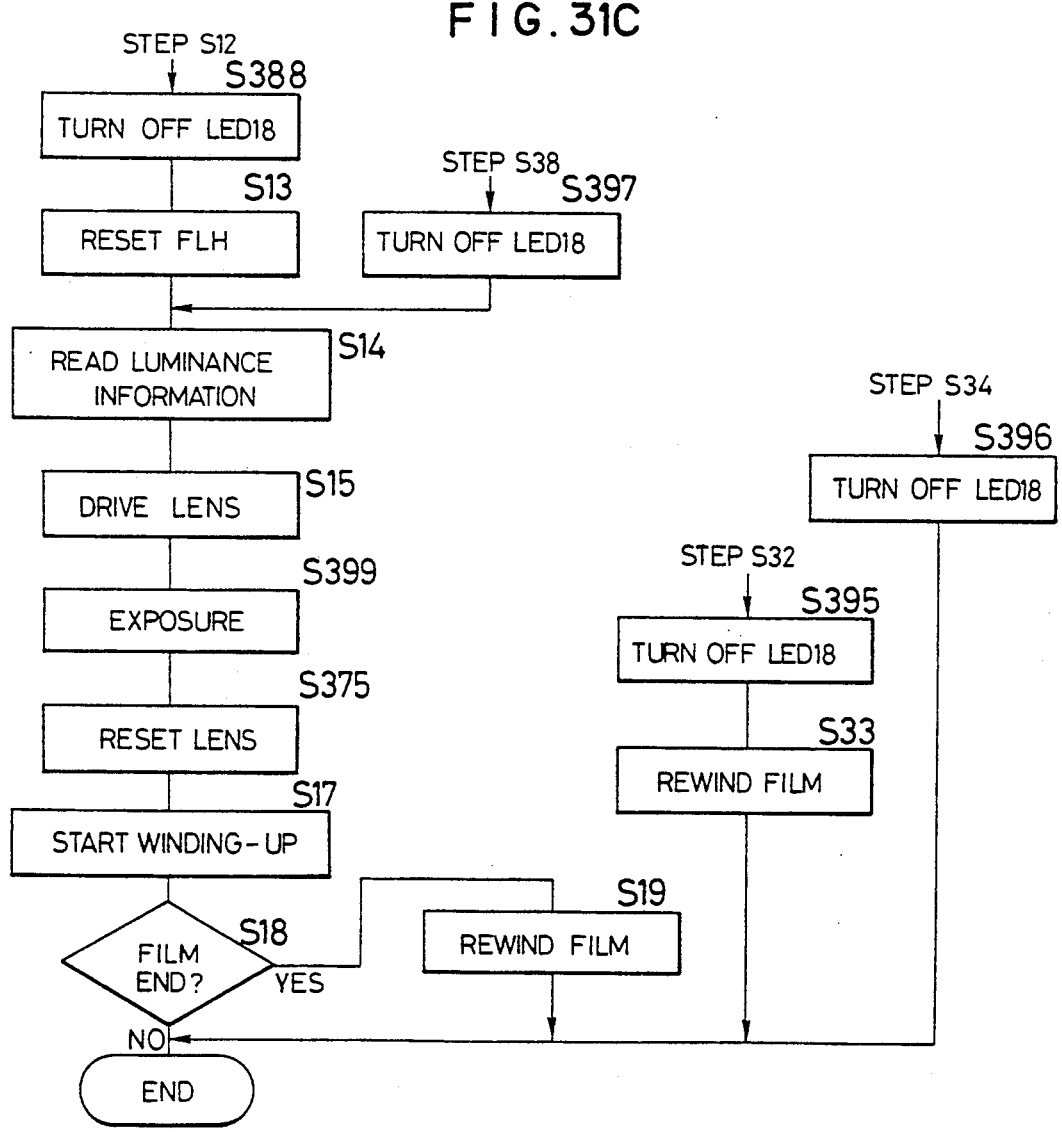

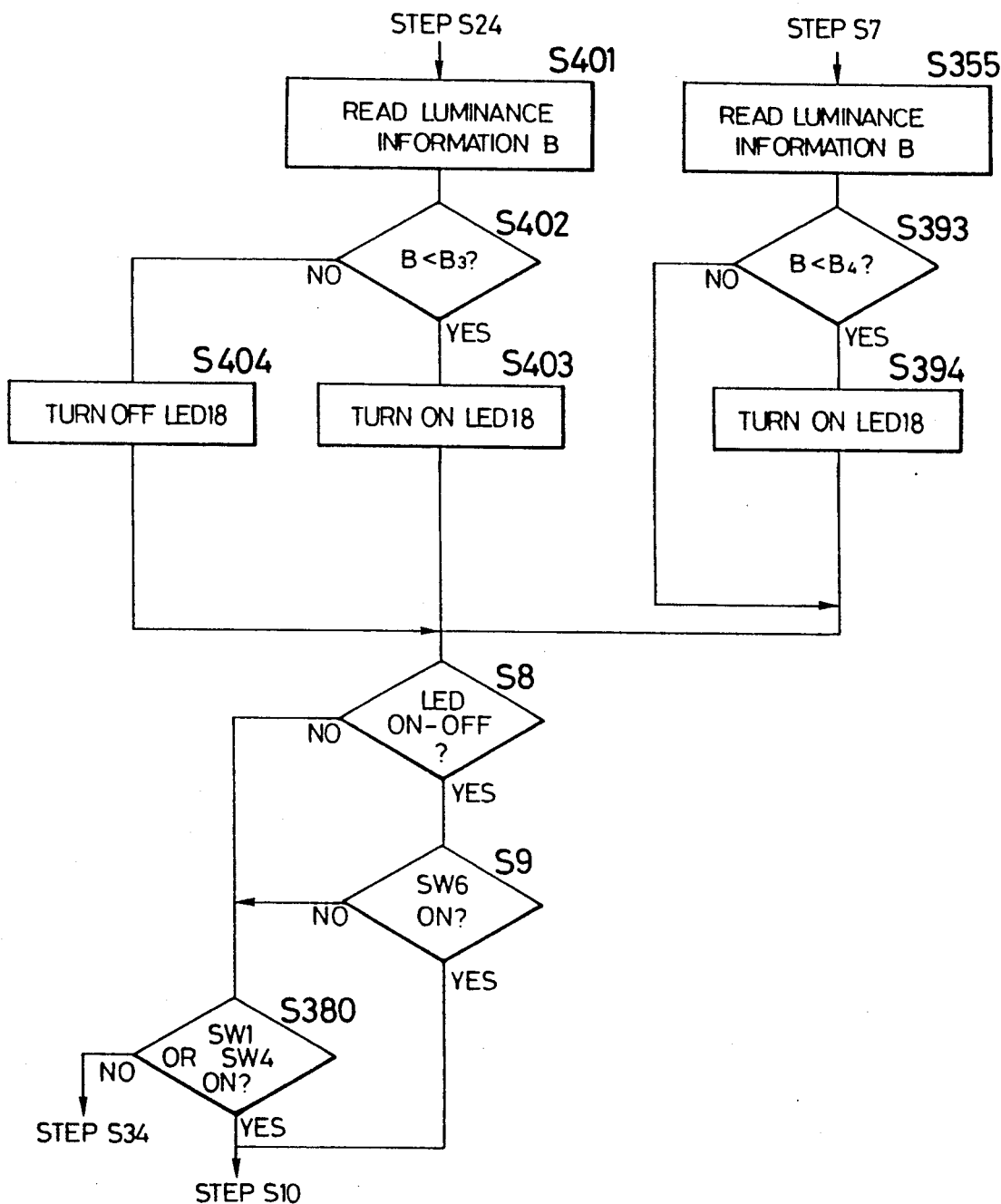

OPERATION CONTROL DEVICE FOR A CAMERA

This is a continuation of application Ser. No. 333,009 filed Apr. 4, 1989, which is a continuation-in-part of application Ser. No. 307,264 filed Feb. 7, 1989, both of which are now abandoned.

BACKGROUND OF THE INVENTION

1. Field of the Invention

This invention relates to an operation control device for a camera which is capable of accomplishing focus lock photography.

2. Related Background

There is known a camera which is capable of accomplishing so-called focus lock photography in which distance information is memorized, for example, along with the half depressing operation of a release button and even if framing is changed thereafter, when the release button is fully depressed, a photo-taking lens is driven to the focusing position on the basis of the memorized distance information and shutter release is effected.

There is also known a camera in which in response to the half depressing operation of a release button, a photo-taking lens is driven to the focusing position on the basis of the then distance information and is fixed at that position and shutter release is effected along with the full depressing operation of the release button. The distance information is information indicative of the distance to an object, but there is also known a camera in which a photo-taking lens is driven to the focusing position on the basis of focus adjustment information indicative of the amount and direction of deviation between the imaging plane of an object image and the predetermined imaging plane and which effects such focus lock.

However, in such prior-art cameras, focus lock is released upon release of the half depressing operation and therefore, when one requests a third person to photograph, one cannot hand the camera over to the third person while holding the state of the focus lock. Accordingly, if the third person requested to photograph does not know focus lock photography, the photo-taking lens will not be in focus to the main object and an undesired photograph will be taken when the main object is not positioned within an auto focus frame in a viewfinder.

SUMMARY OF THE INVENTION

It is an object of the present invention to provide an operation control device for a camera which will ensure a photograph reliably in focus to a desired object to be taken even when one requests a third person to photograph.

The operation control device for a camera according to the present invention is provided with focus adjustment information detecting means for detecting focus adjustment information for making a photo-taking lens in focus to an object, focus lock means for operating said focus adjustment information detecting means by a half depression signal output when a release operating member is half-depressed and effecting focus lock on the basis of the focus adjustment information, a focus lock hold operating member operated to hold the state of the focus lock, and focus lock holding means for holding the state of the focus lock by the operation of said focus lock hold operating member still after the half depressing operation of the release operating member is released, and said focus lock holding means is designed so as not to receive the half depression signal resulting from a half depressing operation thereafter, during the operation thereof.

When the focus lock hold operating member is operated, the focus lock holding means holds the state of the focus lock still after the half-depressed state of the release operating member is released, and even if at this time, the release operating member is half-depressed and the half depression signal is output, this signal is not received and for example, the focus adjustment information detecting means does not operate. Accordingly, when one requests a third person to photograph, one may hold the state of the focus in advance so as to make the photo-taking lens in focus to a desired object and then hand the camera over to the third person, thereby obtaining a photograph which is in focus to the desired object.

BRIEF DESCRIPTION OF THE DRAWINGS

FIG. 1 is a block diagram showing an embodiment of the operation control device for a camera according to the present invention.

FIGS. 9A, 9B and 10 are flow charts showing the operation of the second embodiment of the present invention.

FIG. 14 is a flow chart showing the operation of a fourth embodiment of the present invention.

FIGS. 31A, 31B and 31C are flow charts showing the operation of a modification of the eighth embodiment.

DESCRIPTION OF THE PREFERRED EMBODIMENTS

Figure 2A:
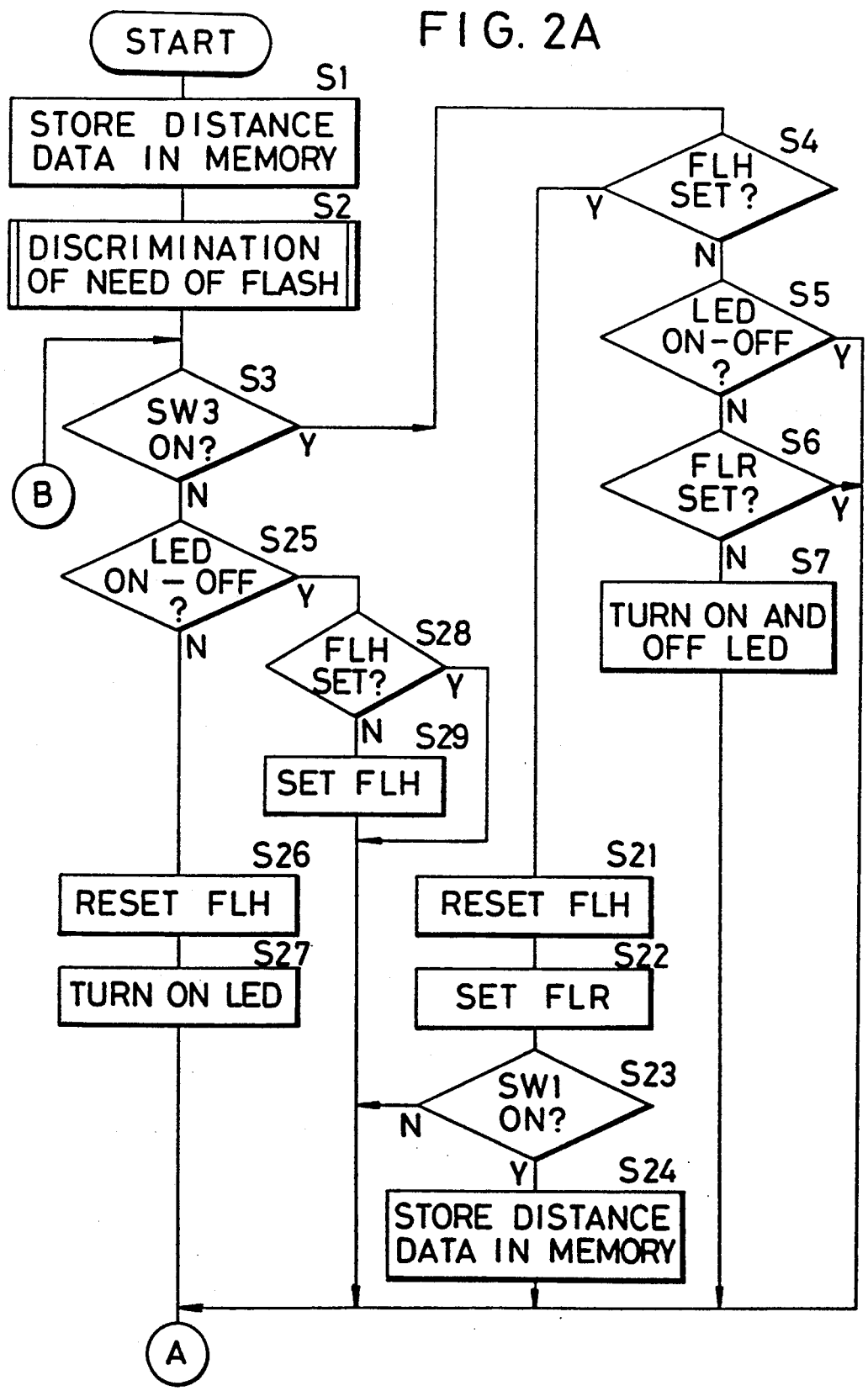
FIGS. 2A and 2B are flow charts showing the procedure of the processing.

An embodiment of the present invention will hereinafter be described with reference to FIGS. 1 and 2.

Referring to FIG. 1, a light metering circuit 2 and a distance measuring circuit 3 are connected to CPU 1. A light receiving element 4 for receiving the light from an object is connected to the light metering circuit 2, and luminance information regarding the luminance of the object is calculated on the basis of the detection signal of the light receiving element 4 and is input to the CPU 1. A projector 6 emitting light toward the object through a projection lens 5 and a light receiving element 8 receiving reflected light from the object through a light receiving lens 7 are connected to the distance measuring circuit 3, and distance information conforming to the distance to the object is calculated by the detection signal of the light receiving element 8 and is input to the CPU 1.

Also connected to the CPU 1 are a motor 9 for effecting the focusing of a photo-taking lens, a motor drive circuit 11 for a motor 10 for effecting the winding up and rewinding of a film, an exposure control circuit 12 and switches SW1 and SW2 adapted to be closed in response to the depressing operation of a release button, not shown. The switch SW1 is closed by the half depressed state of the release button, and the switch SW2 is closed by the fully depressed state of the release button.

The CPU 1 operates the light metering circuit 2 and the distance measuring circuit 3 by the closing of the switch SW1, and stores the distance information from the distance measuring circuit 3 into a memory area. That is, it effects focus lock. Then, by the closing of the switch SW2, the CPU 1 calculates the amount of movement of the photo-taking lens on the basis of the stored distance information, drives the focusing motor 9 through the motor drive circuit 11 and moves the photo-taking lens by the calculated amount of movement, thereby accomplishing focusing. Thereafter, it drives exposure control members such as a stop and a shutter through the exposure control circuit 12 to thereby effect photographing and winds up the film by one frame by the motor 10. When it is detected that the film has been wound up to its terminal end when the photographing of all frames has been completed, the CPU 1 effects the rewinding of the film by the motor 10.

Further connected to the CPU 1 are a display circuit 13 for turning on and off an LED 15 in a viewfinder, a time counting circuit 14 and switches SW3–SW6. The switch SW3 is a switch adapted to be closed in response to the operation of a focus lock holding button, not shown, and if this switch SW3 is closed when the above-described half depression switch SW1 is ON, the CPU 1 turns on and off the LED 15 through the display circuit 13 and holds the focus lock state even after the switch SW1 is opened. When the focus lock state is held, the distance measuring circuit 3 does not operate even if the switch SW1 is closed and thus, reading of the distance information is not effected. This is referred to as the focus lock holding mode. The LED 15 is usually turned on upon completion of the distance measurement.

The switch SW4 is a switch adapted to be closed in response to the operation of a self-timer button, not shown, and when the switch SW4 is closed, the CPU 1 counts a predetermined time by the time counting circuit 14 and effects shutter release after the completion of the time counting.

The switch SW5 is a switch operatively associated with a film rewind operating button, not shown, and upon closing of the switch SW5, the CPU 1 effects the rewinding of the film by the motor 10 through the motor drive circuit 11. The switch SW6 is a power source switch operatively associated with a barrier for the photo-taking lens opened and closed in front of the photo-taking lens, and when the barrier for the photo-taking lens is opened, the switch SW6 is closed to supply electric power to the circuit system other than the CPU 1.

In the construction of the above-described embodiment, the distance measuring circuit 3 constitutes focus adjustment information detecting means, the CPU 1 constitutes focus lock means and focus lock holding means, and the switch SW3 constitutes a focus lock hold operating member.

The procedure of the control effected in the CPU 1 will now be described with reference to the flow charts of FIG. 2.

When the half depression switch Sw1 or the self-timer switch SW4 is closed, this program is started, and first at step S1, distance data indicative of the distance information from the distance measuring circuit 3 is read, and this distance information is stored into a memory area which is the internal memory of the CPU 1.

That is, focus lock is effected. Then, at step S2, a process for determining whether the light emission of an electronic flash device is necessary depending on the luminance of the object is carried out, and advance is made to step S3.

At step S3, whether the switch SW3 is ON is judged by the operation of the focus lock holding button. If the judgment is affirmative, advance is made to step S4, where whether a focus lock holding flag FLH to be described is set is judged. If the judgment is negative, advance is made to step S5, where whether the LED 15 in the viewfinder is ON and OFF is judged. The judgment as to whether the LED 15 is ON and OFF is accomplished by judging whether an on-off flag for effecting the ON and OFF of the LED 15 is set. If the step S5 is affirmed, advance is made to step S8, and if the step S5 is negated, advance is made to step S6. At the step S6, whether a focus lock holding reset flag FLR to be described is set is judged. If the judgment is affirmative, advance is made to step S8, and if the judgment is negative, the on off flag is set at step S7 and the LED 15 in the viewfinder is turned on and off, and then advance is made to step S8.

On the other hand, if step S3 is negatively judged, whether the LED 15 in the viewfinder is turned on and off is judged at step S25. If the step S25 is negated, at step S26, the focus lock holding reset flag FLR is reset and at step S27, an on flag is set and the LED 15 is turned on, and advance is made to step S8.

If the step S25 is affirmed, whether the focus lock holding flag FLH is set is judged at step S28. If the step S28 is affirmed, advance is made to step S8, and if the step S28 is negated, at step S29, the focus lock holding flag FLH is set and advance is made to step S8.

If step S4 is affirmed, at step S21, the focus lock holding flag FLH is reset and the on-off flag is reset and the on flag is set to change over the LED 15 in the viewfinder from ON and OFF to ON. Also, at step S22, the focus lock holding reset flag FLR is set and advance is made to step S23. At the step S23, whether the half depression switch SW1 is ON is judged, and if the judgment is negative, advance is made to step S8, and if the judgment is affirmative, at step S24, distance data indicative of the distance information from the distance measuring circuit 3 is read and stored into the memory area, whereafter advance is made to step S8.

At the step S8, whether the LED 15 is turned on and off is judged, and if the judgment is affirmative advance is made to step S9, and if the judgment is negative, advance is made to step S31. At the step S31, whether the switch SW1 or SW3 is ON is judged. If the judgment is affirmative, advance is made to step S10, and if the judgment is negative, at step S34, the focus lock holding flag FLH is reset, and if the on flag is set, the on flag is reset, whereby the processing is terminated.

At the step S9, whether the power source switch SW6 operatively associated with the barrier for the photo-taking lens is ON is judged. If the judgment is negative, advance is made to step S31, and if the judgment is affirmative, advance is made to step S10. At the step S10, whether the switch SW5 is closed by the operation of the film rewind operating button is judged, and if the judgment is affirmative, at step S32, the focus lock holding flag FLH is reset and if the on flag or the on-off flag is set, that flag is reset and the LED 15 is turned off, whereafter at step S33, the rewinding of the film is effected by the motor 10 through the motor drive circuit 11, and thereafter the processing is terminated.

If the step S10 is negated, advance is made to step S11, where whether the self-timer switch SW4 is ON is judged. If the judgment is affirmative, time counting is started at step S35, and after the lapse of a predetermined time, at step S36 whether the LED 15 is turned on and off is judged. If the step S36 is affirmed, advance is made to step S38, and if the step S36 is negated, at step S37, distance data indicative of new distance information is read and stored into the memory area, and advance is made to step S38. At the step S38, as at the step 32, processing is effected, whereafter advance is made to step S14.

If the step S11 is negated, advance is made to step S12, where whether the full depression switch SW2 is ON is judged. If the judgment is affirmative, advance is made to step S13, and if the judgment is negative, return is made to step S3. At the step S13, the focus lock holding flag FLH is reset and the LED 15 is turned off, whereafter at step S14, luminance data indicative of the luminance information from the light metering circuit 2 is read. Then, at step S15, the amount of movement of the lens is calculated on the basis of the distance information stored at one of steps S1, S24 and S37, and on the basis of the result of the calculation, the photo-taking lens is driven to the focusing position by the motor 9 through the motor drive circuit 11. Then, at step S16, the exposure value is calculated on the basis of the luminance information read at step S14 and on the basis of the result of this calculation, the exposure control members such as the stop and the shutter are driven through the exposure control circuit 12, thereby accomplishing photographing. Thereafter, at step S17, the winding-up of the film by one frame is started by the motor 10 through the motor drive circuit 11, and advance is made to step S18. At the step S18, whether the film has been wound up to its terminal end is judged, and if the judgment is negative, the processing is terminated after the winding-up is completed, and if the judgment is affirmative, at step S19, the film is rewound into a cartridge by the film rewinding motor 10 and the processing is terminated.

According to the above-described procedure, by the closing of the switch SW1 operatively associated with the half depressing operation of the release button, storage of the distance information is effected at step S1, and when the closing of the switch SW3 by the operation of the focus lock hold operating button is judged at step S3, the LED 15 in the viewfinder is turned on and off at step S7 via steps S4–S6, whereafter return is made to step S3 via steps S8–S12, and if the switch SW3 is not ON, advance is made to steps S25, S28, S29 and S8–S12 and return is made to step S3. Thereafter, if the switches SW2 and SW3 are not closed, the processing goes around the loop of steps S3, S25, S28, S8–S12 and S3.

There is no judgment of the state of the half depression switch SW1 in this loop and therefore, even if the half depressing operation of the release button is released after the focus lock holding operation is done, the focus lock is held and also, even if the half depressing operation is again performed, reading and storage of the distance data are not effected. That is, the state of the focus lock is held. Also, when in this state, the focus lock holding button is again depressed and the switch SW3 is again closed, the processing goes through the above-described loop and advance is made from step S3 to step S4, and at step S21, the focus lock holding flag FLH is reset and the LED 15 is changed over from its ON and OFF state to its ON state and further, at step S22, the focus lock holding reset flag FLR is set, and if the half depression switch SW1 is OFF, the program passes through steps S8, S9, S31 and S34 and is terminated. That is, the holding of the focus lock state is released.

Further, if the focus lock holding button is operated when the focus lock state is held and the release button is half-depressed, the processing goes through the above-described loop and advance is made from step S3 to steps S4 and S21–S24, and at the step S24, new distance information is read and stored and the processing goes around the loop of steps S8, S31, S10–S12, S3, S25–S27 and S8, and when the focus look hold operating member is operated, the focus lock state is again held in the same manner as described above.

Furthermore, when the power source switch SW6 operatively associated with the opening-closing of the barrier for the photo-taking lens is OFF at step S9, the processing passes through step S31 and at step S34, the focus lock holding flag FLH is reset to terminate the processing. That is, the holding of the focus lock state is released. Also, when the closing of the rewinding switch SW5 at step S10 is judged, the processing passes through steps S32 and S33 and the holding of the focus lock state is released. Further, when the closing of the full depression switch SW2 is judged at step S12, the holding of the focus lock state is released with the photographing process.

Figure 3A:
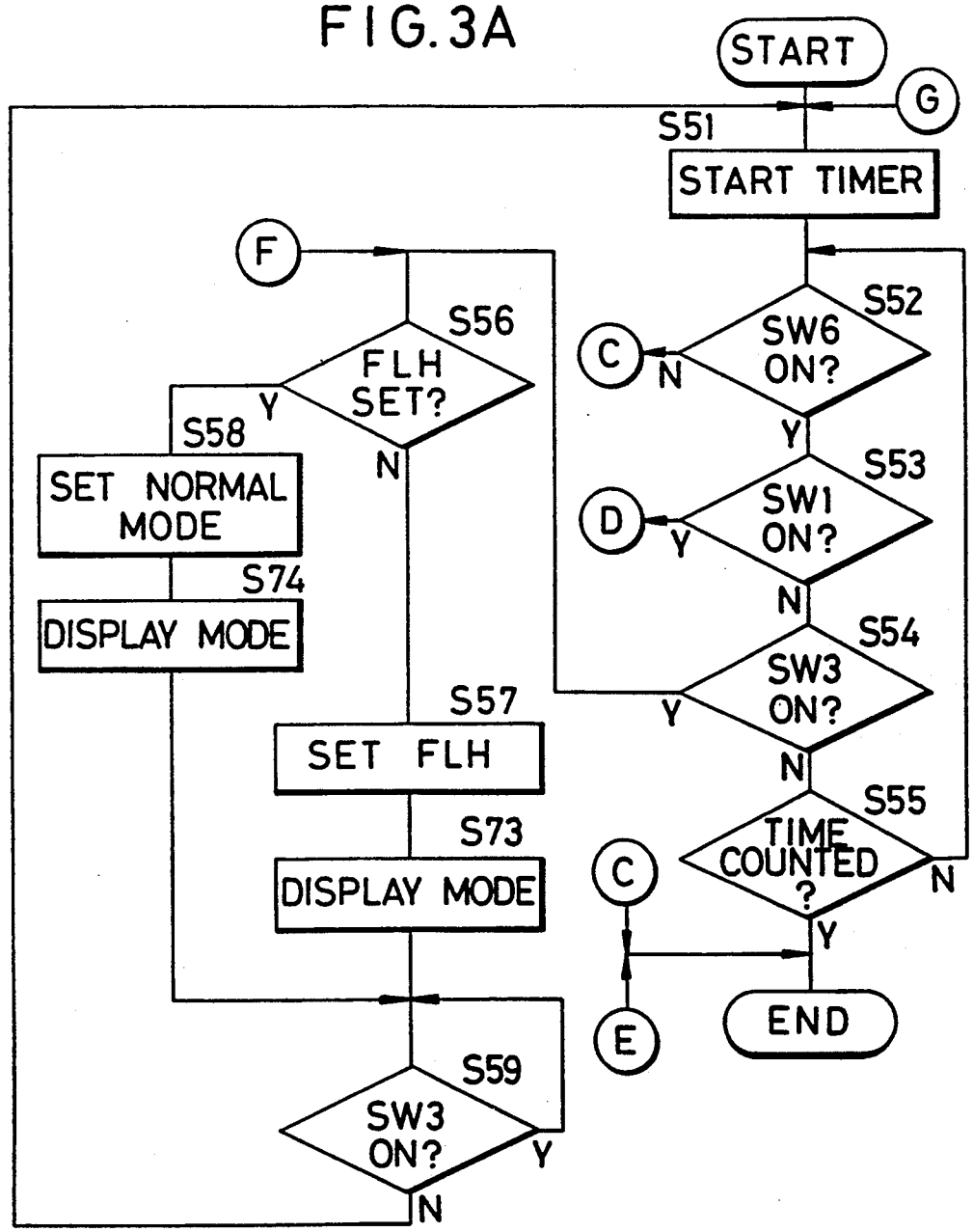
FIGS. 3A and 3B are flow charts showing the operation of a modification.
Figure 3B:
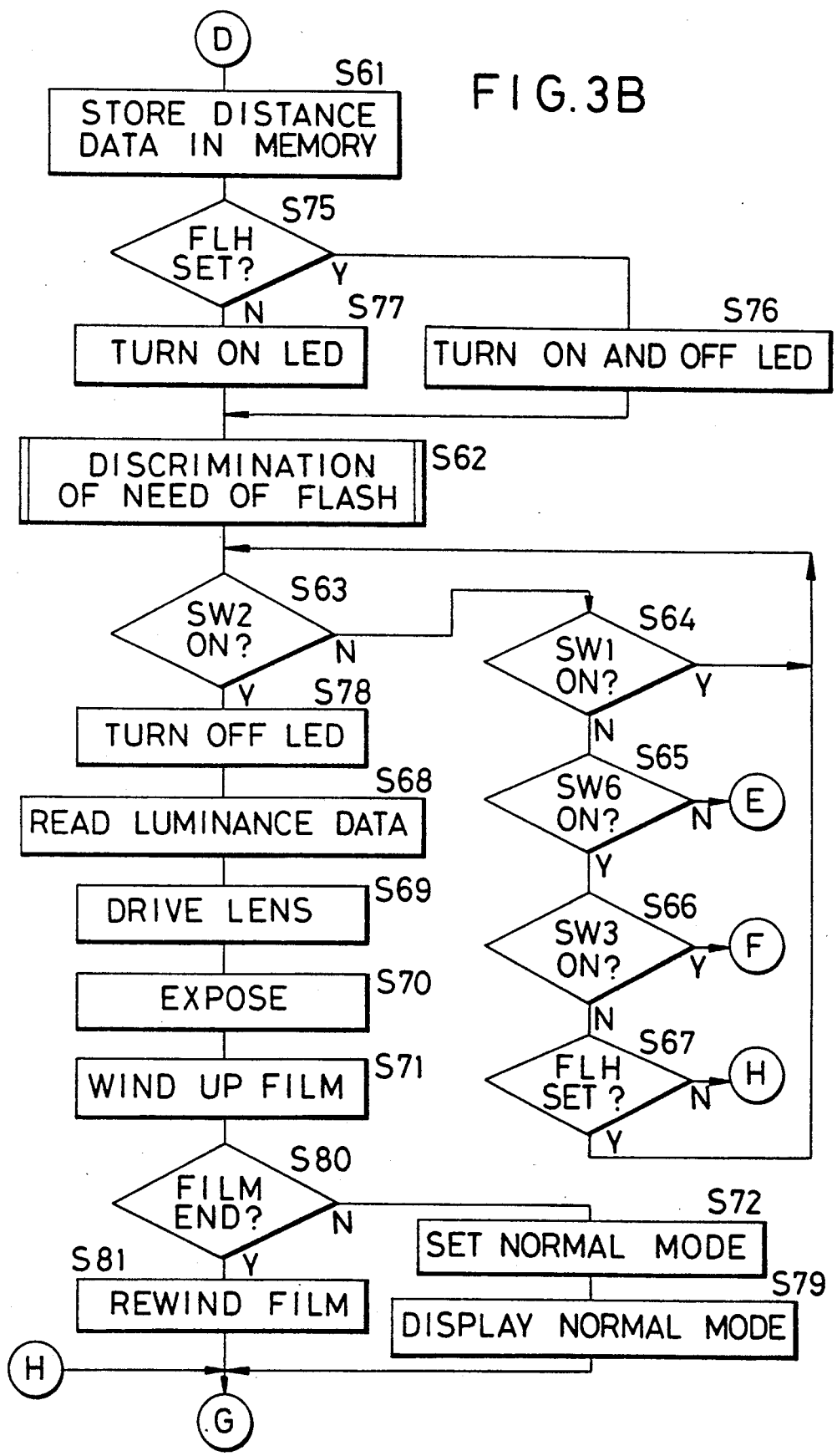
Figure 4:
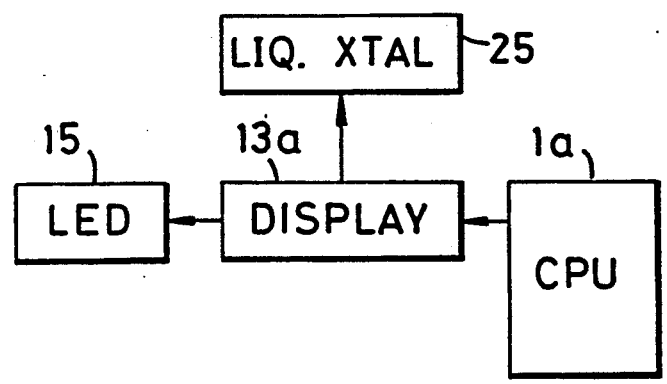
FIG. 4 is a block diagram showing the construction of the modification.

Reference is now had to FIGS. 3 and 4 to describe a modification of the embodiment of the present invention in which the focus lock hold operating member is operated before the release button is half-depressed.

In FIG. 4, a liquid crystal display device 25 as well as the LED 15 is connected to a display circuit 13a, and CPU 1a controls the liquid crystal display device so as to display whether the mode is the focus lock holding mode. The construction of the unshown remaining portion of the modification shown in FIG. 4 is shown in FIG. 3.

In FIG. 3, this program is started when the power source switch SW6 operatively associated with the barrier for the photo-taking lens is closed, and at step S51, the internal timer of the CPU 1a is first caused to start counting time. Subsequently, at step S52, whether the power source switch SW6 is ON is judged, and if the judgment is negative, the processing is terminated, and if the judgment is affirmative, advance is made to step S53. At the step S53, whether the half depression switch SW1 is ON is judged, and if the judgment is negative, whether the switch SW3 is ON is judged at step S54. If the step S54 is negated, advance is made to step S55, where whether a predetermined time has elapsed after the starting of the timer is judged. If the judgment is negative, return is made to the step S52, and if the judgment is affirmative, the processing is terminated.

If at step S54, the closing of the focus lock holding switch SW3 is judged, advance is made to step S56, where whether the focus lock holding flag FLH is set is judged. If the judgment is negative, the flag FLH is set at step S57 and also, at step S73, the focus lock holding mode display is effected by the liquid crystal display device 25, and advance is made to step S59. If the step S56 is judged affirmatively, the normal mode in which the holding of the focus lock is not effected is set at step S58 and also, at step S74, the normal mode display is effected by the liquid crystal display device 25, and advance is made to step S59. At the step S59, whether the focus lock holding switch SW3 is ON is judged, and if the judgment is affirmative, the program stays at the step S59 until the step S59 is negated, and if the step is negated, return is made to the step S51.

If at step S53, the closing of the half depression switch SW1 is judged, at step S61, the distance information is stored into the memory area, and at step S75, whether the flag FLH is set is judged. If the step S75 is affirmed, at step S76, the LED 15 in the viewfinder is turned on and off and advance is made to step S62, and if the step S75 is negated, at step S77, the LED 15 in the viewfinder is turned on and advance is made to step S62. At the step S62, whether the light emission of the electronic flash device is necessary is determined, and then advance is made to step S63. At the step S63, whether the full depression switch SW2 is ON is judged, and if the judgment is negative advance is made to step S64. At the step S64, whether the half depression switch SW1 is ON is judged, and if the judgment is affirmative, return is made to the step S63, and if the judgment is negative, advance is made to step S65. At the step S65, whether the power source switch SW6 is ON is judged. If the judgment is negative, the processing is terminated, and if the judgment is affirmative, whether the switch SW3 is ON is judged at step S66. If the step S66 is affirmed, whether the flag FLH is set is judged at step S67. If the step S67 is affirmed, return is made to the step S63, and if the step S67 is negated, return is made to the step S51.

If at the step S63, the closing of the full depression switch SW2 is judged, the LED 15 in the viewfinder is turned off at step S78, and advance is made to step S68. At the step S68, the luminance information from the light metering circuit 2 is read and advance is made to step S69.

At the step S69, the amount of movement of the lens is calculated on the basis of the distance information stored at the step S61, and on the basis of the result of the calculation, the photo-taking lens is driven to the focusing position by the motor 9 through the motor drive circuit 11. Then, at step S70, the exposure value is calculated on the basis of the luminance information read at the step S68, and on the basis of the result of this calculation, the exposure control members such as the stop and the shutter are driven through the exposure control circuit 12, thereby accomplishing photographing. Thereafter, at step S71, the film is wound up by one frame by the motor 10 through the motor drive circuit 11 and advance is made to step S80. At the step S80, as at the step S18 of FIG. 28, whether the film has been wound up to its terminal end is judged. If the film is wound up to its terminal end, shift is made to step S81, where the film is rewound into the cartridge. If the film is not wound up to its terminal end, shift is made to step S72. At the step S72, the mode is set to the normal mode, and then at step S79, the normal mode display is effected by the liquid crystal display device 25 and return is made to the step S51.

In the foregoing, there has been shown a camera of the type in which the distance information from the distance measuring circuit 2 is stored by the half depressing operation of the release button, whereafter the photo-taking lens is driven to the focusing position on the basis of the distance information stored by the full depressing operation of the release button and thereafter, shutter release is effected, but the present invention is also applicable to a camera of the type in which by the half depressing operation of the release button, the photo-taking lens is driven to the focusing position on the basis of the distance information from the distance measuring circuit 2 and is fixed at that position, whereafter shutter release is effected in response to the full depressing operation of the release button.

The present invention is also equally applicable to a camera in which as in the TTL automatic focus adjusting device of a single-lens reflex camera, focus adjustment information indicative of the amount and direction of deviation between the imaging plane of an object and the predetermined imaging plane is detected instead of distance information. In that case, the photo-taking lens is driven to the focusing position by the focus adjustment information and is fixed at that position to thereby effect focus lock.

Further, the design is such that the LED in the viewfinder is turned on and off when the focus lock state is held, but in addition thereto, the design may be such that a display portion in the front surface of the camera is turned on and off during self-timer photography. In this case, the turn-on-and-off period or the duty cycle can be varied to distinguish focus lock state from self-timer photography.

The present invention is designed such that by the operation of the focus lock hold operating member, the focus lock state is held even after the half depressing operation of the release operating member is released and thereafter the half depression signal output by the release operating member being half-depressed is not received and therefore, when one requests a third person to perform photography, if one hands the camera over to the third person after one effects focus lock in advance so as to focus the camera to a desired object and holds that state, even the third person who may not know focus lock photography can take a photograph which is in focus to the desired object simply by depressing the release button.

A description will now be given of a second embodiment of the present invention in which the operating portions of the switch of the self timer and the switch for focus lock are common to each other.

Figure 5:
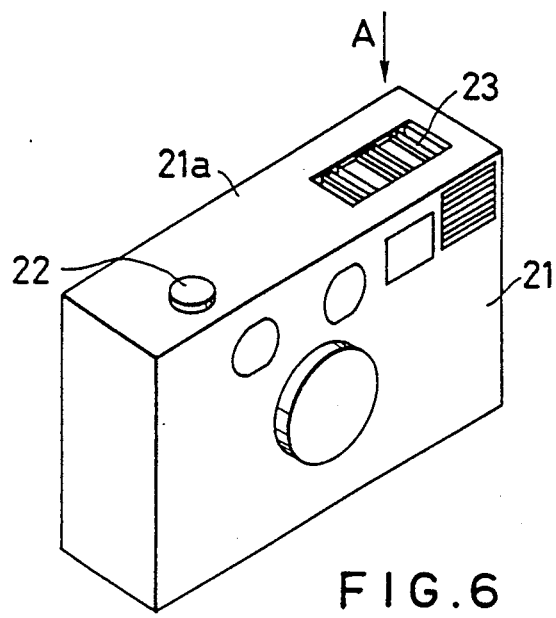
FIGS. 5, 6, 7 and 8 show portions of the outer construction of a second embodiment of the present invention.

FIG. 5 is a perspective view of a camera showing a second embodiment of the present invention. In FIG. 5, a release button 22 and an operating member 23 are disposed on the upper surface 21a of a camera body 21.

Figure 6:
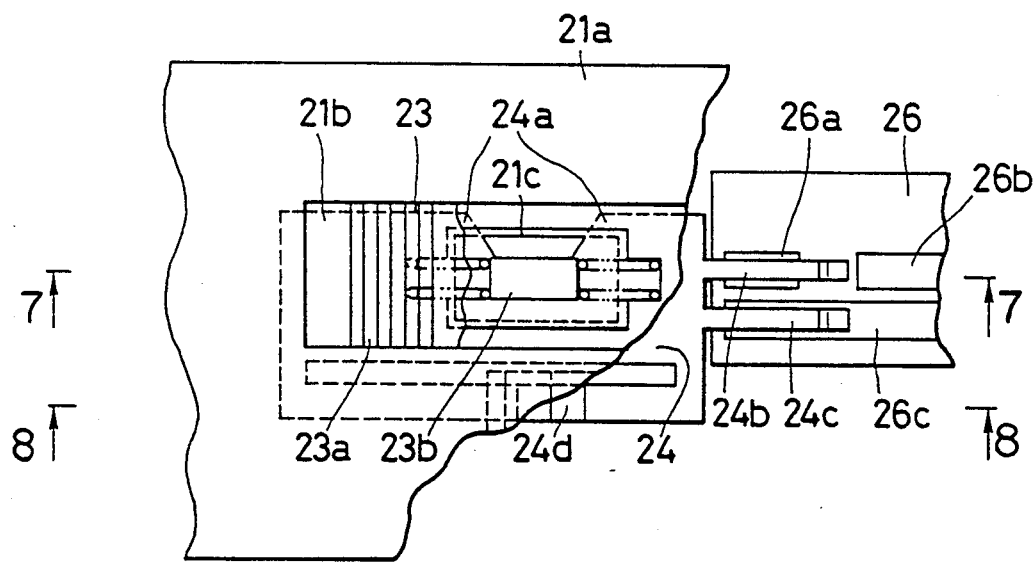
Figure 7:
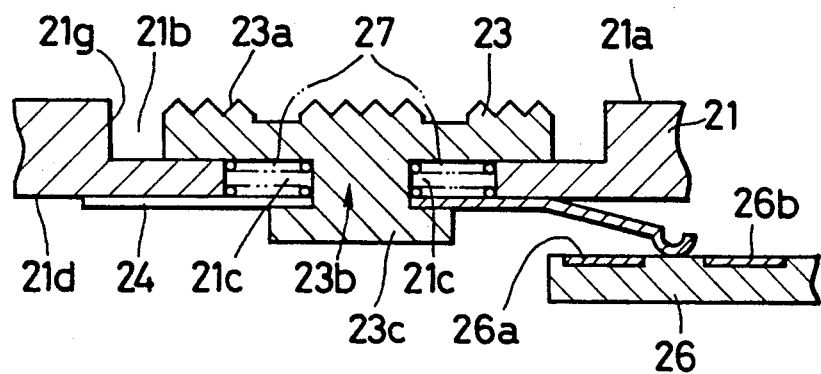

FIG. 6 shows a plan cross-sectional view of the operating member 23 of the camera body 21 in FIG. 5 as seen in the direction of arrow A, and FIG. 7 shows a cross-sectional view taken along line 7—7 in FIG. 6. In the state shown in FIG. 7, no operation is exerted on the operating member 23.

In FIGS. 6 and 7, the operating member 23 is disposed in the recess 21b of the camera body 21. The operating member 23 is comprised of an operating portion 23a facing the outside of the camera body 21 and knurled so as to be readily operated by fingers, a shaft portion 23b extending through a bore portion 21c provided in the camera body 21, and a flange portion 23c formed with a larger diameter than the shaft portion 23b. A contact piece spring 24 is inserted upwardly into the shaft portion 23b as viewed in FIG. 6, and two pawl portions 24a are engaged with the shaft portion 23b, whereby the operating member 23 and the contact piece spring 24 are movable together.

The contact piece spring 24 bears against the inner wall 21d of the camera body 21, and nips the camera body 21 between the operating portion 23a and the flange portion 23c to thereby prevent the slip-out of the operating member 23.

Further, the contact piece spring 24 is provided with contact piece portions 24b and 24c and a click portion 24d, and the contact piece portions 24b and 24c are slidable on the patterns 26a, 26b and 26c, respectively, of the upper surface of a pattern base plate 26 disposed in the camera body 21, and by making conduction between the patterns, a circuit which will be described later is changed over to an operative condition and an inoperative condition.

Two compression springs 27 are inserted in the portion 21c of the camera body 21 so as to bias the shaft portion 23b of the operating member 23 in the direction of operation (the left to right direction in FIG. 7) of the operating member 23, and are set so as to keep their substantially intermediate position as shown in FIG. 7.

Figure 8:
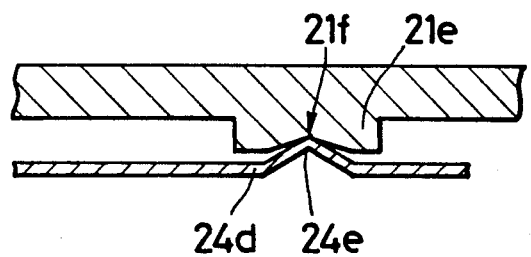

Referring now to FIG. 8 which shows a cross-sectional view taken along line 8—8 of FIG. 6, the convex portion 24e of triangular cross-sectional shape of the click portion 24d of the contact piece spring 24 is engaged with a depression 21f formed in the convex portion 21e of the camera body 21. This click portion 24d is in the form of a spring vertically flexible as viewed in FIG. 8, and is designed so as to be deformed during the operation of the operating member 23 and readily come out of the click position.

The patterns of the upper surface of the pattern base plate 26 are connected to CPU 1, and comprise a pattern 26a generating a self-timer signal by the sliding movement thereof with the contact piece portion 24b, a pattern 26b generating a focus lock signal by the sliding movement thereof with the contact piece portion 24c, and a pattern 26c which is a ground. The contact piece portions 24b and 24c slide on the pattern 26a, 26b and 26c, respectively, with the operation of the operating member 23.

The operation of the operating member 23 constructed as described above will now be described.

First, in the state shown in FIGS. 6 and 7, that is, the state in which no operation is exerted on the operating member 23, the biasing forces of the two compression springs 27 biasing the operating member 23 are equal to each other and the convex portion 24e of the click portion 24d of the contact piece spring 24 is engaged with a depression 21f on the convex portion 21e of the camera body 21 and therefore, the operating member 23 does not move inadvertently.

Also, at this time, the contact piece portion 24b of the contact piece spring 24 is in contact with none of the patterns 26a and 26b and therefore, a focus lock holding signal and a self-timer signal are not generated.

From this state, the operating member 23 is slid in one of the leftward and rightward directions. When the operating member 23 is, for example, in the leftward direction as viewed in FIG. 7, it bears against the inner wall 21g of the recess 21b of the camera body 21 against the biasing force of the compression spring 27. At this time, the click portion 24d of the contact piece spring 24 flexes and the convex portion 24e comes out of the depression 21f on the convex portion 21e of the camera body 21 and therefore, the sliding operation can be accomplished smoothly without requiring a strong force. By this operation, the contact piece portion 24b slidably contacts with the pattern 26a and conduction with the ground pattern 25c is assumed, whereby a self-timer signal is generated. In response to this self-timer signal, the CPU 1 effects the counting of a predetermined time by a time counting circuit 14, and causes shutter release to be effected after the completion of the time counting. After the sliding operation has been effected, the fingers are released from the operating member 23, whereupon the operating member 23 is moved in the rightward direction as viewed in FIG. 7 by the biasing force of the compression spring 27, and the convex portion 24e of the click portion 24d comes into engagement with the depression 21f on the convex portion 21e of the camera body 21 and the operating member 23 is fixed.

The generation of a focus lock holding signal is similar to the generation of the self-timer signal, that is, by the operating member 23 being slid in the rightward direction as viewed in FIG. 7, the contact piece portion 24b of the contact piece spring 24 slidably contacts with the pattern 26b and a focus lock holding signal is generated, and in response to this focus lock holding signal, the CPU 1 operates, and by releasing the fingers from the operating member 23, the operating member 23 returns to its original position.

Also, the intermediate releasing of the focus lock holding and self timer photography is done by opening a power source switch operatively associated with the opening-closing operation of a photo-taking lens barrier, and when the operation of the operating member 23 is again effected and the starting of the circuit is effected twice, the apparatus is reset to an inoperative state, i.e., the initial state.

The procedure of the control effected in the CPU 1 according to the second embodiment will now be described with reference to the flow charts of FIGS. 9A and 9B.

This program is started by the power source switch being closed with the opening-closing operation of the photo-taking lens barrier.

First, at step S91, the display of the remaining amount of film, etc. is effected by liquid crystal display device 25 and the time counting by the timer is started. The starting of this time counting by the timer is effected to turn off the liquid crystal display when no operation is performed within a predetermined period of time starting when the power source switch is closed, and terminate a series of processes.

At step S92, whether a switch SW6 operatively associated with the opening-closing of the photo-taking lens barrier is closed is discriminated. If the answer is affirmative, advance is made to step S93, and if the answer is negative, the processing is terminated.

At step S93, whether a half depression switch SW1 has been closed is discriminated.

At step S94, the distance information from a distance measuring circuit 3 is read in, and this distance information is stored in a memory area. That is, focus lock is effected.

At step S95, determining whether the light emission of an electronic flash device is necessary depending on the luminance of an object is effected.

At step S96, whether the mode is the self-timer mode (abbreviated as "self-mode") is discriminated. This discrimination is accomplished by examining whether a self-timer flag is set.

At step S97, whether a switch SW2 operatively associated with the full depression operation of the release button is closed is discriminated.

At step S98, whether the switch SW1 operatively associated with the half depression operation of the release button has been closed is judged.

At step S99, whether a switch SW6 operatively associated with the opening-closing operation of the photo-taking lens barrier is closed is discriminated again.

At step S100, whether the focus lock holding signal has been output by the operation of the operating member 23 is discriminated.

At step S101, whether the mode is the focus lock holding mode is discriminated. This discrimination is accomplished by examining whether a focus lock holding flag is set.

At step S102, whether the time counting of the focus lock holding mode by the timer is completed is discriminated.

This time counting by the timer is started from a point of time at which the focus lock holding signal has been output, and is effected to restore the normal photographing mode when no operation is performed within a predetermined period of time starting when the focus lock holding mode is set.

At step S103, whether the self-timer signal has been output by the operation of the operating member 23 is discriminated.

At step S104, the self mode is set and the display to this effect is effected by the liquid crystal display device 25. Thereafter, the process proceeds to step S109.

On the other hand, if an affirmative answer is obtained at step S97, that is, if it is judged that the switch Sw2 operatively associated with the full depression operation of the release button has been closed, shift is made to step S105. The step S105 is the same as the steps S68–S72 and S79 of FIG. 3B.

On the other hand, if an affirmative answer is obtained at step S96, that is, if it is judged that the mode is the self mode, self-timer preparation processing is effected as a sub-routine with the generation of the self-timer signal by the operating member 23. The self-timer preparation processing will be described here with reference to FIG. 10.

In FIG. 10, when the self-timer preparation processing is started, at step S130, the counting of a predetermined time (e.g. about 10 seconds) is started, and at step S131, the display of the operation of the self-timer photography, i.e., the turning-on of LED, is started.

Next, at step S132, whether the focus lock holding signal has been output by the operation of the operating member 23 is discriminated. If the answer is affirmative, advance is made to the step S115 of FIG. 9B.

At step S133, whether the switch SW6 operatively associated with the opening-closing operation of the photo-taking lens barrier is closed is judged. If the answer is affirmative, advance is made to step S134, and if the answer is negative, the processing is terminated.

At step S134, whether the self-timer signal has been output is discriminated. If the answer is affirmative, advance is made to the step S120 of FIG. 9B.

At step S135, whether about 7 seconds has been counted from the start of the self-timer is discriminated.

At step S136, the LED which has so far been turned on as the display of the operation of the self-timer begins to be turned on and off.

Subsequently, at step S137, whether about 3 seconds has been counted from the start of the turn-on-and-off of the LED is discriminated. If the answer is affirmative, the self-timer preparation processing is terminated, whereafter a series of processes is effected through the step S105 of FIG. 9A. On the other hand, if the answer is negative, return is made to step S132.

Figure 9A:
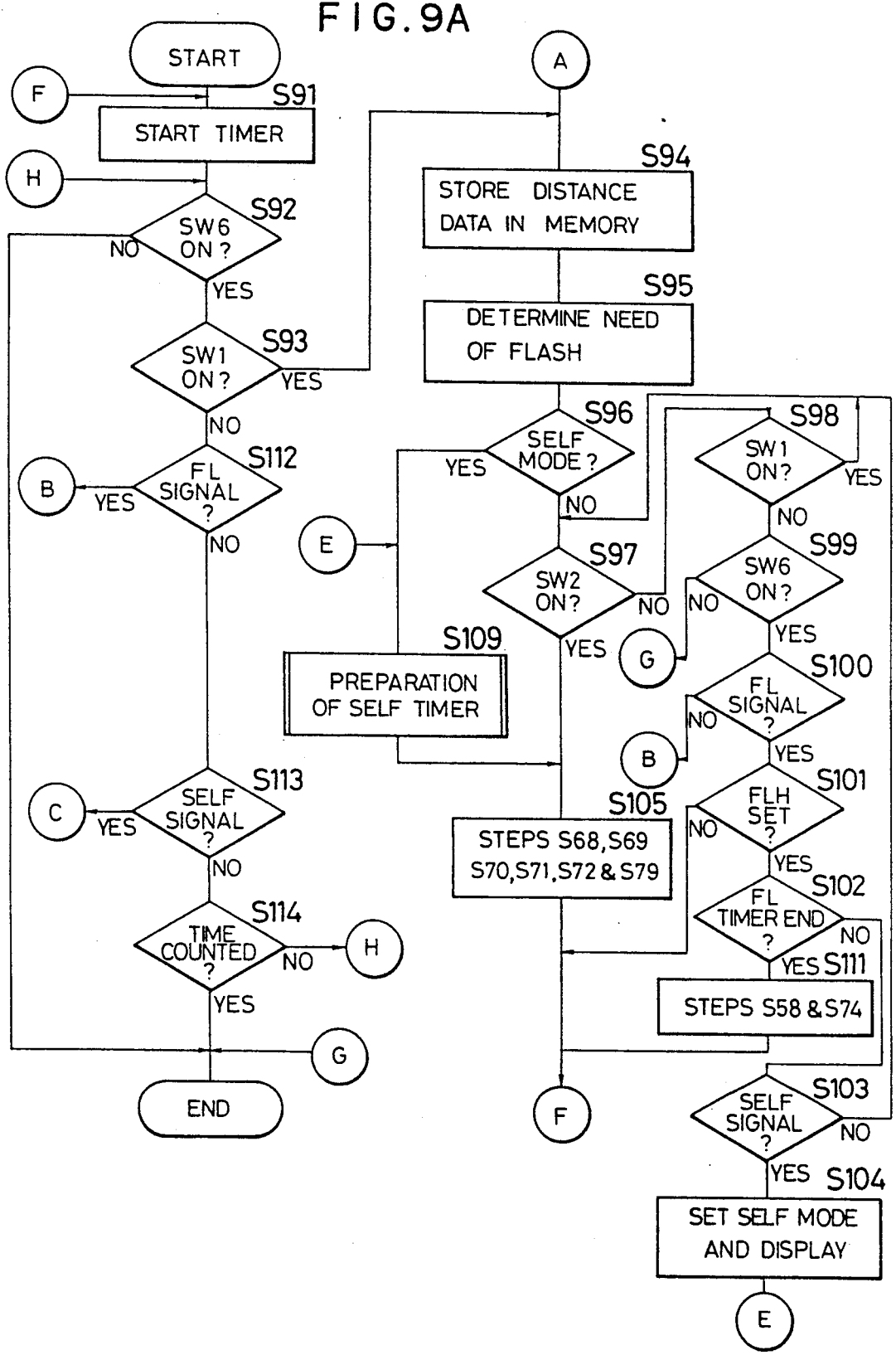
Figure 9B:
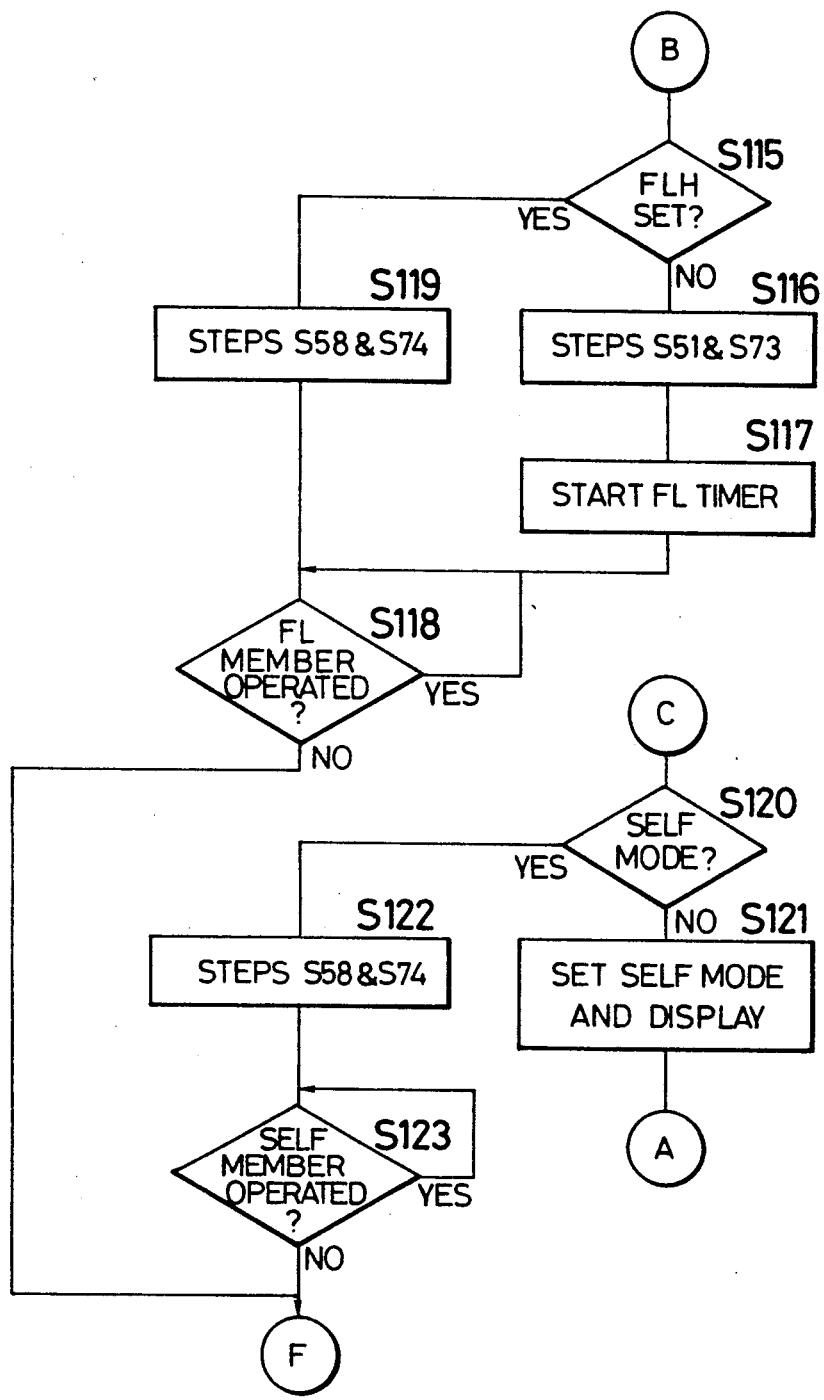

Now, return is made to the description of the control procedure of the flow chart of FIG. 9A.

On the other hand, if an affirmative answer is obtained at step S102, that is, if it is judged that the timer of the focus lock holding mode has been terminated, the focus lock holding mode is released and the normal photographing mode is set and also, this effect is displayed by the liquid crystal display device 25.

Further, if a negative answer is obtained at step S93, that is, if it is judged that the switch SW1 operatively associated with the half depression operation of the release button is not closed, whether the focus lock holding signal has been output by the operation of the operating member 23 is discriminated.

At step S113, whether the self-timer signal has been output by the operation of the operating member 23 is discriminated.

At step S114, whether the display timer of the liquid crystal display device 25 started at step S91 has been terminated is discriminated. If the answer is affirmative, the processing is terminated, and if the answer is negative, return is made to step S92.

On the other hand, if an affirmative answer is obtained at step S112, whether the mode is the focus lock holding mode is discriminated at step S115.

At step S116, the focus lock holding mode is set and this effect is displayed by the display device 25.

At step S117, the time counting of the focus lock holding mode by the timer is started.

At step S118, whether the focus lock holding operation is exerted by the operating member 23 is discriminated.

On the other hand, if an affirmative answer is obtained at step S115, the focus lock holding mode is released and the normal photographing mode is set and also this effect is displayed by the display device 25, at step S119.

Further, if an affirmative answer is obtained at step S113, whether the mode is the self mode is discriminated at step S120.

At step S121, the self mode is set and also, this effect is displayed by the display device 25. Thereafter, advance is made to step S94.

At step S122, the self mode is released and the normal photographing mode is set and also, this effect is displayed by the display device 25.

At step S123, whether the self-timer operation is exerted by the operating member 23 is discriminated. If the answer is affirmative, step S123 is repetitively executed, and if the answer is negative, return is made to step S91.

As description will now be given of the loop from the above-described procedure to the normal photographing, i.e., the state in which the focus lock is not held.

First, by the closing of the power source switch resulting from the opening-closing of the photo-taking lens barrier, the display by the liquid crystal display device 25 and the time counting by the timer are started at step S91, and if the closing of the switch SW6 operatively associated with the photo-taking lens barrier is again determined at steps S94 and S95, whether the distance information should be stored and whether the electronic flash device should emit light is determined by the closing of the switch SW1 operatively associated with the half depression operation of the release button at step S93. Then, return is made to step S91 through step S96 to steps S97–S101. The process will go around this loop as long as the release button is not fully depressed at step S97.

In this case, if the release button is half-depressed at step S93, the reading and storage of the distance information is effected at step S94, but by the half depression operation of the release button being released, the distance information is reset. That is, the state of focus lock is not held.

By the release button being fully depressed at step S97, the reading of photometric information and one-frame winding-up of the film are effected through step S105, whereafter return is made to step S91, and a series of photographing processes is terminated through steps S92, S93 and S112–S114.

The loop of the focus lock holding state will now be described.

If at step S100 in the above-described loop during normal photographing, it is judged that the focus lock holding signal has been generated by the operation of the operating member 23, advance is made to step S115 through this loop. At this step S115, whether the mode is the focus lock holding mode is discriminated, whereafter steps S116–S118 are passed through, and after the focus lock holding mode is set, return is made to step S91. Then the reading and storage of the distance information is effected at step S94 through step S91 to steps S92 and S93, and at step S95, whether the electronic flash device should emit light is determined, whereafter step S96 is passed through, and the process goes around the loop of steps S97–S103 until the release button is fully depressed at step S97.

In this state, the distance information is stored and held even if the half depression operation of the release button is released, and the reading and storage of the distance data do not take place even if the release button is again half-depressed. That is, the state of focus lock is held.

Also, if in this state, the operating member 23 is again operated to generate the focus lock signal, this loop is passed through from step S100, and advance is made from step S115 to step S119, where the focus lock holding mode is released and the normal photographing mode is set.

Also, as regards the case where the focus lock holding signal is generated by the operation of the operating member 23 before the release button is half-depressed, the loop of steps S93, S112 and S115–S118 is passed through, but the processing operation in such case does not differ from what has been described above and therefore need not be described.

If the focus lock signal is again generated by the operation of the operating member 23 when the state of focus lock is being held, new distance information is read and stored, and when the release button is released, the focus lock is released.

The releasing of the holding of the focus lock state involves the opening of the switch Sw6 operatively associated with the above-described opening-closing operation of the photo-taking lens barrier and the re-operation of the operating member 23, and in addition, a case where the closing of a rewinding switch Sw5 is judged and a case where the closing of the switch SW2 operatively associated with the full depression operation of the release button is judged. The closing of this switch SW2 means that photographing has been effected, and the holding of the focus lock state is released as one-frame photographing of the film is terminated.

A further description will be given of a case where the state of focus lock is held and yet the self-timer signal is generated.

At step S112, the focus lock holding signal is generated, and steps S115–S118 are passed through, and the focus lock holding mode is set. Steps S91 to S92 and S93 are again passed through, and at step S94, the reading and storage of the distance information is effected, and at step S95, whether the electronic flash device should emit light is determined. After, at step S96, it is judged that the mode is not the self mode, the loop of steps S97–S103 is passed through, and if at step S103, it is judged that the self-timer signal has been generated by the operation of the operating member 23, at step S104, the self mode is set and the display to this effect is effected by the display device 25. Thereafter, advance is made to step S109, where the self-timer preparation processing is effected, and advance is made to step S105.

As another loop of the generation of the self-timer signal, at step S113, it is judged that the self-timer signal has been generated, and at step S120, whether the mode is the self-timer mode is discriminated. If here, it is judged that the mode is not the self-timer mode, at step S121, the self-timer mode is set and also, the display to this effect is effected. Advance is then made to steps S94 and S95, where the reading and storage of the distance information and the determination as to whether the electronic flash device should emit light are effected, whereafter a series of processes is effected through steps S96, S109 and S105.

As described above, the state of focus lock in which the photo-taking lens is focused in advance to a desired object during self-timer photography is held, whereby a photograph in focus to the object is obtained even if the object moves laterally before shutter release and comes out of the distance-measured area.

A modification of the second embodiment of the present invention will now be described with reference to the drawings.

In the modification, the operating member 23 described in the first embodiment is designed to be depressible and so that by repetitive depression operation of this operating member, six modes i.e., (1) the self mode (hereinafter referred to as the S mode), (2) the double self mode (hereinafter referred to as the DS mode) in which self photographing is again effected in a predetermined time after the completion of the first self photographing, (3) the focus lock holding mode, (4) the FLS mode in which the focus lock holding mode and the self mode are set at the same time, (5) the FLDS mode in which the focus lock holding mode and the double self mode are set at the same time, and (6) the normal photographing mode (hereinafter referred to as the N mode), can be cyclically switched.

Also, the self-timer photographing in the first embodiment is immediately started in response to the generation of the self-timer signal by the operating member 23, whereas the self-timer photographing in the modification of the second embodiment is started by setting the S mode by the operating member, and then fully depressing the release button.

The construction of the operation control device in the modification of the second embodiment is substantially similar to that in the first embodiment, but the switch SW3 is constructed as a switch adapted to be closed in operative association with the depression operation of the operating member and generate the focus lock signal and the self-timer signal. Accordingly, the switch Sw4 in the modification of the second embodiment for generating the self-timer signal is absent.

Figure 11A:
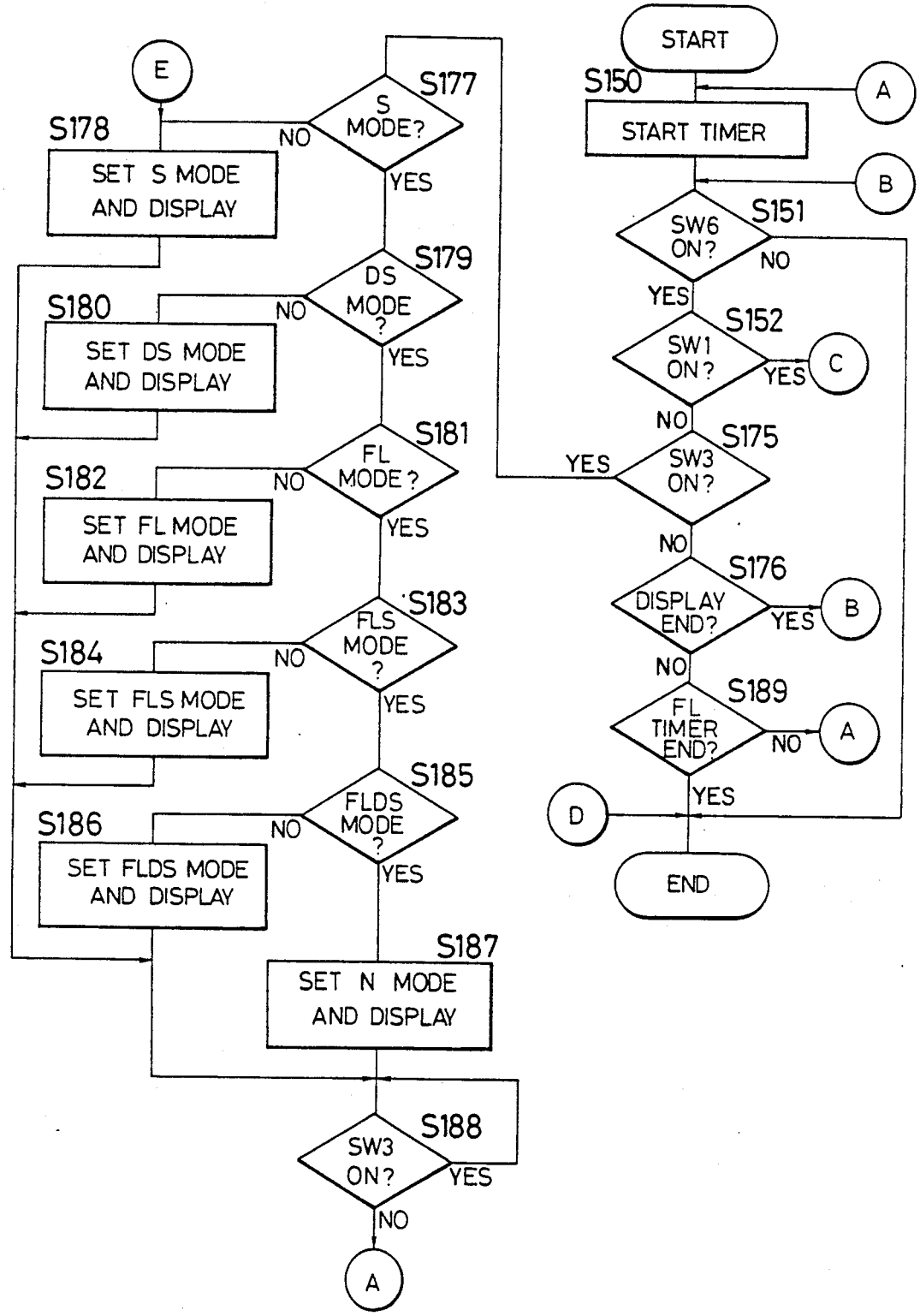
FIGS. 11A and 11B are flow charts showing the operation of a modification of the second embodiment.
Figure 11B:
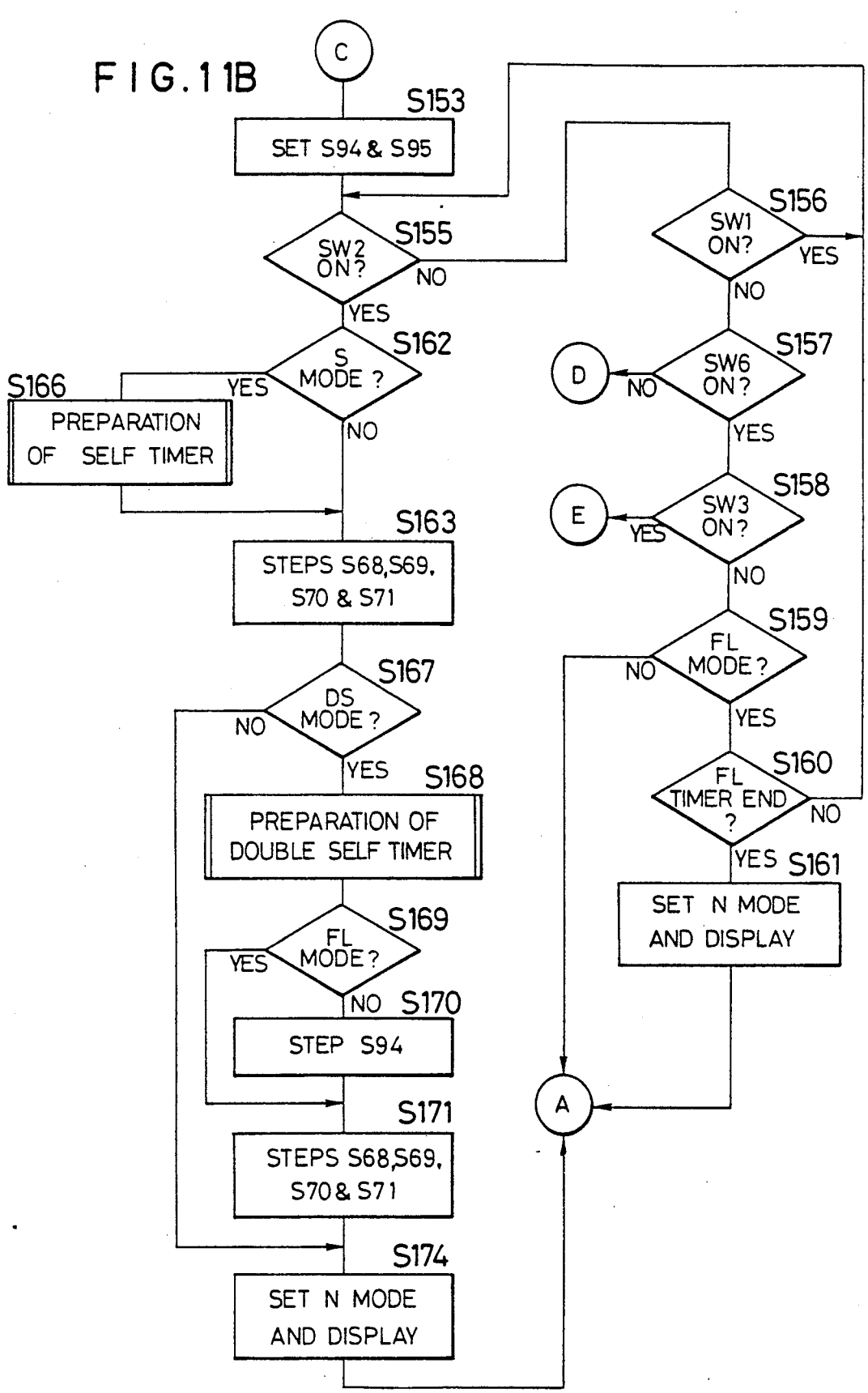

The procedure of the control effected in the CPU 1 will now be described with reference to the flow charts of FIGS. 11A and 11B. The flow of the basic loop is designed along the lines of the first embodiment.

First, by the power source switch operatively associated with the opening-closing operation of the photo-taking lens barrier being closed, this program is started, and steps S150 and S151 are passed through, and at step S152, response is made to the closing of the switch SW1 operatively associated with the half depression operation of the release button, and at step S153, the reading and storage of the distance information is effected and further, at step S154, whether the electronic flash device should emit light is determined, whereafter at step S155, whether the switch SW2 operatively associated with the full depression operation of the release button has been closed is judged. If the judgment is negative, steps S156 and S157 are passed through and further, at step S158, whether the switch Sw3 has been closed by the depression operation of the operating member is judged. If the judgment is negative, advance is made to step S159, and if the judgment is affirmative, advance is made to step S177.

On the other hand, if at step S155, an affirmative answer is obtained, that is, if it is judged that the switch SW2 operatively associated with the full depression operation of the release button has been closed, advance is made to step S162, where whether the mode is the self mode is judged. If the judgment is negative, step S163 is passed through and the normal photographing process is effected. If the judgment is affirmative, the self-timer preparation processing of step S166 is effected.

Further, at step S167, whether the mode is the DS mode is judged. If the judgment is negative, advance is made to step S174, whereafter return is made to step S150. If the judgment is affirmative, the double self preparation processing of step S168 is effected. In this double self preparation processing, the normal self-timer preparation processing is effected twice, and the distance and photometric information is re-set each time.

As described above, if the set photographing mode is the S mode or the DS mode, the self-timer preparation processing is immediately started with the full depression operation of the release button.

Also, at step S175, whether the switch SW3 has been closed by the depression operation of the operating member is judged, and if the judgment is affirmative, at step S177, whether the mode is the S mode is judged. If at step S177, a negative answer is obtained, at step S178, the S mode is set and also, this effect is displayed by the display device 25.

On the other hand, if an affirmative answer is obtained, that is, if it is judged that the mode is the S mode, at step S179, the S mode is released and the DS mode is set and also, at step S180, this effect is displayed by the display device 25. Thereafter, in a similar manner, the FLS mode, the FLDS mode and the normal photographing mode are cyclically switched in response to the closing of the switch Sw3 by the depression operation of the operating member and also, this effect is displayed by the display device 25.

If no processing operation is effected after the start of this flow chart, at steps S176 and S189, the processing is terminated with the termination of the time counting by each display timer. Also, when the switch Sw6 operatively associated with the opening-closing operation of the photo-taking lens barrier is opened, that is, when the barrier is closed, the processing is terminated.

Figure 12:
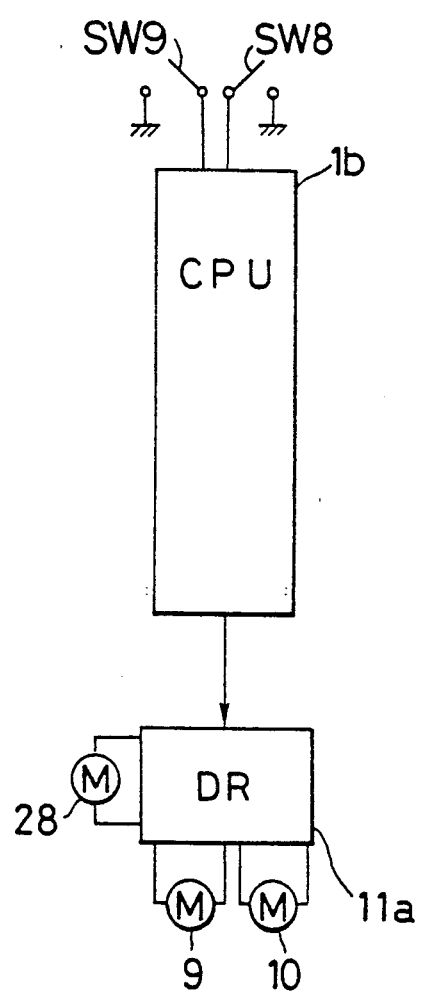
FIG. 12 is a block diagram showing portions of the construction of a third embodiment of the present invention.

FIG. 12 shows a third embodiment of the present invention. In FIG. 12, switches SW8 and SW9 and a motor 28 for effecting the zooming of the lens are newly added, and the others are omitted. The switch SW8 is a switch adapted to be closed in response to the operation of a zoom-up button, and as long as the zoom-up button is operated, the closed position of the switch SW8 is maintained. As long as the switch SW8 is closed, CPU 1b drives a zoom lens, not shown, by the zoom motor 28 through a motor driving circuit 11a and changes the focal length of the photo-taking lens to the telephoto side. That is, it effects so called zoom-up.

The switch SW9 is a switch operatively associated with a zoom-down button, not shown, and as long as the zoom-down button is operated, the closed position of the switch SW9 is maintained. As long as the switch SW9 is closed, the CPU 1b drives the zoom lens by the motor 28 through the motor driving circuit 11a and changes the focal length of the photo-taking lens to the wide angle side. Here, it is to be understood that the camera of the present embodiment is provided with a photo-taking lens settable within the range of focal length of 35mm-70 mm.

Also, when the state of focus lock is being held, the CPU 1b limits the set range of the focal length which is information which affects the result of photographing. That is, it permits a change in the focal length within a certain predetermined range, and inhibits any change in the focal length to the outside of that range. In the present embodiment, it is to be understood that the change in the focal length to the outside of ±5 mm from the current focal length is inhibited. Thus, where the focal length of the photo-taking lens when the release button is half-depressed during the setting of the focus lock holding mode is e.g. 50 mm, the focal length of the photo-taking lens can be changed only between 45 mm-55 mm even if the switches SW8 and SW9 are operated.

The differences of the procedure of the control effected in the CPU 1b from the flow charts of FIGS. 3A and 3B will now be described with reference to the flow charts of FIGS. 13A, 13B and 13C.

Figure 13A:
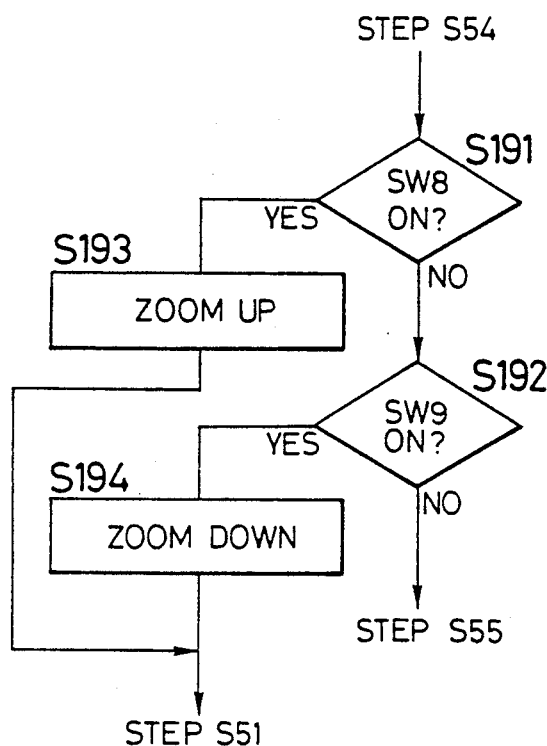
FIGS. 13A, 13B and 13C are flow charts showing the operation of the third embodiment of the present invention.

In FIG. 13A, at step S54, whether the switch SW3 is closed is judged. If the step S54 is negated, advance is made to step S191, where whether the switch SW8 is closed by the operation of the zoom-up button is judged. If the judgment is negative, advance is made to step S193, and if the judgment is affirmative, zoom-up processing is effected at step S192. That is, the zoom lens is driven by the zoom motor 28 through the motor driving circuit 11a to thereby change the focal length to the telephoto side. Thereafter, the process returns to step S51. At step S193, whether the switch SW9 is closed by the operation of the zoom-down button is judged, and if the judgment is negative, advance is made to step S55, and if the judgment is affirmative, zoom-down processing is effected at step S194. That is, the zoom lens is driven by the zoom motor 28 through the motor driving circuit 11b to thereby change the focal length to the wide angle side. Thereafter, the process returns to step S51. By the operation of the zoom-up button and the zoom-down buttton, the focal length of the photo-taking lens can be changed within a range of 35 mm-70 mm.

Figure 13B:
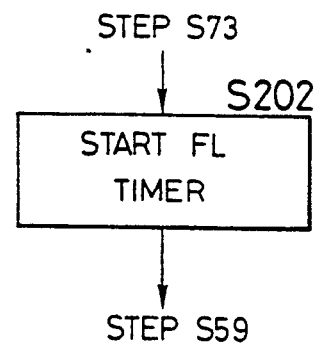

FIG. 13B will now be described. At step S73, the display of the focus lock holding mode is effected by the liquid crystal display device 25 and further, at step S202, the focus lock timer is started and advance is made to step S59.

Figure 13C:
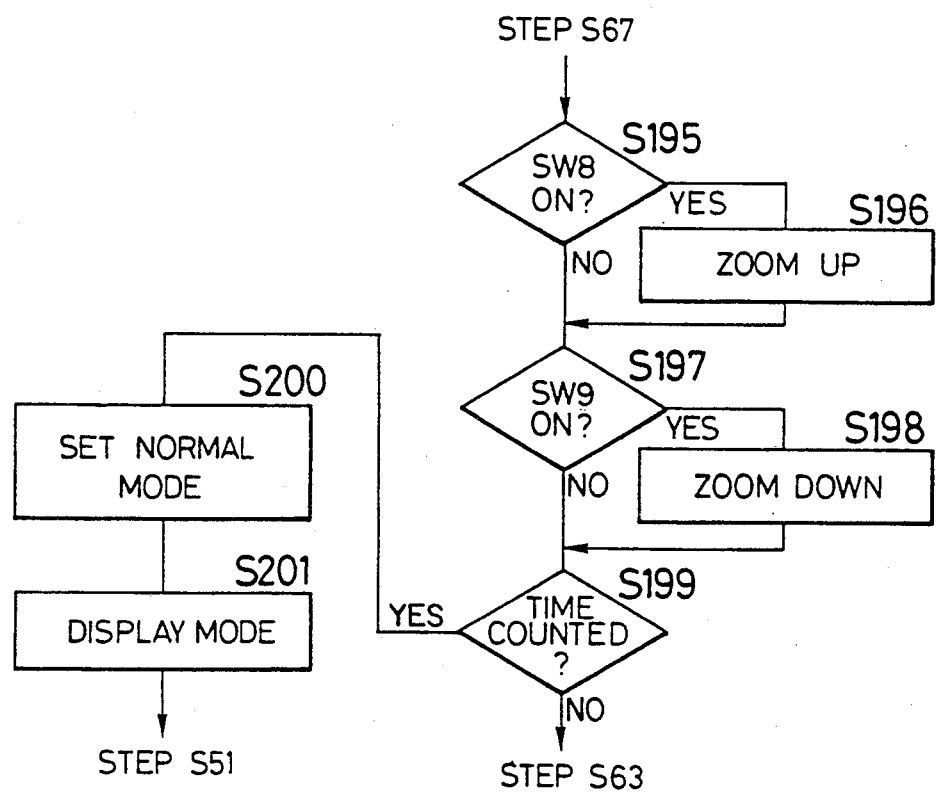

FIG. 13c will now be described. At step S67, whether the mode is the focus lock holding mode is judged. If the step S67 is affirmed, advance is made to step S195, and if the step S67 is negated, return is made to step S51. At step S195, whether the switch SW8 is closed is judged. If the step S195 is negated, advance is made to step S197, and if the step S195 is affirmed, zoom-up processing is effected at step S196. At step S197, whether the switch SW9 is closed is judged, and if the judgment is negative, advance is made to step S199, and if the judgment is affirmative, zoom-down processing is effected at step S198. However, the zoom-up and zoom-down processing is possible only within the range of ±5 mm from the current focal length, and even if the switch SW8 or SW9 continues to be operated to set a focal length outside this range, it is not accepted.

At step S199, whether a predetermined time has elapsed after the focus lock timer has been started at step S198 is judged, and if the judgment is negative, return is made to step S63, and if the judgment is affirmative, the normal mode is set at step S200 and the display of the normal mode is effected by the liquid crystal display device 25 at step S201, whereafter return is made to step S51.

At step S106, the LED 15 in the finder is turned off, and at step S68, the luminance information from the photometering circuit 2 is read and advance is made to step S69.

If at step S199, a predetermined time has elapsed after the holding of the focus lock state has been started, the process goes through the above-described loop and proceeds from step S199 to step S200, where the setting of the normal mode is effected, and then at step S201, the display of the normal mode is effected, whereafter return is made to step S51. That is, the holding of the focus lock is released. According to this, even if the holding of the focus lock is not released when the holding of the focus has been effected but focus lock photographing is not effected, for example, when the photographer has requested another person to photograph, but the request has been turned down, the holding of the focus lock state will be automatically released when a predetermined time elapses, and therefore operability is improved.

Further, if the closing of the switches SW8 and SW9 is determined at step S195 or S197 when the focus lock state is being held, zoom up processing and zoom-down processing are effected at steps S196 and S198. In this case, however, zoom-up and zoom-down are permitted within the range of ±5 mm from the current focal length, and any change to the focal length outside that rang is inhibited.

According to this, when the photographer requests a third person to photograph after the operation of holding the focus lock has been effected, even if the third person operates the zoom-up button or the zoom-down button by mistake, the focal length will not change greatly and thus, an undesired photograph will be prevented from being taken.

In the foregoing, when the focus lock state is being held, the zoom-up and zoom-down operations are permitted within the range of ±5 mm, but the present invention is not limited thereto. The range within which the zoom-up and zoom-down operations are permitted may be more or less than ±5 mm, or the range of permission need not be provided and zoom-up and zoom-down may be completely inhibited. Also, there has been shown an example in which use is made of a zoom lens whose focal length is settable between 35 mm to 70 mm during the normal time, but the present invention can also be applied to a camera provided with a zoom lens which is settable to other focal lengths. Further, the present invention is not restricted to a camera provided with a zoom lens, but is also applicable to a multifocus camera provided with a lens capable of stepwise setting of the photo-taking lens to a plurality of preset focal lengths.

Furthermore, there has been shown an example in which limitation of zoom-up and zoom-down is effected, but for example, in a camera wherein exposure information such as shutter speed, aperture value and film speed can be manually changed and set, when the focus lock state is being held, and change therein may be inhibited even if the operating member for setting these is operated. According to this, even if a third person requested to photograph operates the operating member by mistake, the exposure information will not change and an undesired photograph will be prevented from being taken.

A fourth embodiment will now be described. The fourth embodiment has as its task the solution to a case where such a focus lock state in which the photo-taking lens is focused not to an object to which it should originally be focused, out to the background (such as, for example, a tree) due to some factor or other is held. For example, there are known many cameras of the so-called center distance measurement type in which distance is measured to an object observed in a narrow distance measuring zone provided at the central portion of the finder view field, but in such cameras of the center distance measurement type, the range of distance measurement is limited to the central portion of the picture plane and therefore, when an object to which the photo-taking lens should originally be focused exists in the marginal portion of the picture plane which is off the distance measuring zone, the measured distance value for focusing the lens to this object cannot be obtained.

The fourth embodiment is an embodiment of a camera which can reliably obtain a photograph in focus to a desired object without holding a wrong focus lock state.

The fourth embodiment of the present invention is shown in the flow-chart of FIG. 14. FIG. 14 partly overlaps the steps of FIGS. 9A and 9B. Steps S211–S214 are the same as the steps S91–S95 of FIG. 9A. A block diagram corresponding to the flow chart of FIG. 14 is FIG. 4.

At step S216, whether the mode is the focus lock holding mode is judged. This judgment is accomplished by examining whether the focus lock holding flag is set. If the step S216 is affirmed, advance is made to step S213, and if the step S216 is negated, advance is made to step S217. Steps S217–S222 are the same as the steps S97–S102 of FIG. 9A.

At step S223, whether the distance information read and stored by the half depression operation of the release button of steps S213 and S214 is a value corresponding to infinity is judged. If the judgment is negative, advance is made to step S217, and if the judgment is affirmative, advance is made to step S224.

At step S224, the distance information is rewritten from infinity into a predetermined value corresponding to a short distance and also, this effect is displayed by the display device 25. This predetermined value is a value corresponding to the over focal length of the photo-taking lens and thereby, it becomes possible to focus the photo-taking lens substantially to infinity.

At step S225, the process of again determining whether the light emission of the electronic flash device is necessary depending on the luminance of the object is carried out. This process is a process similar to the process carried out at step S95, but as compared with the step S95, the luminance limit of the light emission is set to a higher value. That is, even the luminance for which the light emission has been judged as being unnecessary at step S95 is regarded as luminance for which the light emission is necessary at this step S225.

At step S226, whether the mode is the focus lock mode is judged.

At step S227, luminance information is read from the photometering circuit 2.

At step S228, processing similar to the steps S70–S72 and S79 of FIG. 3B is effected.

At step S230, whether the distance information has been rewritten is further judged. If the judgment is affirmative, advance is made to step S231.

At step S231, the reading of the photometric information with the focus lock holding mode taken into account is effected.

Figure 15:
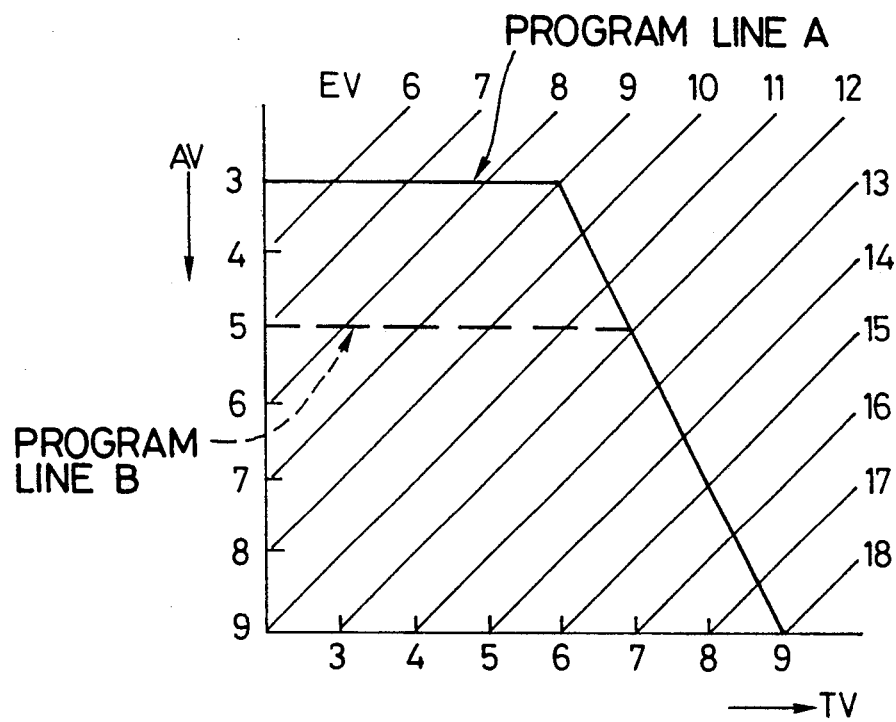
FIG. 15 shows the exposure program of the fourth embodiment of the present invention.

Here, the reading of the photometric information in the focus lock holding mode will be described with reference to FIG. 15. FIG. 15 is a program graph showing the program of the aperture value and the shutter time in the fourth embodiment.

In FIG. 15, the vertical axis represents the aperture value (Av), the horizontal axis represents the shutter time (Tv) and the leftwardly downward lines represent the exposure amount (Ev), and correspondingly to the exposure amount, the combination of the aperture value and the shutter time is designed to be set to one.

The program line A indicated by a solid line in FIG. 15 is set correspondingly to the normal photographing. The program line A is designed such that $Av=3$, that is, the open aperture value of F2.8 is kept constant until the exposure amount exhibits $Ev=9$, and when the exposure amount exceeds $Ev=9$, the aperture value is continuously varied so as to be great (the aperture opening is varied so as to be small) and the shutter time is continuously varied so as to be short, whereby proper exposure conforming to the exposure amount is obtained. For example, when the exposure amount exhibits $Ev=10$, the aperture value exhibits approximately $Av=4$ and the shutter time exhibits approximately $Tv=6$, that is, they are set to F4 and 1/60 (second), respectively.

The program line B indicated by a broken line is set correspondingly to the focus lock holding mode photographing. The program line B is designed such that $Av=5$, that is, the aperture value of F5.6 is kept constant until the exposure amount assumes $Ev=12$, and when the exposure amount exceeds $Ev=12$, like the aforedescribed program line A, the aperture value and the shutter time are continuously varied, that is, the aperture value is continuously varied so as to be great (the aperture opening is varied so as to be small) and the shutter time is continuously varied so as to be short, whereby proper exposure conforming to the exposure amount is obtained. For example, when the exposure amount exhibits Ev=8, the aperture value and the shutter time exhibit Av=5 and Tv=3, respectively, that is, they are set to F5.6 and ⅛ (second), respectively.

Here, when the program line A corresponding to the normal photographing and the program line B corresponding to the focus lock holding mode photographing are compared with each other, the clear differences therebetween are the aperture value and the shutter time until the exposure amount exceeds Ev=12.

In the same exposure amount until Ev=12 is exceeded, the aperture value set by the program line B increases more than the aperture value set by the program line A. That is, the diameter of the aperture opening is reduced. Also, the shutter time set by the program line B is more extended than the shutter time set by the program line A. For example, when the exposure amount exhibits Ev=10, in the program line A, the aperture value is set to approximately F4 and the shutter time is set to approximately 1/60 (second). In contrast, in the program line B, the aperture value is set to F5.6 and the shutter time is set to 1/30 (second). Accordingly, the focus lock holding mode photographing is effected with the exposure amount kept identical to that during the normal photographing and yet with the aperture opening reduced and the shutter time extended.

The mechanism capable of changing the aperture value and the shutter time in this manner while keeping the exposure amount identical is called program shift, and in this case, the focus lock holding mode photographing is effected with the purport of reducing the aperture opening more than during the normal photographing to thereby deepen the depth of field and make the focusing substantially to infinity possible.

In the flow chart of FIG. 14, at step S232, whether the focus lock holding signal has been output by the operation of the operating member 23 is judged. If the judgment is affirmative, advance is made to step S234, and if the judgment is negative, advance is made to step S233. Step S234 is the same as the steps S115–S119 of FIG. 9B.

Figure 16:
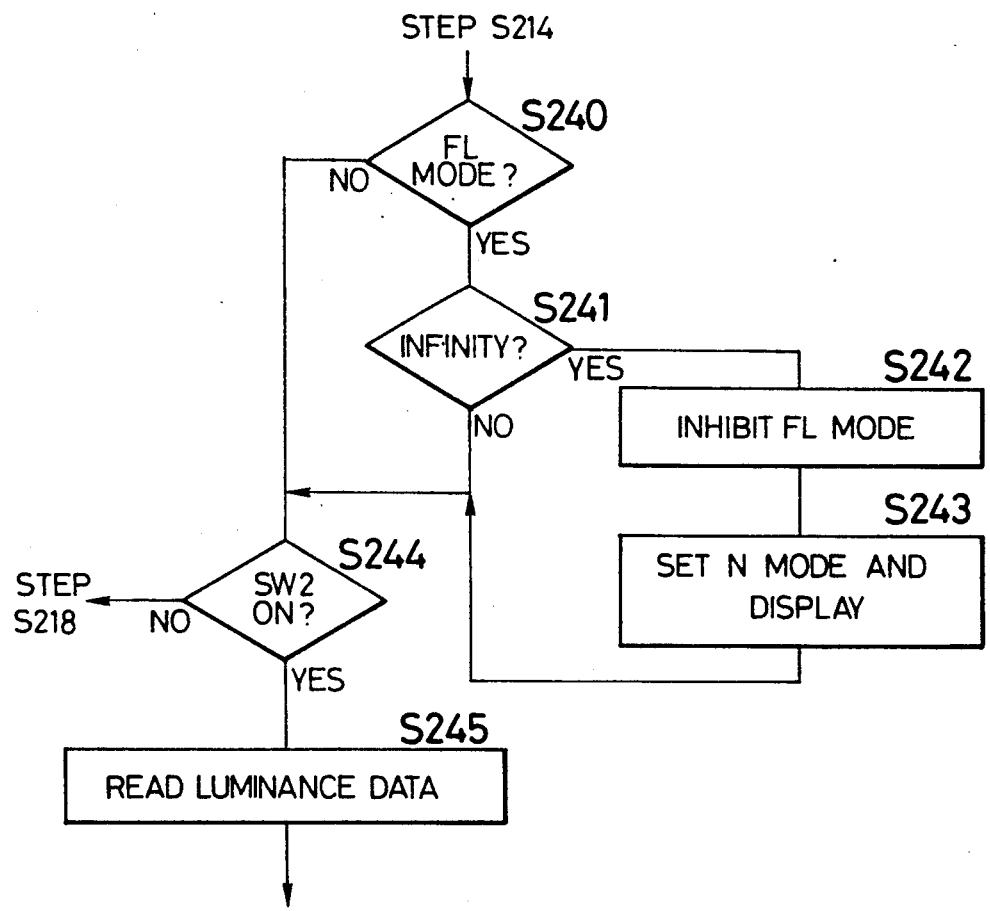
FIG. 16 is a flow chart showing the operation of a modification of the fourth embodiment.

A modification of the fourth embodiment will now be described with reference to the flow chart of FIG. 16, but the flow of the control procedure of FIG. 16 is substantially similar to that of FIG. 14, and in FIG. 16, the processes of steps S224, S225, S230 and S231 in the flow chart of FIG. 14 are not carried out. That is, in FIG. 14, if it is judged that the distance information is a value corresponding to infinity, the distance information is rewritten into a value corresponding to the over focal length of the photo-taking lens, and further, the propriety of the light emission of the electronic flash device whose emitted light luminance limit has been set to a rather high value is determined and furthermore, program shift is effected to reduce the aperture opening in the reading of the photometric information.

In contrast, in FIG. 16, the design is such that if it is judged that the distance information is a value corresponding to infinity, at step S242, the focus lock holding mode is released and at step S243, the normal photographing mode is set. In this case, liquid crystal display is effected at the same time, whereby the photographer is informed of this effect and also is urged to effect the reading of the distance information again and therefore, a failure in photographing can be obviated.

Figure 17:
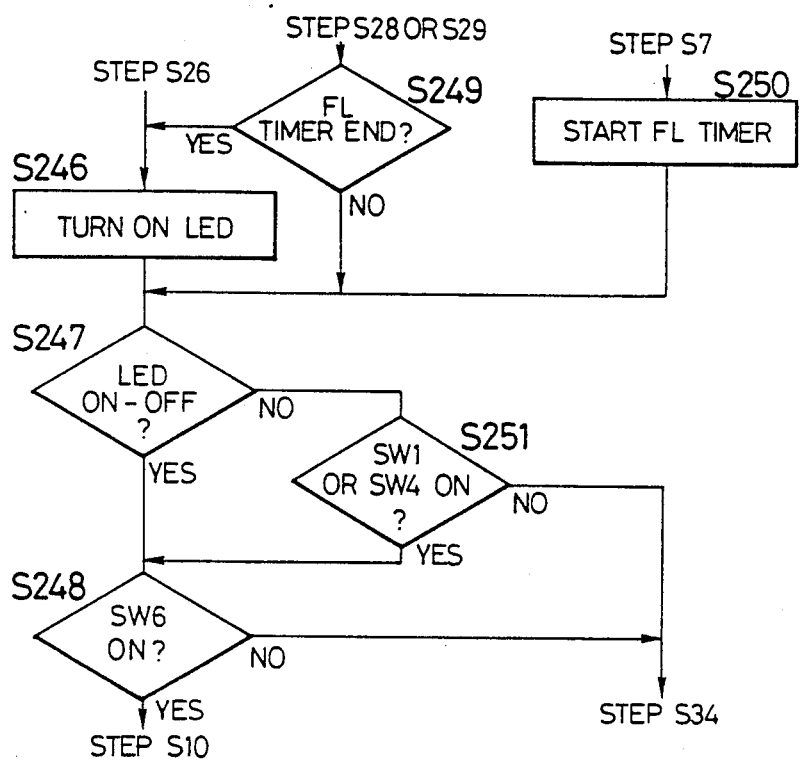
FIG. 17 is a flow chart showing the operation of a fifth embodiment of the present invention.

A fifth embodiment of the present invention will now be described. The fifth embodiment is designed such that when a predetermined time elapses after the holding of the focus lock is started, the holding of the focus lock is released. Since the fifth embodiment performs an operation partly overlapping the flow chart of FIG. 2B, the operation of the fifth embodiment shown in FIG. 17 is shown as to only the characteristic portions thereof.

At step S7 shown in FIG. 2A, the LED 15 in the finder is turned on and off and also, at step S250, the focus lock timer is started, and then advance is made to step S247. The step S247 is the same as the step S8 of FIG. 2A.

If at the step S28 of FIG. 2A, the answer is affirmative, advance is made to step S249, and if the answer is negative, the focus lock holding flag FLH is set at the step S29 of FIG. 2A, and advance is made to step S249. At step S249, whether the time counting by the focus lock timer has been completed is judged.

At step S247, as at the step S8 of FIG. 2A, whether the LED 15 is being turned on and off is judged. At step S251, whether the switch SW1 or SW4 is closed is judged. If the judgment is affirmative, advance is made to step S248, and if the judgment is negative, at the step S34 of FIG. 2A, the focus lock holding flag FLH is reset to terminate the processing.

By the construction as described above, when a predetermined time elapses after the holding of the focus lock state has been started, advance is made from step S249 to step S246, where the LED 15 is turned on. Thereafter, step S247 is negated, and if at step S251, it is judged that the half-depression switch SW1 is not closed, at step S34, the focus lock holding flag FLH is reset to terminate the processing. That is, the holding of the focus lock is released. According to this, where the holding of the focus lock has been effected but focus lock photographing is not effected, for example, where the photographer has requested another person to photograph but the request has been turned down, even if the operation of releasing the holding of the focus lock is not performed, the holding of the focus lock state is automatically released when a predetermined time elapses and therefore, the operability is improved.

Further, when the focus lock holding button is again depressed and the switch SW3 is again closed when the program is going around the loop of steps S3, S25, S28, S249, S8–S12 and S3, the process goes through said loop and the holding of the focus lock is released.

In the above-described embodiments, a description has been given with respect to a case where the focus lock holding operating member is operated with the half depression operation to thereby hold the focus lock state, and a first modification of the fifth embodiment will now be described with reference to FIGS. 18A and 18B. This modification is designed such that when the focus lock holding operating member is operated in advance to set the focus lock holding mode and thereafter the release button is half-depressed, the focus lock state is held. A block diagram corresponding to FIG. 17 is FIG. 1. A block diagram corresponding to FIGS. 18A and 18B is FIG. 4.

Figure 18A:
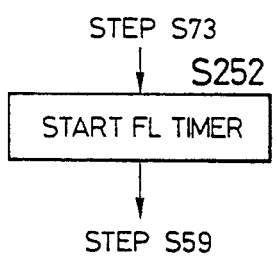
FIGS. 18A and 18B are flow charts showing the operation of a first modification of the fifth embodiment.
Figure 18B:
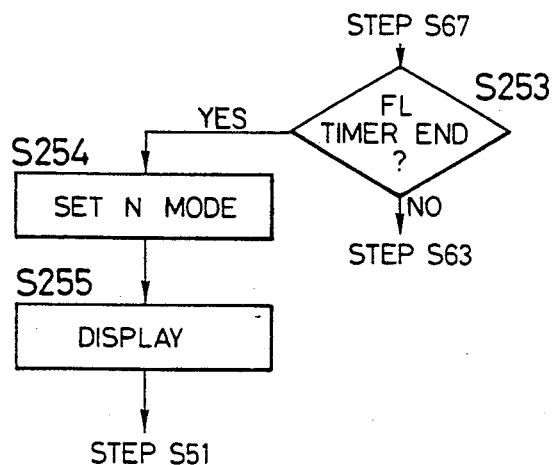

The first modification of the fifth embodiment performs an operation overlapping the operation of FIGS. 3A and 3B and therefore, the characteristic portions thereof are shown in FIGS. 18A and 18B. When as shown in FIG. 18A, the FL mode is displayed at the step S73 of FIG. 3A, the focus lock timer is started at step S40 and advance is made to the step S59 of FIG. 3A. At step S59, whether the focus lock holding switch SW3 is closed is judged.

At the step S67 of FIG. 3B, whether the mode is the focus lock holding mode is judged. If the step S67 is affirmed, advance is made to step S253, and if the step S67 is negated, return is made to the step S51 of FIG. 3B.

At step S253, whether a predetermined time has elapsed after the focus lock timer has been started is judged, and if the judgment is negative, return is made to the step S63 of FIG. 3B, and if the judgment is affirmative, at step S254, the normal mode is set and also, at step S255, the display of the normal mode is effected by the liquid crystal display device 25, whereafter return is made to step S51.

Figure 19:
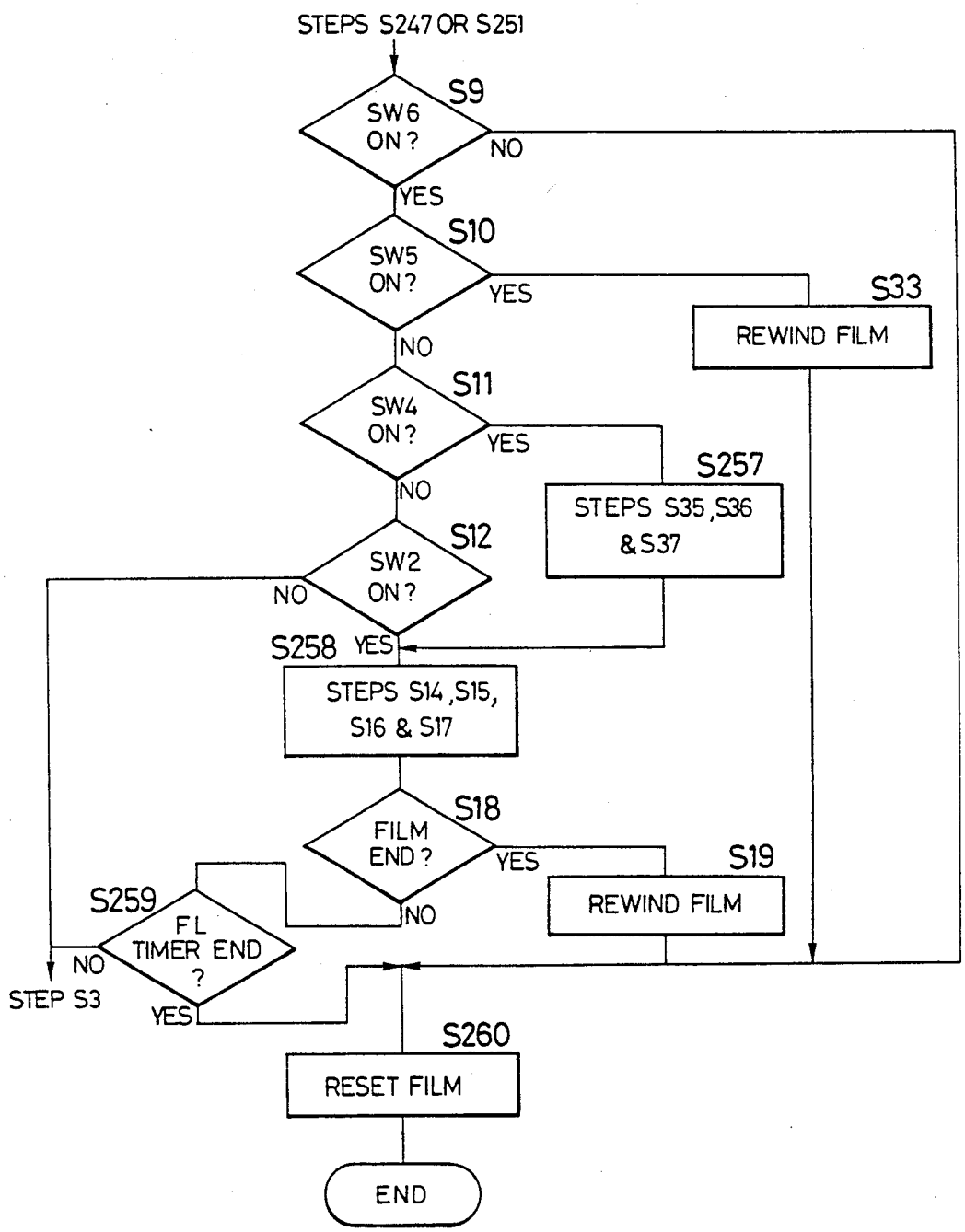
FIG. 19 is a flow chart showing the operation of a second modification of the fifth embodiment.

A second modification of the fifth embodiment is shown in FIG. 19. In FIG. 19, if at step S12, the closing of the full depression switch SW2 is affirmed, advance is made to step S258 without the focus lock holding flag FLH being reset. If after the processing conforming to steps S14-S17, step S18 is negated, at step S259, whether a predetermined time has elapsed after the focus lock timer has been started is judged. If the step S259 is affirmed, at step S259, the focus lock holding flag is reset to terminate the processing, and if the step S259 is negated, return is made to step S3, and the processing of step S3 and subsequent steps is effected. Further, if steps S247 and S251 are negated, advance is made to step S260, and if step S10 is affirmed, step S33 is passed through and advance is made to step S260.

According to this, until a predetermined time elapses after the holding of the focus lock state, the holding of the focus lock continues even if the photographing by the closing of the switch SW2 is effected and therefore, in addition to the effects of the above-described embodiment, for example, the focus lock holding operation need not be performed each time the photographer requests a third person to take a plurality of photographs on end, and the operability is improved.

Figure 20A:
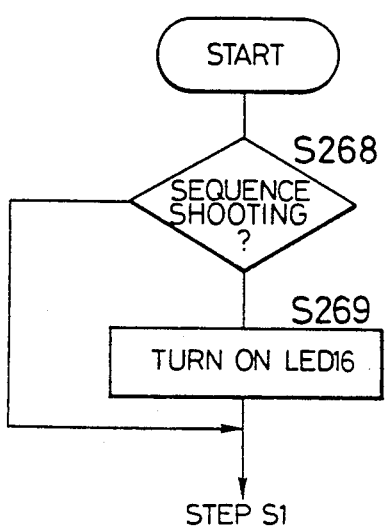
FIGS. 20A and 20B are flow charts showing the operation of a third modification of the fifth embodiment.
Figure 20B:
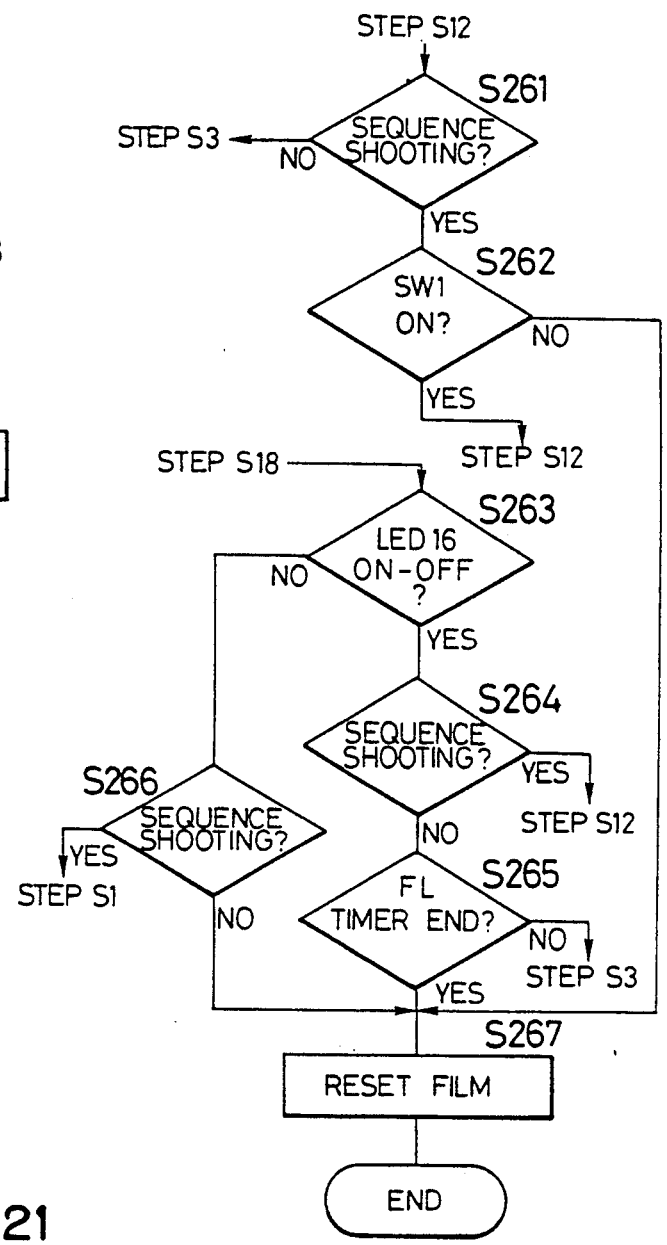

FIGS. 20A and 20B show the flow charts of a third modification of the fifth embodiment. Here is shown the procedure of the processing when sequence shooting is effected when the focus lock is held.

Figure 21:
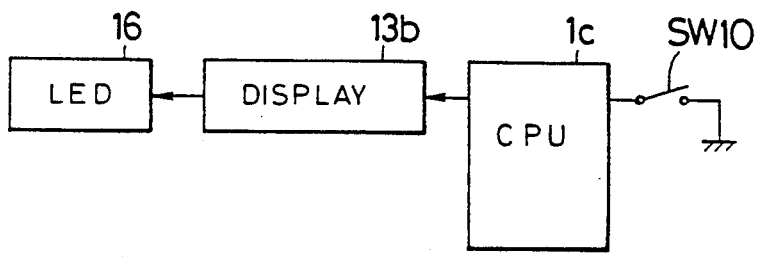
FIG. 21 is a block diagram showing portions of the construction of the third modification of the fifth embodiment.

FIG. 21 is a block diagram showing portions of the construction of the third modification. A sequence shooting switch SW10 is connected to CPU 1C, and LED 16 for displaying the sequence shooting mode in the finder is connected to a display circuit 13b. In the other points, the construction of this third modification is the same as the construction of FIG. 1. The sequence shooting switch SW8 is a switch adapted to be closed in response to the operation of a sequence shooting mode setting button, and the CPU 1C turns on the LED 16 and sets the sequence shooting mode when the switch SW10 is closed. When the full depression switch SW2 is closed during the setting of the sequence shooting mode, shutter release takes place a plurality of times on end as long as the switch SW2 is closed.

Figure 2B:
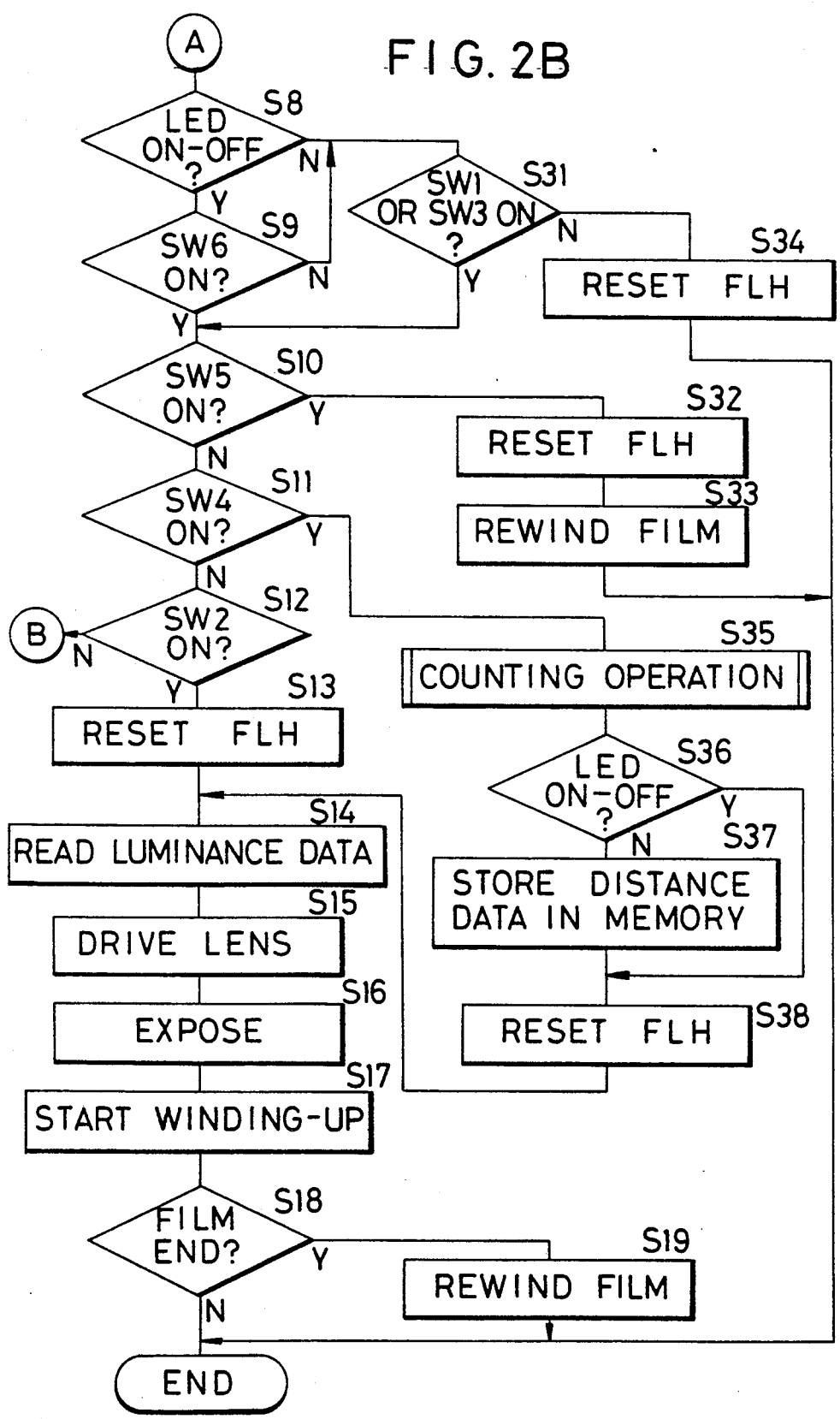

FIGS. 20A and 20B show the characteristic portions of the third modification, and in the other points, these figures are the same as FIGS. 2A and 2B. In FIG. 20A, when the half depression switch SW1 or the self switch SW4 is closed, this program is executed and first, at step S268, whether the sequence shooting mode is set is judged. If the judgment is negative, advance is made to step S1, and if the judgment is affirmative at step S269, the sequence shooting mode displaying LED 16 is turned on, and then advance is made to step S1.

Also, if step S12 is negated, advance is made to step S261, where whether the sequence shooting mode is set is judged. If the step S261 is negated, return is made to step S3, and if the step S261 is affirmed, advance is made to step S262. At step S262, whether the half depression switch SW1 is closed is judged, and if the judgment is affirmative, return is made to step S12, and if the judgment is negative, advance is made to step S267.

Further, if step S18 is negated, at step S263, whether the LED 15 is being turned on and off is judged. If the step S263 is affirmed, at step S264, whether the sequence shooting mode is set is judged, and if the judgment is affirmative, return is made to step S12, and if the judgment is negative, advance is made to step S265. At step S265, whether a predetermined time has elapsed after the focus lock timer has been started is judged. If the judgment is negative, return is made to step S3, and if the judgment is affirmative, at step S267, the focus lock holding flag FLH is reset to terminate the processing.

On the other hand, if the step S263 is negated, at step S266, whether the sequence shooting mode is set is judged, and if the judgment is affirmative, return is made to step S1, and if the judgment is negative, advance is made to step S267.

According to the above-described procedure, when the operation of holding the focus lock state is not performed during the setting of the sequence shooting mode, if step S18 is negated after the photographing of steps S13-S17, step S263 is negated, and then step S266 is affirmed and return is made to step S1, and the processing of step S1 and subsequent steps is repeated. That is, distance measurement is effected each time the photographing of each frame is effected during sequence shooting. In contrast, when the operation of holding the focus lock state is performed during the sequence shooting mode, step S18 is negated, whereafter step S263 is affirmed, and then step S264 is affirmed and return is made to step S12. That is, distance measurement is not effected each time the photographing of each frame is effected, but sequence shooting is effected on the basis of the distance information stored at first. Accordingly, if the focus lock holding operation is performed when sequence shooting is effected, the interval of photographing between the frames will become shorter by an amount corresponding to the fact that distance measurement is not effected, whereby speed-up of sequence shooting can be achieved.

Figure 22A:
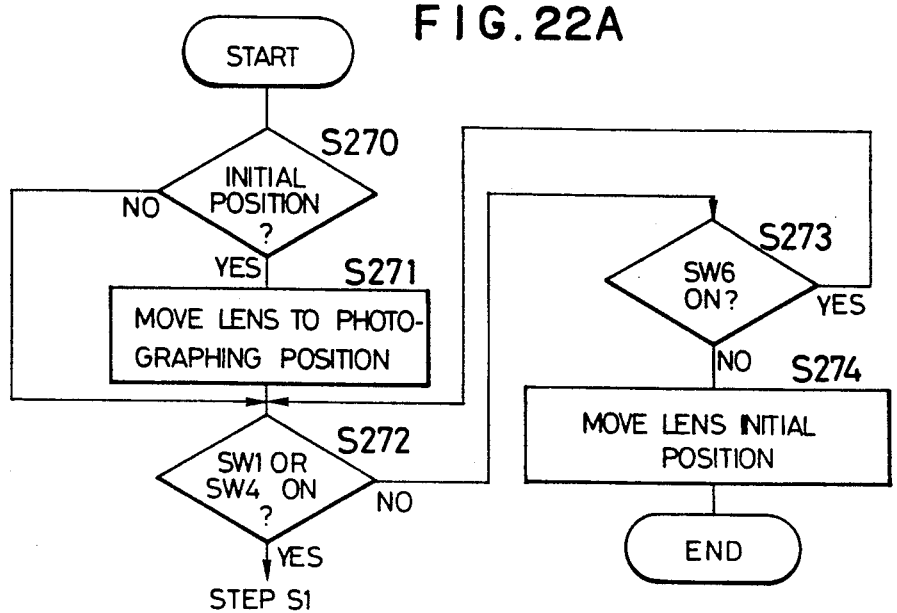
FIGS. 22A, 22B, 23A and 23B are flow charts showing portions of the operation of the third modification of the fifth embodiment.
Figure 22B:
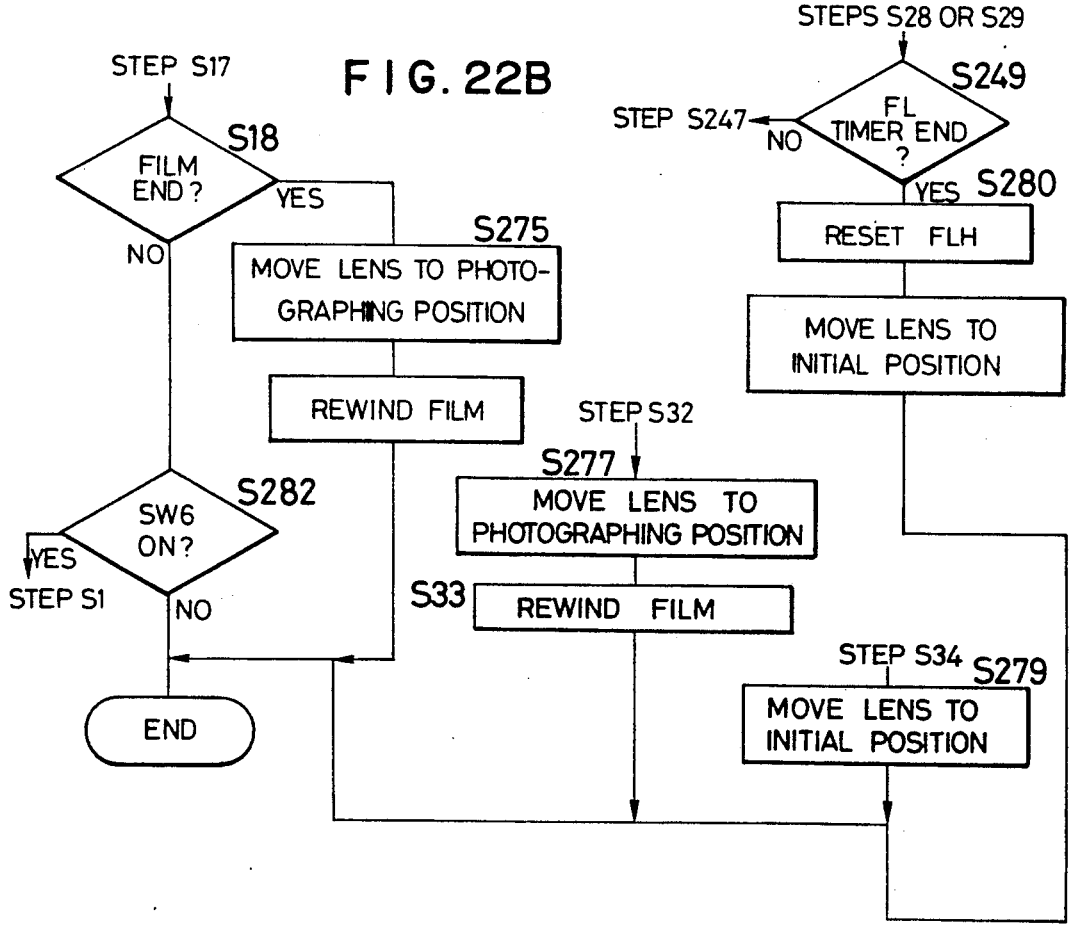

Further, FIGS. 22A and 22B show the procedure of setting the photo-taking lens at the initial position with the release of the focus lock holding.

When the switch Sw6 operatively associated with the photo-taking lens barrier is closed, this program is started and first, at step S270, whether the photo-taking lens is in the initial position in which it is retracted into the interior of the camera body is judged. If the judgment is negative, advance is made to step S272, and if the judgment is affirmative, at step S271, the photo-taking lens is driven to the photographing position, and then advance is made to step S272. The photographing position is a position at which photographing is possible, such as the wide angle position or the telephoto position. At step S272, whether the half depression switch SW1 or the self switch SW4 is closed is judged. If the judgment is affirmative, advance is made to step S1, and if the judgment is negative, at step S273, whether the switch SW6 is closed is judged. If the step S273 is affirmed, return is made to step S272, and if the step S273 is negated, at step S274, the photo-taking lens is driven to the initial position to thereby terminate the processing.

Also, if at step S249, it is judged that a predetermined time has elapsed after the focus lock timer has been started, at step S280, the focus lock holding flag FLH is reset, whereafter at step S281, the photo-taking lens is driven to the initial position to thereby terminate the processing.

Further, if at step S9, it is judged that the power source switch SW6 is not closed, at step S34, the focus lock holding flag FLH is reset and at step S279, the photo-taking lens is driven to the initial position to thereby terminate the processing. Furthermore, if at step S10, the closing of the switch SW5 is affirmed, at step S32, the focus lock holding flag FLH is reset and at step S277, the photo-taking lens is driven to the initial position, whereafter at step S33, the film is rewound to thereby terminate the processing. Also, when at step S18, it is judged that the film has been wound up to its terminal end, at step S275, the photo-taking lens is driven to the initial position, whereafter at step S19, the film is rewound to thereby terminate the processing.

If step S18 is negated, at step S282, the state of the switch SW6 is judged, and if the switch SW6 is ON, return is made to step S1, and if the switch SW6 is OFF, the processing is terminated.

According to what has been described above, when a predetermined time elapses after the focus lock state is held, the holding of the focus lock state is released and also the photo-taking lens is driven to the initial position and the control of the CPU is terminated and therefore, for example, when the photographer has requested a third person to photograph but a predetermined time has passed and the focus lock holding mode has been released before photographing is effected, photographing becomes impossible and thus, an undesired photograph is not taken by mistake. Also, it can be readily seen by the photo-taking lens being driven to the initial position that the focus lock holding mode has been released.

When a predetermined time has elapsed and the focus lock holding mode has been released, movement of the photo-taking lens need not be effected, but the processing of the CPU 1 may only be terminated.

Figure 23A:
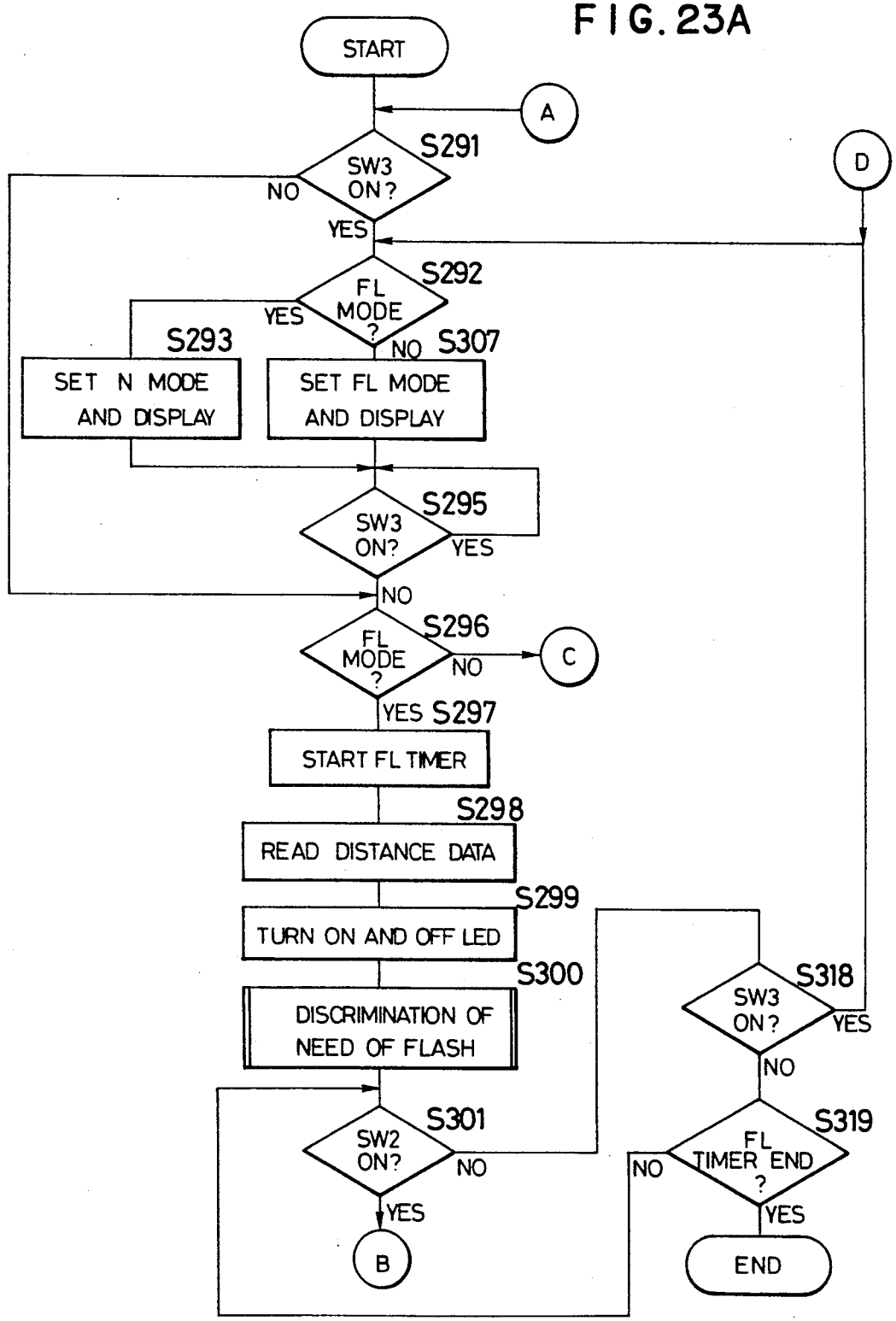
Figure 23B:
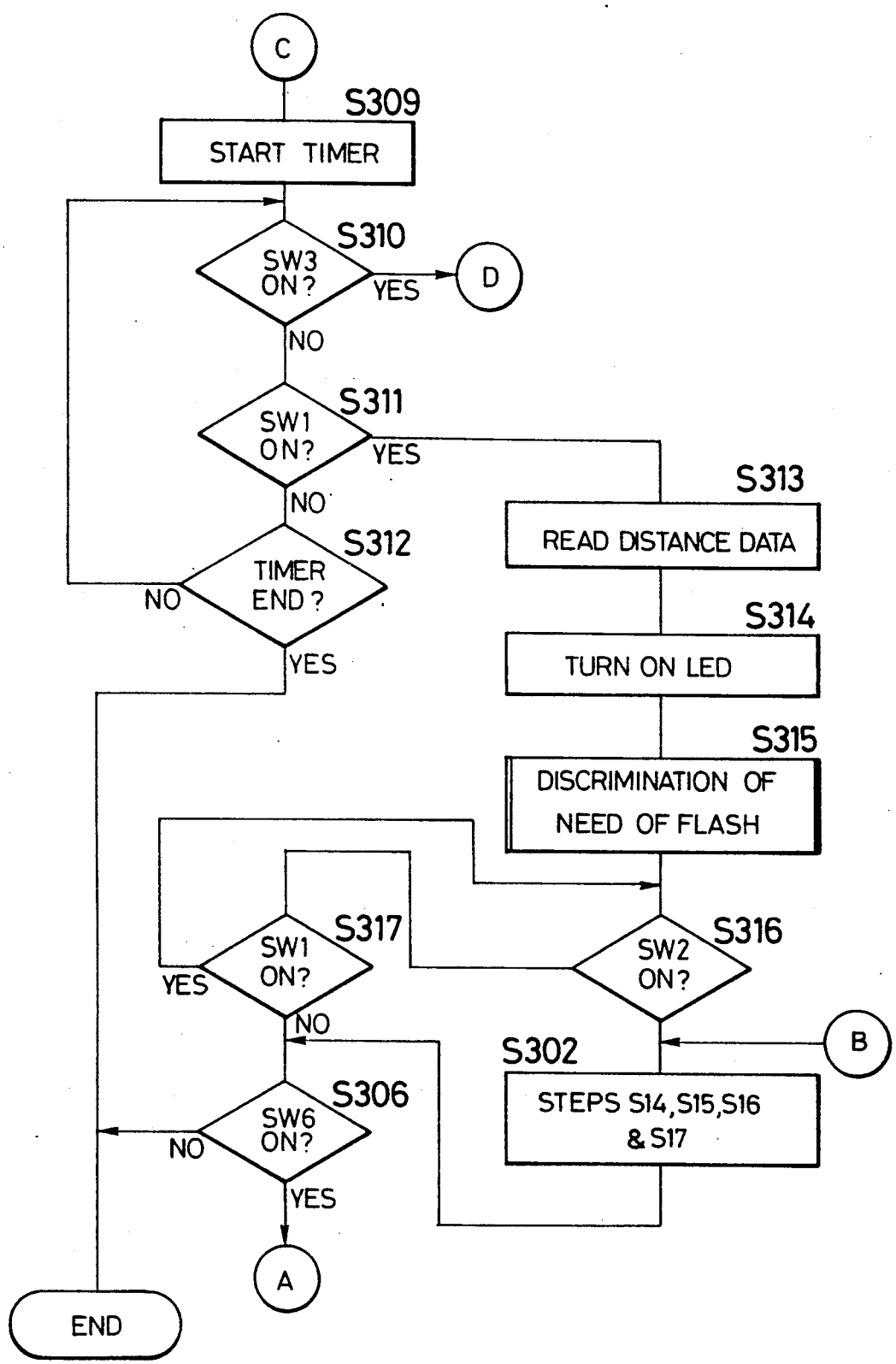

FIGS. 23A and 23B show the processing when the focus lock holding switch SW3 has been closed even in the OFF state of the power source switch SW6.

In FIGS. 23A and 23B, when the power source switch SW6 or the focus lock holding switch SW3 is closed this program is started and first, at step S291, whether the focus lock holding switch SW3 is closed is judged. If the judgment is negative, advance is made to step S296, and if the judgment is affirmative, at step S292, whether the focus lock holding mode is set is judged. If the step S292 is affirmed, at step S293, the normal mode is set and the display of the normal mode is effected by the liquid crystal display device 25, and if the step S292 is negated, at step S307, the focus lock holding mode is set and also the display of the focus lock holding mode is effected, and advance is made to step S295.

At step S295, whether the switch SW3 is closed is judged, and if the judgment is negative, the program stays at the step S295 until the judgment becomes affirmative, whereafter advance is made to step S296. At the step S296, whether the focus lock holding mode is set is judged, and if the judgment is affirmative, advance is made to step S297. At the step S297, the focus lock timer is started, and then at step S298, the distance information is read and stored, and advance is made to step S299. At the step S299, the LED 15 is turned on and off, and then at step S300, the process of determining whether the light emission of the flash device is necessary is carried out, and advance is made to step S301. At the step S301, whether the full depression switch SW2 is closed is judged, and if the judgment is affirmative, advance is made to step S302.

At the step S302, the operation of steps S14–S17 is performed. At step S306, whether the switch SW6 is closed is judged, and if the judgment is affirmative, the processing is terminated, and if the judgment is negative, return is made to step S291.

Also, if step S301 is negated, at step S318, whether the switch SW3 is closed is judged. If the step S318 is affirmed, return is made to step S292, and if the step S318 is negated, at step S319, whether a predetermined time has elapsed after the focus lock timer has been started is judged. If the step S319 is affirmed, the processing is terminated and if the step S319 is negated, return is made to step S311.

On the other hand, if at step S296, it is judged that the mode is not the focus lock holding mode, advance is made to step S309, where the normal timer is started. Then, at step S310, whether the switch SW3 is closed is judged, and if the judgment is affirmative, return is made to step S292, and if the judgment is negative, advance is made to step S311. At the step S311, whether the half depression switch SW1 is closed is judged, and if the judgment is negative, advance is made to step S312. At the step S312, whether a predetermined time has elapsed after the normal timer has started time counting is judged, and if the judgment is affirmative, the processing is terminated, and if the judgment is negative, return is made to step S310.

If step S311 is affirmed, advance is made to step S313, where the distance information from the distance measuring circuit 3 is read and stored. Then at step S314, the LED 15 is turned on. Then at step S315, the process of determining whether the light emission of the flash device is necessary is carried out, and advance is made to step S316. At the step S316, whether the full depression switch SW2 is closed is judged, and if the judgment is affirmative, advance is made to step S311, and if the judgment is negative, advance is made to step S317. At the step S317, whether the half depression switch SW1 is closed is judged, and if the judgment is affirmative, return is made to step S316, and if the judgment is negative, advance is made to step S306.

According to what has been described above, when the focus lock holding button is operated even in the OFF state of the power source switch SW6, the CPU 1 operates and step S291 is affirmed, whereafter steps S292, S307, S297 and S295–S297 are passed through and at step S298, storage of the distance information is effected, whereafter as long as the switches SW2 and SW3 are not closed, the process proceeds to steps S299–S301 and goes around the loop of steps S301, S318, S319, S301, . . . In this loop, there is not the judgment of the state of the half depression switch SW1 and therefore, even if the half depression operation of the release button is released, the focus lock state is held. Thus, the closing operation of the power source switch SW6 can be omitted and the operability is improved.

A sixth embodiment will now be described.

The sixth embodiment is designed such that when the focus lock is being held, photometering is effected with the releasing operation (for example, the full depression operation) and exposure is controlled on the basis of the photometered value so that in any case, photographing may be accomplished with proper exposure.

Figure 24A:
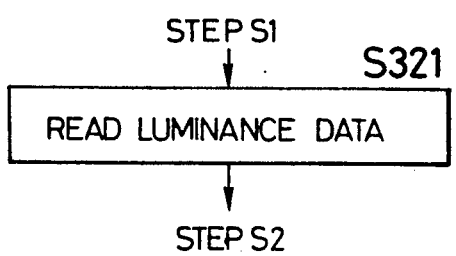
FIGS. 24A, 24B and 24C are flow charts showing the operation of a sixth embodiment of the present invention.
Figure 24C:
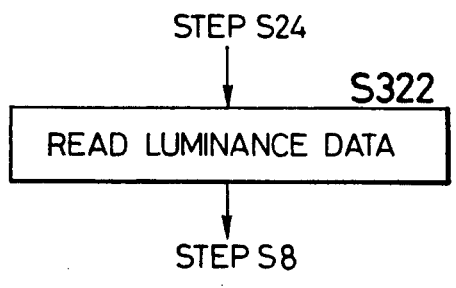
Figure 24B:
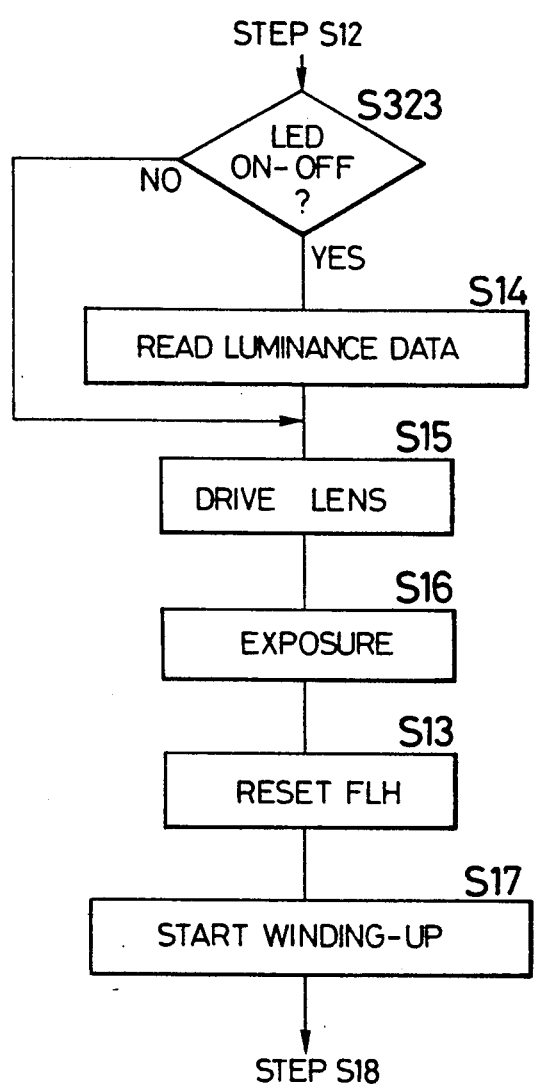

The characteristic portions of the operation of the sixth embodiment are shown in the flow charts of FIGS. 24A, 24B and 24C. The portions of the operation of the sixth embodiment which overlap FIGS. 2A and 2B are omitted.

As shown in FIG. 24A, at step S1, the distance information from the distance measuring circuit 3 is read, and this distance information is stored in the memory area. That is, focus lock is effected. Then at step S321, the luminance information from the photometering circuit 2 is read, and this luminance information is stored in the memory area. That is, AE lock is effected. Thereafter, at step S2, the process of determining whether the light emission of the electronic flash device is necessary depending on the luminance of the object is carried out.

Also, as shown in FIG. 24C, at step S24, the distance information from the distance measuring circuit 3 is read and stored in the memory area, and at step S322, the luminance information from the photometering circuit 2 is read and stored in the memory area, whereafter advance is made to step S8.

Next, as shown in FIG. 24B, at step S12, whether the full depression switch SW2 is closed is judged, and if the judgment is affirmative, advance is made to step S323, and if the judgment is negative, return is made to step S3. At step S323, whether the LED 15 is turned on and off is judged. If the step S323 is affirmed, at step S14, the luminance information from the photometering circuit 2 is read, and advance is made to step S15, and if the step S323 is negated, step S14 is skipped and advance is made to step S15.

At the step S15, the amount of movement of the lens is calculated on the basis of the distance information stored at one of steps S1, S24 and S37, and the phototaking lens is driven to the focusing position by the motor 9 through the motor driving circuit 11 on the basis of the result of the calculation. Then at step S16, the exposure value is calculated on the basis of the luminance information read at one of steps S321, S322 and S14, and exposure control members such as a stop and a shutter are driven through the exposure control circuit 12 on the basis of the result of the calculation, whereby photographing is accomplished.

A seventh embodiment is designed such that even in a camera capable of sequence shooting, photographing of only one frame is effected when the focus lock holding in which another person is requested to photograph has been effected.

The seventh embodiment, as shown in FIG. 21, has a switch SW10 for the sequence shooting mode, and when the switch SW8 is closed once, a sequence shooting mode setting signal is output, and when the switch SW8 is closed once more, a sequence shooting mode releasing signal is output. The CPU 1c sets the sequence shooting mode with the output of the sequence shooting mode setting signal. When the above-described focus lock holding is not effected during the setting of the sequence shooting mode, photographing is started with the closing of the switch SW2 by the full depression operation, and photographing is continuously effected on a plurality of frames as long as the switch SW2 is closed by continuing the full depression operation. That is, sequence shooting is permitted when the holding of the focus lock is not being effected. Also, the CPU 1c cancels the sequence shooting mode with the output of the sequence shooting mode cancelling signal, and after the cancellation, photographing by only one frame is effected by the closing of the switch SW2 as described above, and no more photographing is effected even if the switch SW2 continues to be closed.

On the other hand, when during the setting of the sequence shooting mode, the focus lock is held by the closing of the switch SW3, the CPU 1c forcibly cancels the sequence shooting mode and effects photographing by only one frame as usual with the closing of the switch SW2.

The procedure of the CPU 1c control according to a seventh embodiment will now be described with reference to the flow charts of FIGS. 25, 26A and 26B.

Figure 25:
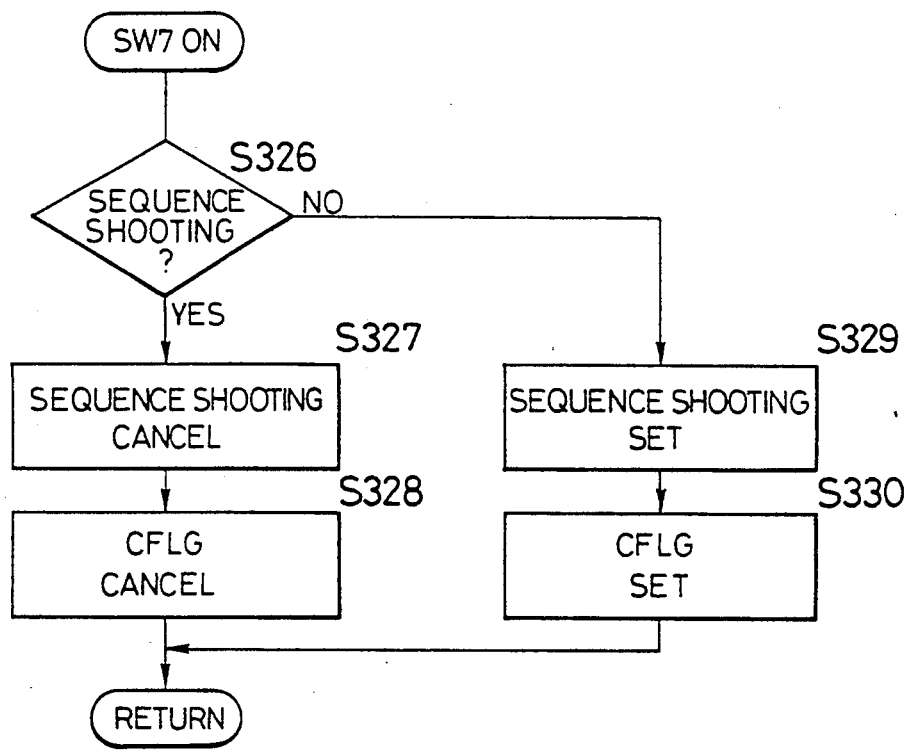
FIGS. 25, 26A and 26B are flow charts showing the operation of a seventh embodiment of the present invention.

When the switch SW10 is closed by the operation of the sequence shooting mode setting button, the program of FIG. 25 is started and first, at step S326, whether the sequence shooting mode is set is judged. If the judgment is affirmative, at step S327, the sequence shooting mode is cancelled and at step S328, a sequence shooting flag CFLG is released and return is made to the normal process. Also, if the step S326 is negated, at step S329, the sequence shooting mode is set and at step S330, the sequence shooting flag CFLG is set and return is made to the normal process.

Figure 26A:
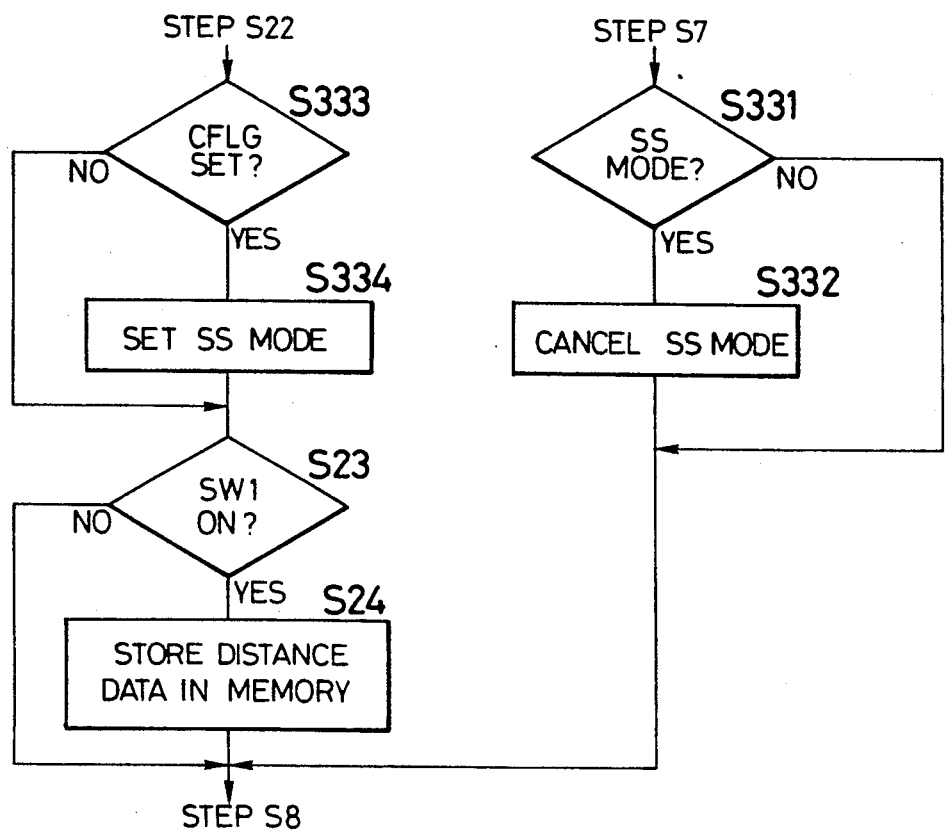
Figure 26B:
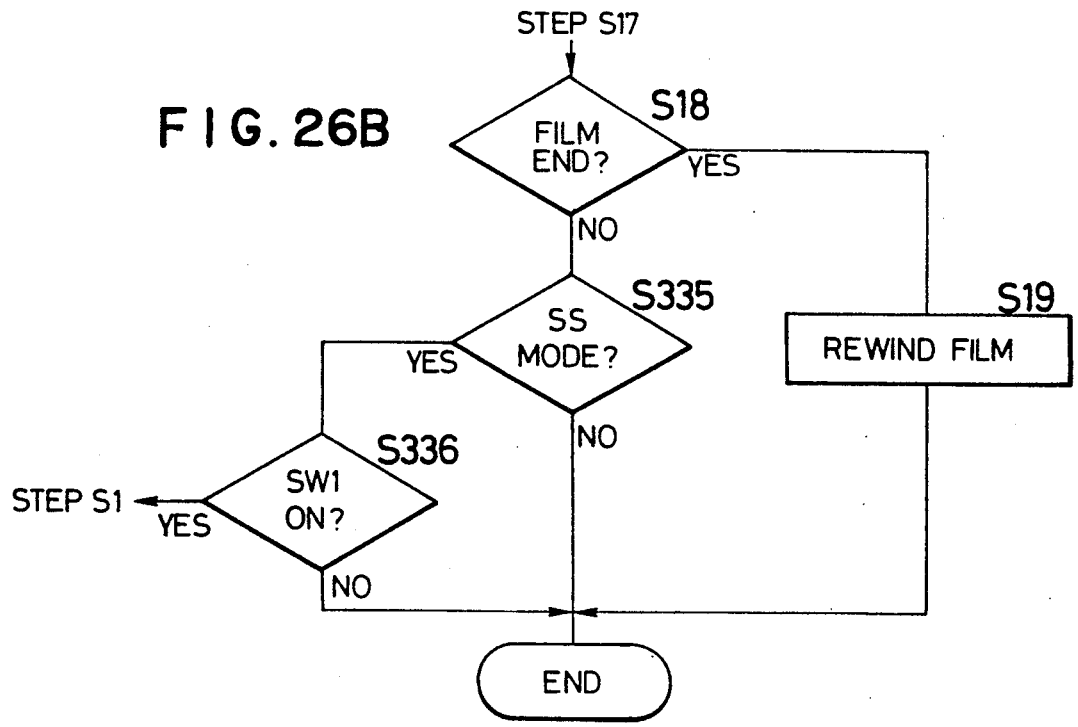

The operation of the seventh embodiment after the half depression switch SW1 or the self switch SW4 has been closed considerably overlaps the operation shown in FIGS. 2A and 2B and therefore, FIGS. 26A and 26B show only the characteristic portions thereof.

At step S331, whether the above-described sequence shooting mode (SS mode) is set is judged, and if the judgment is negative, advance is made to step S8, and if the judgment is affirmative, at step S332, the sequence shooting mode is released, and then advance is made to step S8.

Also, at step S22, a focus lock holding reset flag FLR is set and advance is made to step S333. At the step S333, whether the sequence shooting flag CFLG is set is judged, and if the judgment is negative, advance is made to step S23, and if the judgment is affirmative, at step S334, the sequence shooting mode is set and advance is made to step S23. At the step S23, whether the half depression switch SW1 is closed is judged, and if the judgment is negative, advance is made to step S8, and if the judgment is affirmative, at step S24, the distance information from the distance measuring circuit 3 is read and stored in the memory area, whereafter advance is made to step S8.

In FIG. 26B, at step S17, one-frame winding-up of the film is started by the motor 10 through the motor driving circuit 11 and advance is made to step S18. At the step S18, whether the film has been wound up to its terminal end is judged, and if the judgment is negative, the winding-up is completed, whereafter advance is made to step S335. If the judgment is affirmative, advance is made to step S19.

At step S335, whether the sequence shooting mode is set is judged, and if the judgment is negative, the processing is terminated. If the step S335 is affirmed, advance is made to step S336, where whether the switch SW1 is closed is judged. If the step S336 is affirmed, return is made to step S1.

By the construction as described above, the sequence shooting mode is cancelled at step S332 if the sequence shooting mode is set when the focus lock holding operation has been performed, that is, if the setting of the sequence shooting mode is judged at step S331 after the LED 15 has been turned on and off at step S7 with the closing of the switch SW3 (step S3). Accordingly, sequence shooting is not effected when the focus lock holding is being effected. Also, when the operation of releasing the focus lock has been performed, that is, when step S4 has been affirmed after step S3 has been affirmed, the presence or absence of the setting of the sequence shooting flag is judged at step S333 via steps S21 and S22, and if the setting is judged, the sequence shooting mode is set at step S334. That is, if the focus lock holding is effected during the setting of the sequence shooting mode, the sequence shooting mode is released, but if the focus lock holding is released thereafter, the sequence shooting mode is reset.

Figure 27A:
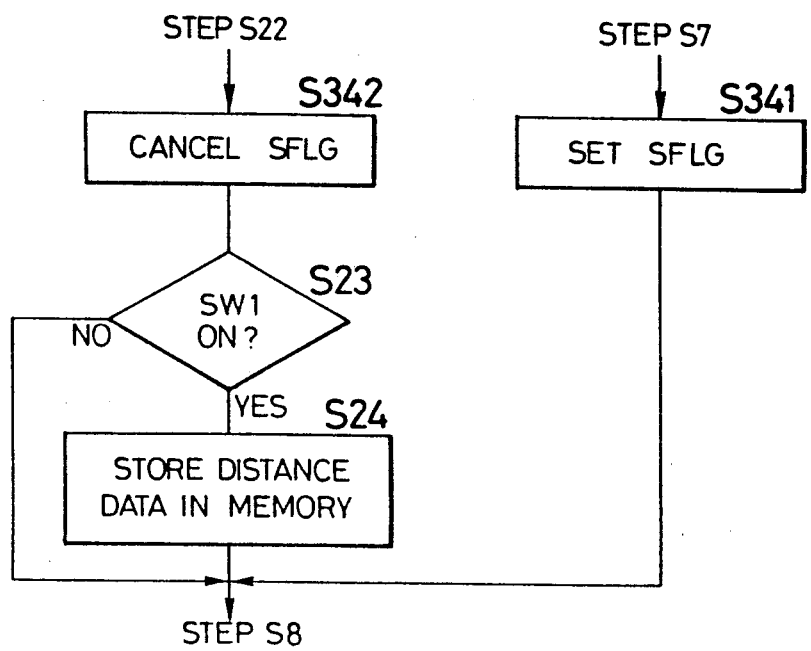
FIGS. 27A and 27B are flow charts showing the operation of a modification of the seventh embodiment.
Figure 27B:
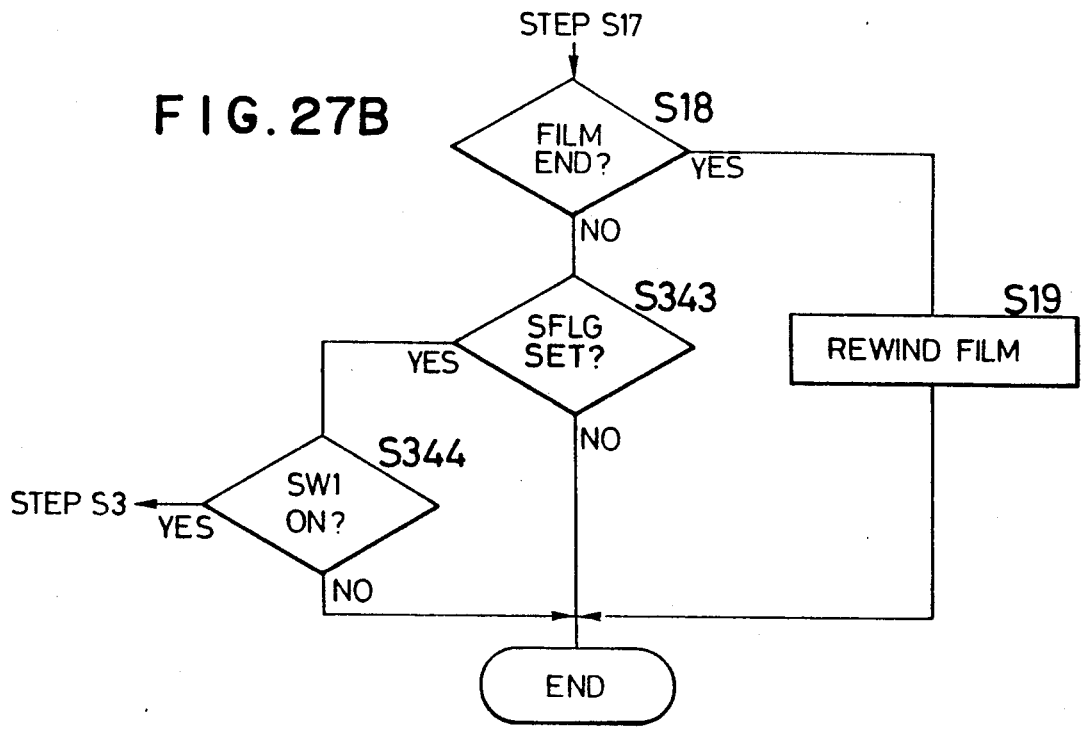

In the foregoing, a description has been given of a camera which is provided with a sequence shooting mode setting button and effects sequence shooting only when the sequence shooting mode is set by the operation of said button, but reference is now had to FIGS. 27A and 27B to describe a modification of the seventh embodiment which does not have the functions of setting and releasing such a mode and effects sequence shooting as long as the release button is fully depressed.

In FIG. 27A, at step S7, the LED 15 is turned on and off, whereafter at step S341, a one-frame photographing flag SFLG is set and advance is made to step S8. Also, after at step S22, a focus lock holding reset flag has been released, at step S342, the one-frame photographing flag SFLG is released, and then advance is made to step S23.

Further, if step S18 is negated, at step S343, whether the one-frame photographing flag SFLG is set is judged, and if the judgment is negative, the processing is terminated, and if the judgment is affirmative, at step S344, whether the switch Sw1 is closed is judged. If the step S344 is negated, the processing is terminated, and if the step S344 is affirmed, return is made to step S1.

According to the above-described procedure, when the focus lock is not being held, photographing is started with the full depression operation, and photographing is effected as long as the full depression operation is continued. Also, when the focus lock is being held, photographing is effected on only one frame even if the full depression operation is continued.

An eighth embodiment is designed so as to be capable of preventing camera shake during the focus lock holding in which another person who cannot be expected to be familiar with the basic operation for photographing is requested to photograph.

Figure 28:
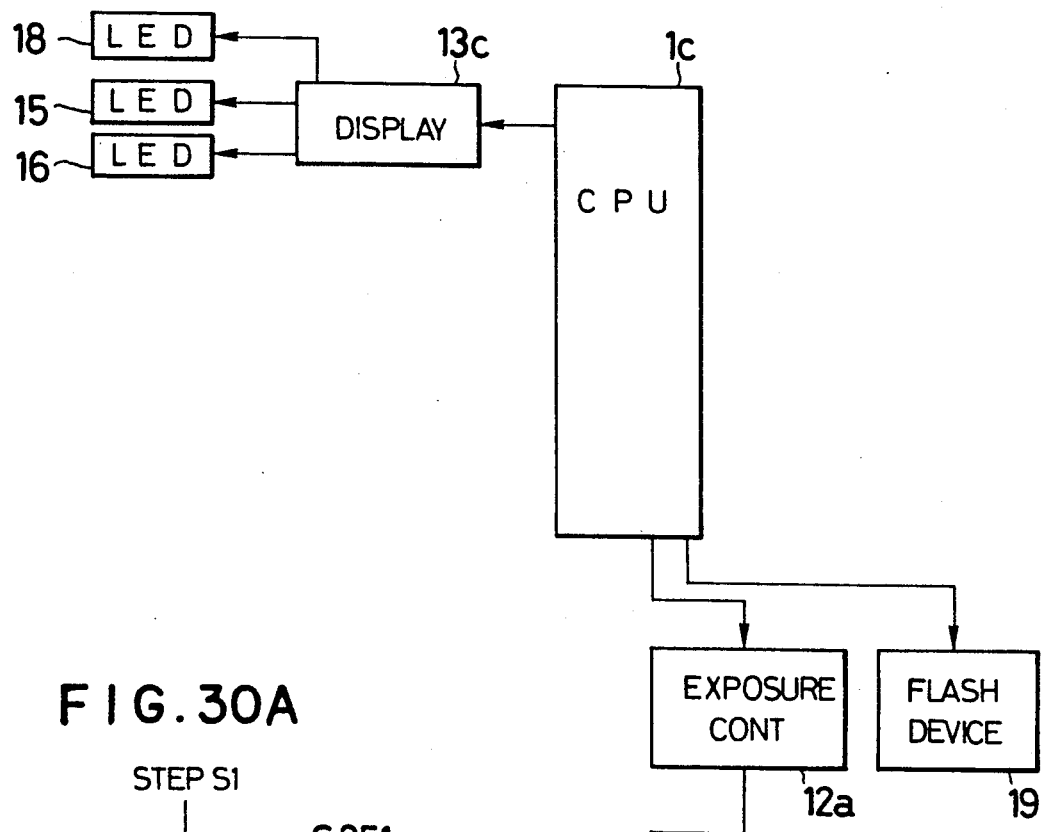
FIG. 28 is a block diagram showing portions of the construction of an eighth embodiment of the present invention.

FIG. 28 shows a block diagram of portions of the construction of the eighth embodiment. The remainder of the construction is the same as the construction of FIG. 1 and therefore is omitted. When the mode is not the focus lock holding mode which will be described later, the CPU 1c compares the luminance information 8 from the photometering circuit with preset first reference luminance $B_1$ (a first reference value), and if the luminance information B is darker than the first reference luminance $B_1$, the CPU 1c sets the flash photographing mode, and sends a light emission starting signal to the flash device 19 with photographing and causes the flash device to emit light toward the object.

The camera of the eighth embodiment adopts a flashmatic system as the light emission control system of the electronic flash device. This flashmatic system makes the quantity of emitted flash light constant, and controls the aperture value in conformity with the object distance, i.e., the distance information obtained by the distance measuring circuit, to thereby control the quantity of light applied to the object.

Also, the CPU 1c again operates the photometering circuit with the closing of the switch SW2, and controls a program shutter on the basis of the luminance information B obtained thereby.

Figure 29A:
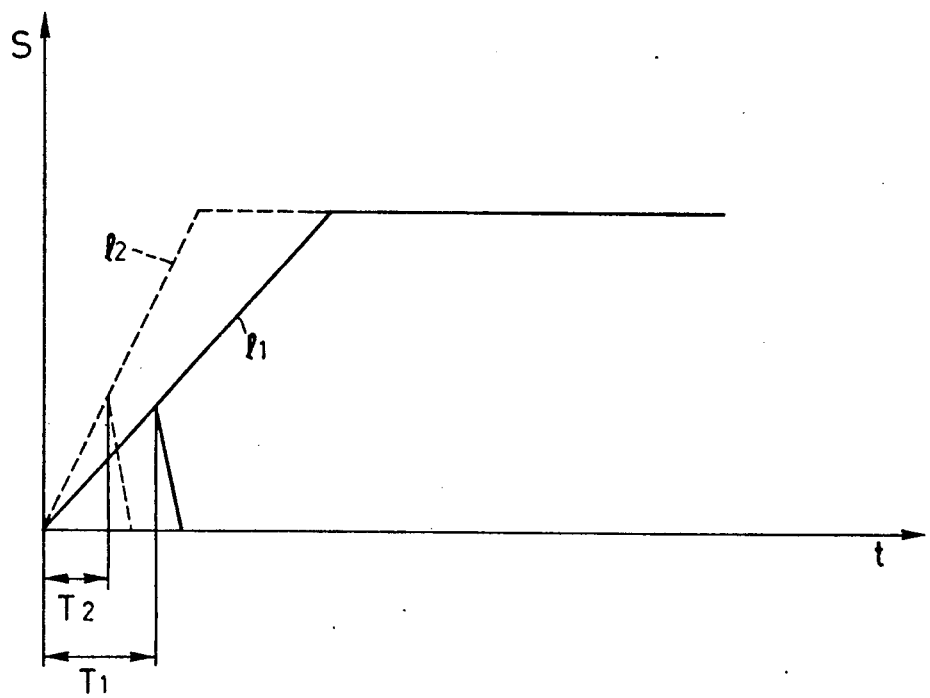
FIGS. 29A and 29B show the exposure operation of the eighth embodiment.

As indicated by $l_1$ in FIG. 29A wherein the vertical axis represents the opening area S of a stop and shutter 20 and the horizontal axis represents time, the shutter blades of the stop and shutter 20 are opened at a predetermined speed, and are closed when the time from after the shutter blades begin to be opened reaches a value $T_1$ corresponding to the luminance information B. Thereby, photographing is effected at a proper shutter speed and a proper aperture value. The shutter speed and aperture value $F_1$ corresponding to the luminance information B are, for example, values based on the exposure control program N of FIG. 29B.

Figure 29B:
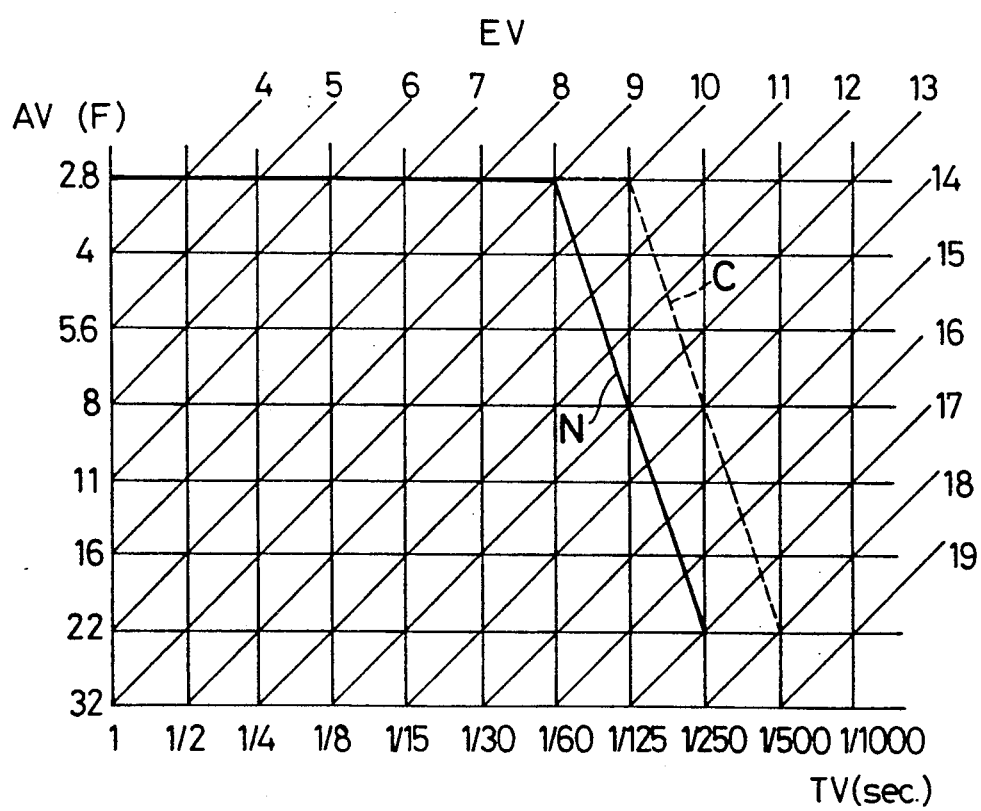

FIG. 29B is a program graph in which the horizontal axis represents the shutter speed (second), the vertical axis represents the aperture value (F No.) and the rightwardly upward oblique lines represent luminance information (Ev). Exposure control programs N and C are a plurality of bits of luminance information caused to correspond to the aperture value and the shutter speed, and for example, according to the exposure control program N, when the luminance information B is 12 (Ev), the aperture value is 8 (F) and the shutter speed is 1/250 (second).

Also, when the above-described flash photographing mode is being set, the CPU 1c effects flashmatic calculation (FM calculation) by the closing of the switch SW2 by the full depression operation, and calculates an aperture value $F_2$ conforming to the distance information from the distance measuring circuit. The CPU 1c compares an aperture value $F_2$ with an aperture value $F_1$ determined by the above-mentioned luminance information B, effects photographing at the smaller one of the two aperture values and a shutter speed corresponding thereto, and causes the flash device 19 to emit light at a timing which will be described later. Thereafter, the film is wound up by one frame by the motor 10. When the focus lock holding is effected, the CPU 1c operates the photometering circuit again. The CPU 1c compares the luminance information B obtained thereby with a preset second reference luminance $B_2$ (a second reference value), and if the obtained luminance information B is darker than the second reference luminance $B_2$, the CPU 1c turns on LED 16 and sets the flash photographing mode. The second reference luminance $B_2$ is set to a value brighter than the above-mentioned first reference luminance $B_1$. Accordingly, if the obtained luminance information B is of a value between the first reference luminance $B_1$ and the second reference luminance $B_2$, the electronic flash device will be caused to emit light with photographing during the focus lock holding mode, and will not be caused to emit light during the non-setting of the focus lock holding mode. That is, the chance for emission of flash light is greater during the setting of the focus lock holding mode than during the nonsetting of the focus lock holding mode.

Generally, when the object is dark, a long time during which the shutter is opened is needed to secure a long exposure time, but when effecting photographing by the use of the electronic flash device, the luminance of the object becomes higher by the emitted flash light and therefore, the shutter speed can be made higher. Thus, during the setting of the focus lock holding mode, the chance for effecting photographing at a high shutter speed increases correspondingly to the increase in the chance for flash light emission.

Also, when the focus lock is being held, the CPU 1c effects photographing at a higher shutter speed and an aperture value corresponding thereto than when the focus lock is not being held. That is, as indicated by $l_2$ in FIG. 29A, the shutter blades of the stop and shutter 20 are opened at a higher speed than usual, and are closed when the time after the shutter blades have begun to be opened reaches $T_2$ corresponding to the luminance information B. These aperture value $F_1$ and shutter speed value are values based on the exposure control program C of FIG. 29B. This exposure control program C is set so that the shutter speed corresponding to predetermined luminance information is higher than the exposure control program N and the aperture value is smaller than the exposure control program N.

Further, when the focus lock is being held and the flash photographing mode is set, the CPU 1c compares the aperture value $F_1$ determined by the above-described luminance information B with the aperture value $F_2$ obtained by the above-mentioned FM calculation, effects photographing on the basis of the smaller one of the two aperture values and a shutter speed corresponding thereto, i.e., a high shutter speed, and causes the electronic flash device to emit light at a timing which will be described later.

This embodiment uses a program shutter, and what is actually calculated is the time $T_1$ or $T_2$ of FIG. 29A and the aperture value is not found and therefore, the comparison between these aperture values is accomplished by the comparison of time t.

Figure 30A:
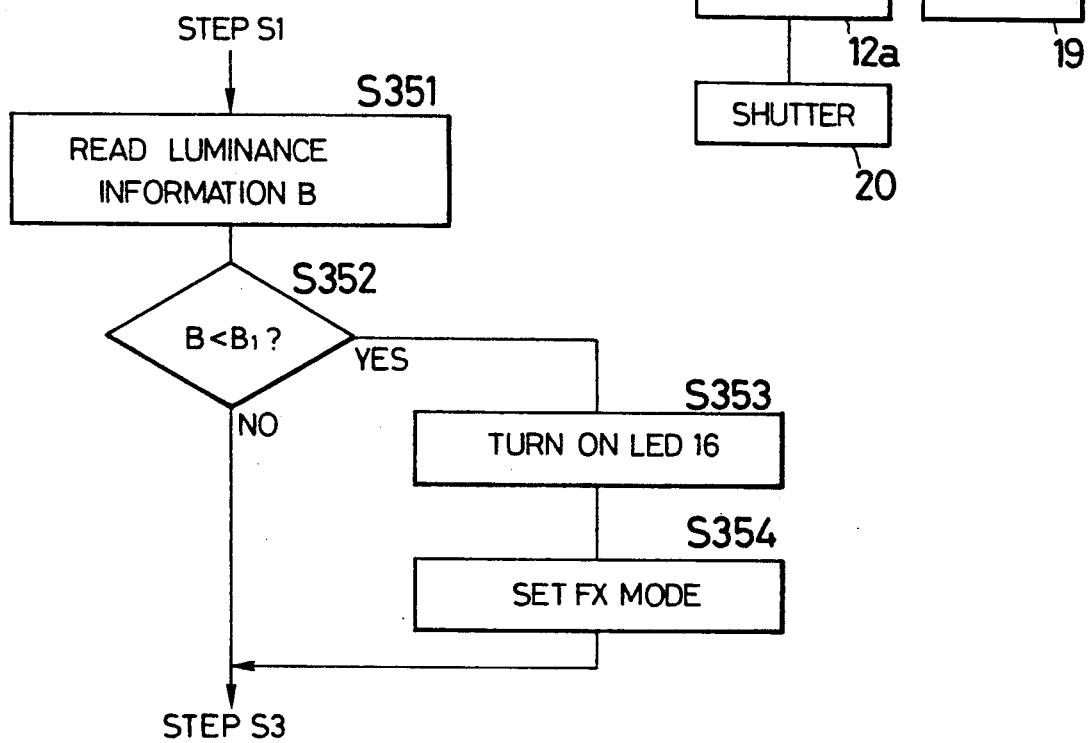
FIGS. 30A, 30B and 30C are flow charts showing the operation of the eighth embodiment.

The procedure of the control effected in the CPU 1c will now be described with reference to the flow charts of FIGS. 30A, 30B and 30C. However, the operation of the eighth embodiment considerably overlaps the operation of FIGS. 2A and 2B and therefore, the characteristic portions thereof are shown in FIGS. 30A, 30B and 30C.

At step S1, the distance information from the distance measuring circuit 3 is read, and then at step S351, the luminance information B from the photometering circuit 2 is read, and at step S352, whether this luminance information B is darker than the predetermined first reference luminance $B_1$ is judged. If the judgment is negative, advance is made to step S3, and if the judgment is affirmative, at step S353, the LED 16 in the finder is turned on through the display circuit 13c, whereby the display to the effect that the luminance is low is effected, and then at step S354, the flash photographing mode (abbreviated as FX mode in FIG. 30A) is set and advance is made to step S3.

Figure 30B:
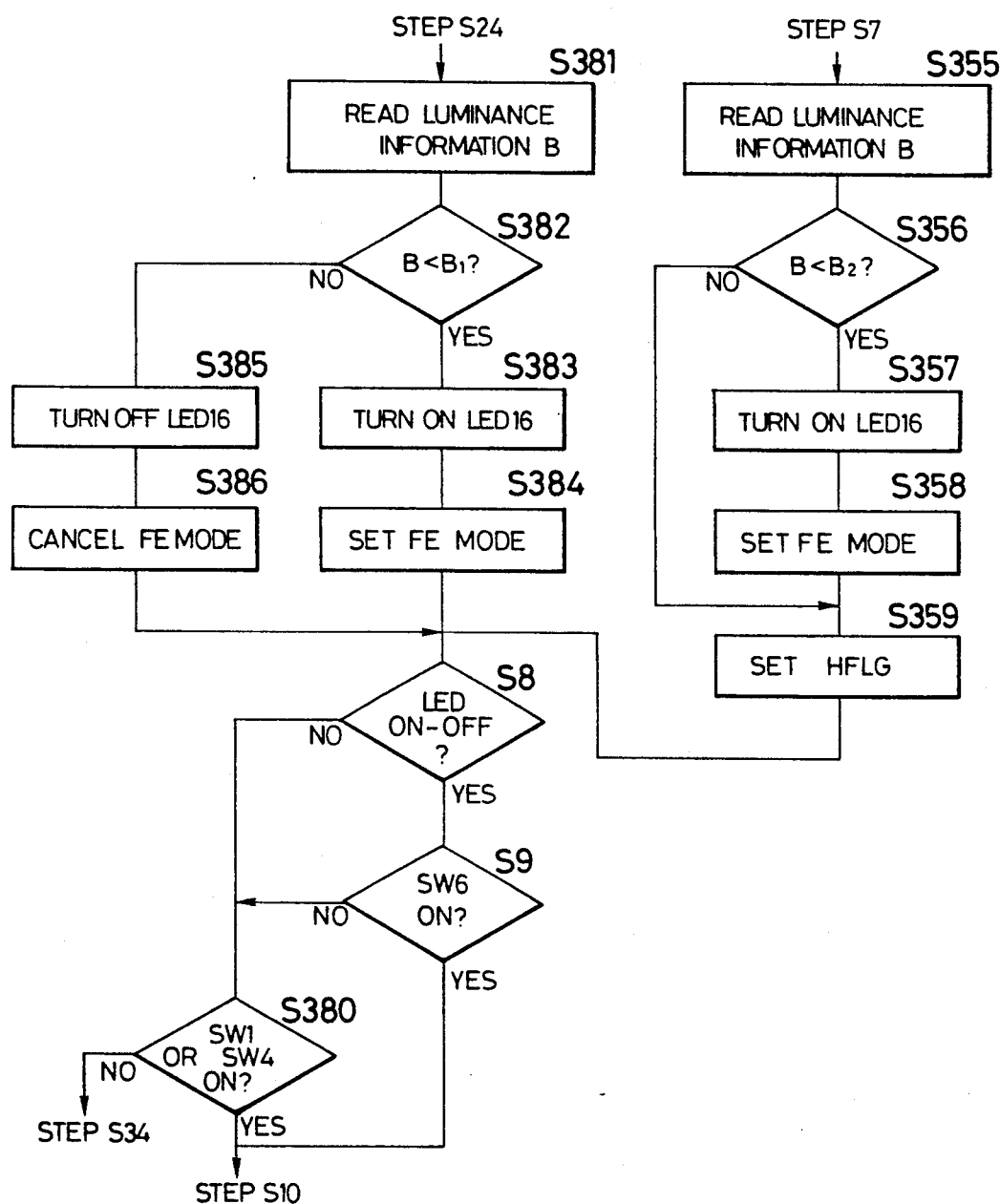
Figure 30C:
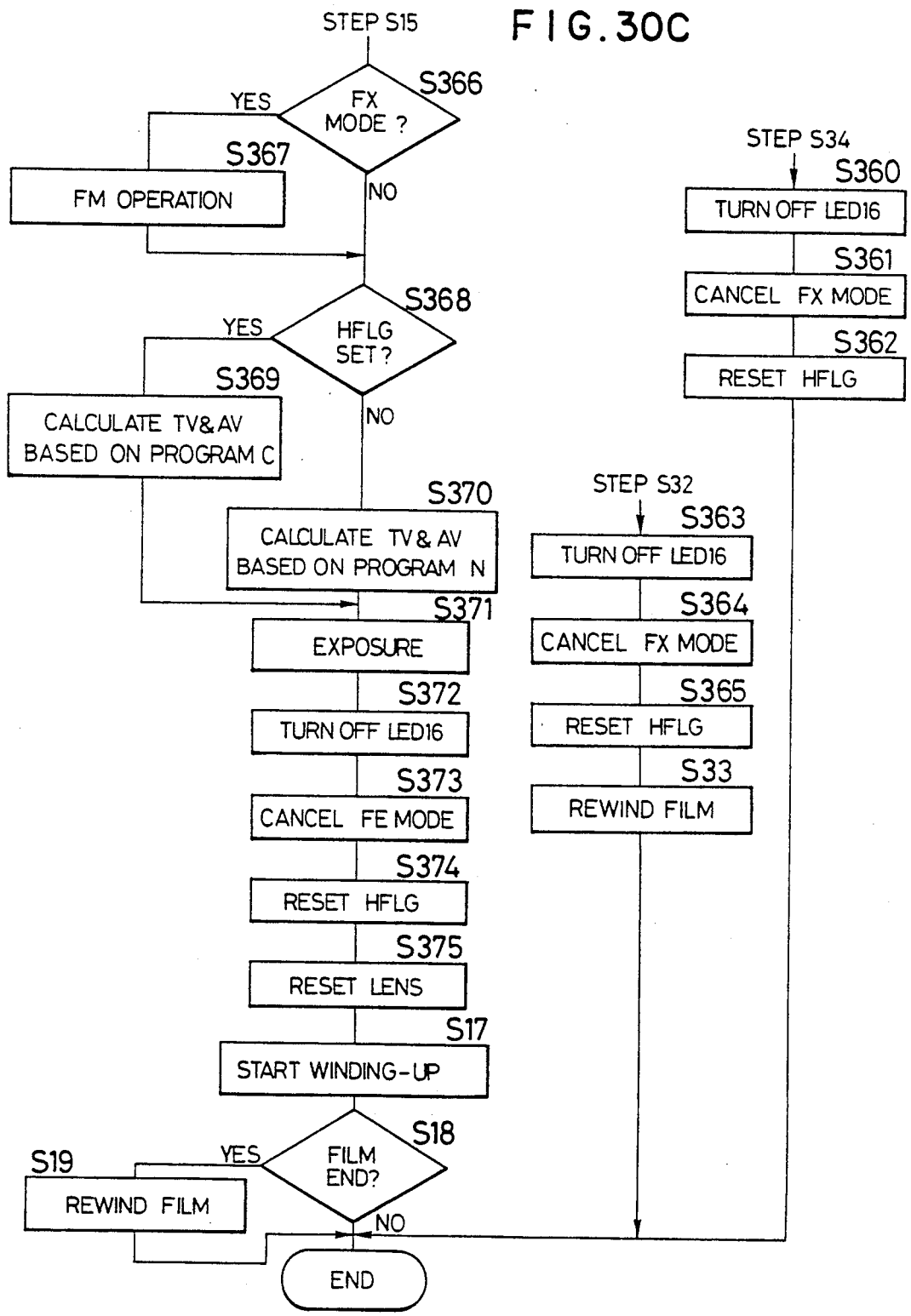

FIG. 30B will now be described. Whether a focus lock holding reset flag FLR is set is judged at step S6, and if the judgment is negative, at step S7, the LED 15 in the finder is turned on and off, and then advance is made to step S355.

At the step S355, the luminance information B from the photometering circuit 2 is again read, and at step S356, whether this luminance information B is darker than the predetermined second reference luminance $B_2$ is judged. If the step S356 is negated, advance is made to step S359, and if the step S356 is affirmed, at step S357, the LED 16 in the finder is turned on to thereby effect the display to the effect that the luminance is low, and at step S358, the flash photographing mode is set and advance is made to step S359. At the step S359, a high speed flag HFLG is set, and then advance is made to step S8. Also, at step S24, the distance information from the distance measuring circuit 3 is read and stored in the memory area, whereafter advance is made to step S381.

At the step S381, the luminance information B is read, and then at step S382, whether this luminance information B is darker than the first reference luminance $B_1$ is judged. If the judgment is affirmative, at step S383, the LED 16 is turned on and at step S384, the flash photographing mode is set and advance is made to step S381. If the step S382 is negated, at step S385, the LED 16 is turned off and at step S386, the flash photographing mode is cancelled and advance is made to step S8.

At the step S8, whether the LED 15 is turned on and off is judged, and if the judgment is affirmative, advance is made to step S9, and if the judgment is negative, advance is made to step S380. At the step S380, whether the switch Sw1 or Sw4 is closed is judged.

FIG. 30C will now be described. At step S34, the focus lock holding flag FLH is reset and advance is made to step S360. At the step S360, the LED 16 is turned off, and then at step S361, the flash photographing mode is released and at step S362, the high speed flag HFLG is reset, whereafter the processing is terminated.

At step S32, the focus lock holding flag FLH is reset and the LED 15 is turned off, whereafter advance is made to step S363. At the step S363, the LED 16 is turned off, and then at step S364, the flash photographing mode is cancelled and at step S365, the high speed flag HFLG is reset and advance is made to step S33.

At step S366, whether the flash photographing mode is set is judged. If the judgment is negative, advance is made to step S368, and if the judgment is affirmative, at step S367, flashmatic calculation (FM calculation) is effected to calculate the aperture value $F_2$ conforming to the distance to the object (actually, the time $T_1$ or $T_2$ of FIG. 29A), and advance is made to step S368. At the step S368, whether the high speed flag HFLG is set is judged. If the judgment is affirmative, at step S369, the aperture value and the shutter speed (actually, the time $T_2$) are found on the basis of the exposure control program C of FIG. 29B, and if the judgment is negative, at step S370, the aperture value and the shutter speed (actually, the time $T_1$) are found on the basis of the exposure control program N and advance is made to step S371.

At the step S371, if the step S366 is affirmed, the aperture value $F_1$ calculated at step S369 or S370 is compared with the aperture value $F_2$ obtained by the FM calculation (step S367), and photographing is effected on the basis of smaller one of these two aperture values and a shutter speed corresponding thereto.

That is, if $F_2 > F_1$, the aperture value $F_2$ obtained by the FM calculation is selected, and on the basis of this aperture value $F_2$ and a shutter speed corresponding thereto (actually, on the basis of the time $T_1$ or $T_2$), the stop and shutter 20 is driven through the exposure control circuit 12 to thereby effect photographing. When the opening of the shutter is greatest, that is, when the opening of the stop and shutter 20 reaches a position corresponding to the aperture value obtained by the FM calculation, the electronic flash device is caused to emit light.

Also, if $F_2 > F_1$, the aperture value $F_1$ based on the exposure control program N or C is selected, and on the basis of this aperture value $F_1$ and a shutter speed corresponding thereto (actually, on the basis of the time $T_1$ (or $T_2$). the stop and shutter is driven to thereby effect photographing. When the opening of the shutter is greatest, that is, when the opening of the stop and shutter reaches a position corresponding to the aperture value obtained by the exposure control program N or C, the electronic flash device is caused to emit light. On the other hand, if step S366 is negated, photographing is effected on the basis of the aperture value $F_1$ and a shutter speed corresponding thereto (actually, on the basis of the time $T_1$ or $T_2$), and at this time, the light emission of the electronic flash device is not effected.

Subsequently, the process proceeds to step S372, where the LED 16 is turned off, and then at step S373, the flash photographing mode is released and at step S374, the high speed flag HFLG is reset and advance is made to step S375. At the step S375, the photo-taking lens is driven to the reset position, and then at step S17, one-frame winding-up of the film is started by the motor 10 through the motor driving circuit 11 and advance is made to step S18.

In the eighth embodiment, by the construction as described above, when the focus lock holding operation is being performed, the high speed flag HFLG is set at step S359, and during photographing, the aperture value and the shutter speed (actually, the time T) are determined by the exposure control program C. Accordingly, the shutter speed becomes higher than when the focus lock holding is not effected. Further, when the focus lock is being held, the reference luminance for determining the presence or absence of emitted flash light is shifted to the high luminance side (the first reference luminance $B_1 \rightarrow$ the second reference luminance $B_2$) and therefore, flash light emission is effected even if the luminance is higher than when the focus lock is not held. The design is such that during flash photographing, the aperture value by the FM calculation and the aperture value by the above-mentioned exposure control program C are compared with each other and photographing is effected at the smaller one of these aperture values and a shutter speed corresponding thereto, and therefore the possibility of the shutter speed becoming higher is high.

In the foregoing, there has been shown an example in which the flashmatic system is adopted as the light emission control system of the electronic flash device, but this is not restrictive; other light emission control systems may also be adopted.

A modification of the eighth embodiment will now be described with reference to FIGS. 31A, 31B and 31C.

In FIG. 28, a camera shake alarm LED 18 provided in the finder is connected to the display circuit 13c. When the focus lock holding described above is being effected, the CPU 1c compares the luminance information B from the photometering circuit 2 with a predetermined third reference luminance value $B_3$ along with the closing of the switch SW1 by the half depression operation, and if $B<B_3$, it turns on the LED 18 through the display circuit 13c and provides an alarm to the effect that camera shake occurs.

Also, when the focus lock holding is being effected, the CPU 1c compares the luminance information B with predetermined fourth reference luminance $B_4$ along with the closing of the switch SW1, ant if $B<B_4$. it turns on the LED 18. The relation between the third reference luminance $B_3$ and the fourth reference luminance $B_4$ is $B_3<B_4$. Accordingly, if the obtained luminance information B is of a value between the third reference luminance $B_3$ and the fourth reference luminance $B_4$, when the focus lock holding is not being effected, no alarm is generated, and when the focus lock holding is being effected, an alarm is generated. That is, the chance of generation of the alarm is more during the setting of the focus lock holding mode than during the non-setting of the focus lock holding mode.

The procedure of the control of the CPU 1 will now be described with reference to the flow charts of FIGS. 31A, 31B and 31C. In FIGS. 31A, 31B and 31C, steps similar to those of FIGS. 30A, 30B and 30C are given similar reference characters and only the differences therebetween will be described.

When at step S2, the luminance information B is read, at step S391, whether the read luminance information B is darker than the preset third reference luminance $B_3$ is judged. If the step S391 is negated, advance is made to step S3, and if the step S391 is affirmed, at step S392, the LED 18 is turned on and advance is made to step S3.

Also, after the luminance information B is read at step S355, whether this luminance information B is darker than the preset fourth reference luminance $B_4$ is judged at step S393. If the judgment is negative, advance is made to step S8, and if the judgment is affirmative, at step S394, the LED 18 is turned on, and then advance is made to step S8.

Further, after step S24, at step S401, the luminance information B is read, and then at step S402, whether this luminance information B is darker than the third reference luminance $B_3$ is judged. If the judgment is affirmative, at step S403, the LED 18 is turned on and advance is made to step S8, and if the judgment is negative, at step S404, the LED 18 is turned off and advance is made to step S8.

Further, at steps S32, S34 and S38, the focus lock holding flag FLH is reset, whereafter at steps S395, S396 and S397, the LED 18 is turned off and advance is made to the next process.

Furthermore, if at step S12, the closing of the switch SW2 is determined, at step S388, the LED 18 is turned off and advance is made to step S13, and at step S15, lens driving (focusing) is effected, whereafter at step S399, photographing is effected.

According to the above-described procedure, when the focus lock is being held, the reference luminance for determining the presence or absence of alarm generation is shifted to the high luminance side and therefore, as compared with the time when the focus lock is not being held, the chance of alarm generation increases, whereby the possibility of camera shake being prevented is increased.

In the foregoing, alarm has been effected by the LED 18 in the finder being turned on, but this is not restrictive; the alarm may be provided by a sound or the like.

Also, when the focus lock holding mode is set, the luminance information B obtained by the photometering circuit 2 may be compared with preset fifth reference luminance $B_5$, and if $B<B_5$, photographing may be inhibited by release lock or the like. This fifth reference luminance $B_5$ is set to such a value that camera shake will occur for a shutter speed determined on the basis of luminance information of a value less than that value. By this as well, camera shake can be prevented.

A description will now be given of a ninth embodiment in which a person to be photographed can also be informed of the focus lock holding state.

Figure 32A:
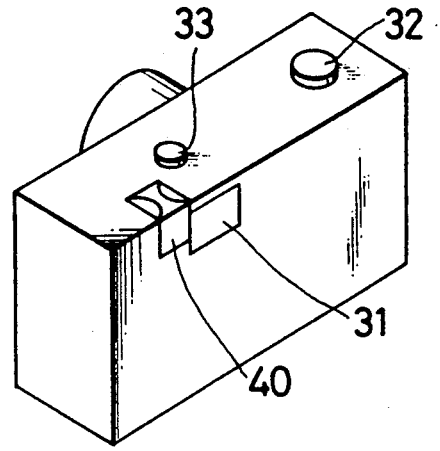
FIGS. 32A, 32B and 32C show portions of the appearance of a ninth embodiment of the present invention.
Figure 32B:
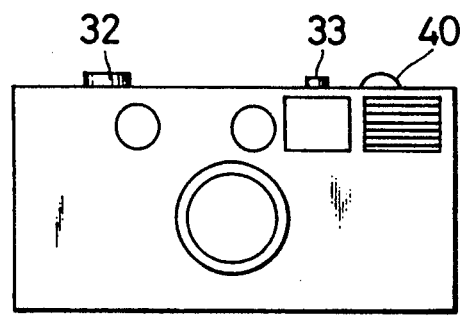
Figure 32C:
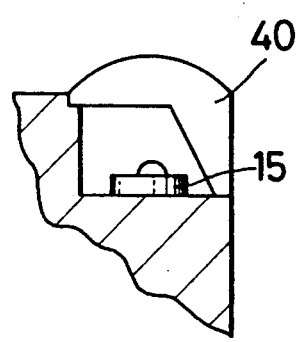

The LED 15 in the ninth embodiment is provided in a display unit 40 shown in FIGS. 32A, 32B and 32C. The display unit 40 is provided adjacent to a finder window 31 and at the corner between the back surface and the upper surface of the camera, and is designed such that the display state of the LED 15 can be confirmed by both the photographer and the person to be photographed in front of the camera. The CPU outputs a turn-on signal for turning on the LED 15 when focus lock is effected by the closing of the switch SW1 as described above. The reference numeral 33 designates a focus lock holding button.

Figure 33:
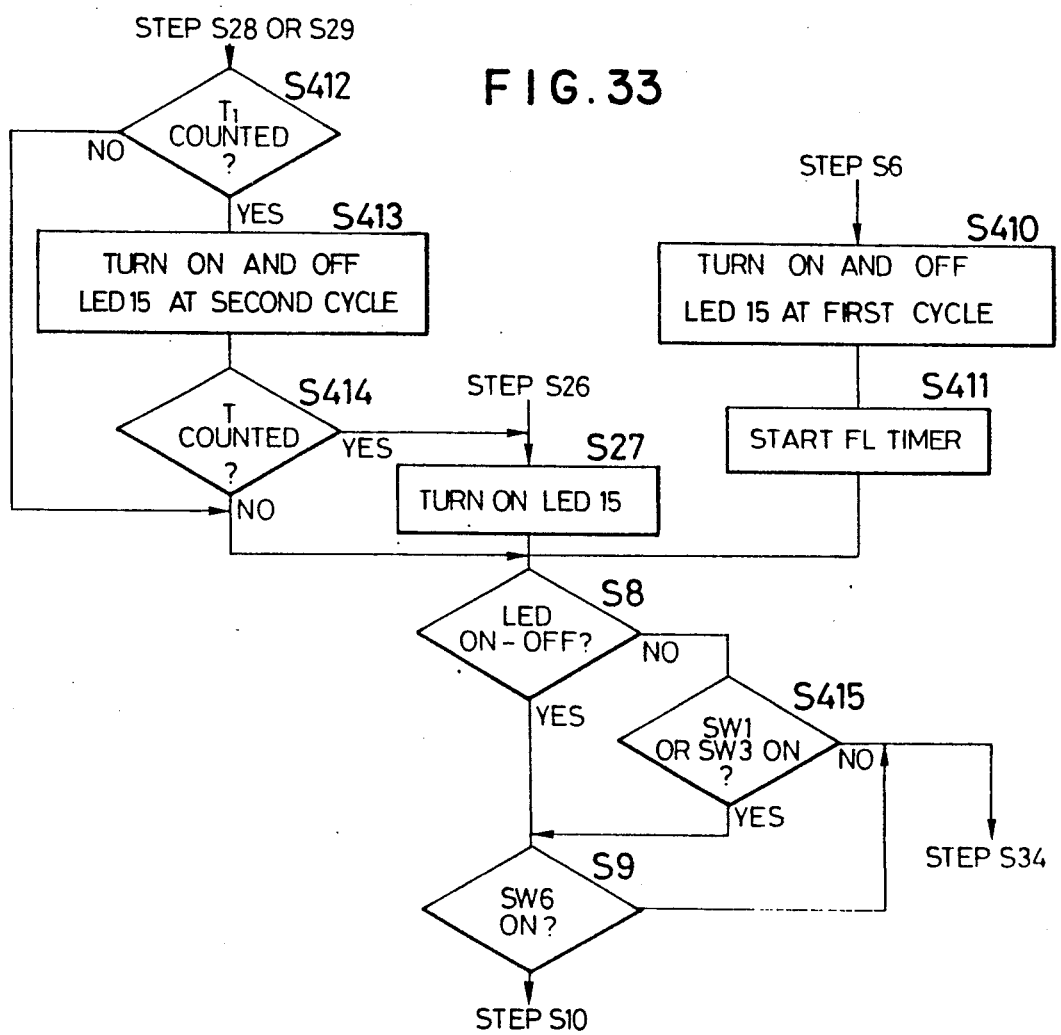
FIG. 33 is a flow chart showing the operation of the ninth embodiment.

The differences of the operation of the ninth embodiment from FIGS. 2A and 2B are shown in the flow chart of FIG. 33. At step S6, whether the focus lock holding reset flag FLR is set is judged, and if the judgment is negative, at step S410, the LED 15 is turned on and off at a first turn-on-and-off period and at step S411, the counter circuit 14 is operated to start counting a predetermined time T, and then advance is made to step S8. If step S28 is affirmed, advance is made to step S412, and if step S28 is negated, at step S29, the focus lock holding flag FLH is set and advance is made to step S412. At the step S412, whether a first time $T_1$ has elapsed after the counter circuit 14 has started counting is judged.

If the step S412 is negated, advance is made to step S8, and if the step S412 is affirmed, at step S413, the LED 15 is turned on and off at a second turn-on-and-off period through the display circuit 13 and advance is made to step S414. At the step S414, whether a predetermined time T has elapsed after the time counting has been started is judged, and if the judgment is affirmative, advance is made to step S27, and if the judgment is negative, advance is made to step S8.

At step S23, whether the half depression switch SW1 is closed is judged, and if the judgment is negative, advance is made to step S27, and if the judgment is affirmative, at step S24, the distance information from the distance measuring circuit 3 is read and stored in the memory area, whereafter advance is made to step S27.

At step S415, whether the switch SW1 or SW3 is closed is judged. If the judgment is affirmative, advance is made to stpe S9, and if the judgment is negative, advance is made to step S34.

According to the above-described procedure, at step S1, the storage of the distance information is effected by the closing of the switch SW1 operatively associated with the half depression operation of the release button, and when the closing of the switch SW3 by the operation of the focus lock holding operating button is determined at step S3, steps S4–S6 are passed through and at step S410, the LED 15 in the finder is turned on and off at the first turn-on-and-off period and at step S411, time counting is started. Thereafter, steps S8–S12 are passed through and return is made to step S3, and if the switch SW3 is not closed, advance is made to steps S25, S28 and S29, and if the first time $T_1$ has not elapsed, step S412 is negated and advance is made to steps S8–S12, and return is made to step S3. If thereafter the switches SW2 and SW3 are not closed, the process goes around the loop of steps S3, S25, S28, S412, S8–S12 and S3 (a first loop) until the first time $T_1$ elapses. When the process is going around this first loop, the LED 15 is turned on and off at the first turn-on-and-off period.

Also, after the first time $T_1$ has elapsed, step S412 is affirmed and advance is made to step S413, where the turn-on-and-off period of the LED 15 changes to the second turn-on-and-off period. If thereafter the switches SW2 and SW3 are not closed, the process goes around the loop of steps S3, S25, S28, S412, S413, S414, S8–S12 and S3 (a second loop) until the second time $T_2$ elapses, that is, until time counting is terminated. When the process is going around this second loop, the LED 15 is turned on and off at the second turn-on-and-off period.

In these first and second loops, there is no judgment of the state of the half depression switch SW1 and therefore, even if the half depression operation of the release button is released after the focus lock holding operation has been performed, the focus lock state is held and even if the half depression operation is again performed, reading and storage of new distance information will not be effected. That is, the holding of the focus lock state is effected.

Also, when the predetermined time T elapses after the holding of the focus lock state has been started, this process goes through the above-mentioned second loop and proceeds from step S414 to step S27, where the LED 15 is turned on. If thereafter step S8 is negated and at step S415, it is judged that the half depression switch SW1 is not closed, at step S34, the focus lock holding flag FLH is reset and the process is terminated. That is, the holding of the focus lock is released. According to this, where the holding of the focus lock has been effected but focus lock photographing is not effected, for example, where the photographer has requested another person to photograph but the request has been turned down, even if the operation of releasing the focus lock holding is not performed, the holding of the focus lock state will be automatically released when a predetermined time elapses and therefore, the operability is improved.

Further, if the focus lock holding button 33 is again depressed to close the switch SW3 again when the process is going around the above-mentioned first or second loop, the process goes through this loop and proceeds from step S3 to step S4, and at step S21, the resetting of the focus lock holding flag FLH and the turn-on-and-off→the turn-on of the LED 15 are effected, and further at step S22, the setting of the focus lock holding reset flag FLR is effected, and if the half depression switch SW1 is OFF, the process passes through steps S8, S415 and S34 and is terminated. That is, even if the predetermined time T has not elapsed, when the focus lock holding button 33 is again operated, the holding of the focus lock state is released.

Also, if at step S9, the power source switch SW6 operatively associated with the opening-closing of the photo-taking lens barrier is OFF, advance is made to step S34, where the focus lock holding flag FLH is reset and the processing is terminated.

According to the above-described embodiment, during the predetermined time T for which the holding of the focus lock is effected, the LED 15 is turned on and off at the first or second period and this state of the LED 15 can be confirmed also on the part of the person to be photographed and therefore, whether the holding of the focus lock is being effected can be known. Also, during the second time before the termination of time counting, the LED 15 is turned on and off at the second turn-on-and-off period differing from the first turn-on-and-off period and therefore, it can be known that the release of the holding of the focus lock will soon take place.

Further in the present embodiment, the LED for displaying the focus lock holding is used also as the LED for displaying the completion of distance measurement and therefore, the cost is reduced as compared with a case where these are individually provided.

A modification of the ninth embodiment will now be described.

Figure 34:
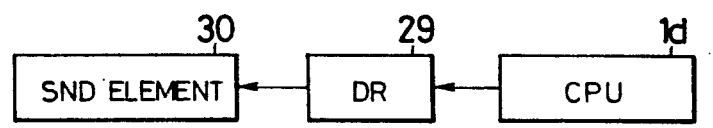
FIG. 34 is a block diagram showing portions of the construction of the ninth embodiment.

Referring to FIG. 34, a driving circuit 29 is further connected to CPU 1d and drives a sound element 30 by a signal from the CPU 1d to cause the sound element 30 to generate an alarm sound. When the switch SW4 is closed, the CPU 1d causes the time counting for self-timer photographing to be started and outputs a sound signal to the driving circuit 20. Also, during the above-described holding of the focus lock, it outputs a sound signal with the lapse of the first time $T_1$.

Figure 35:
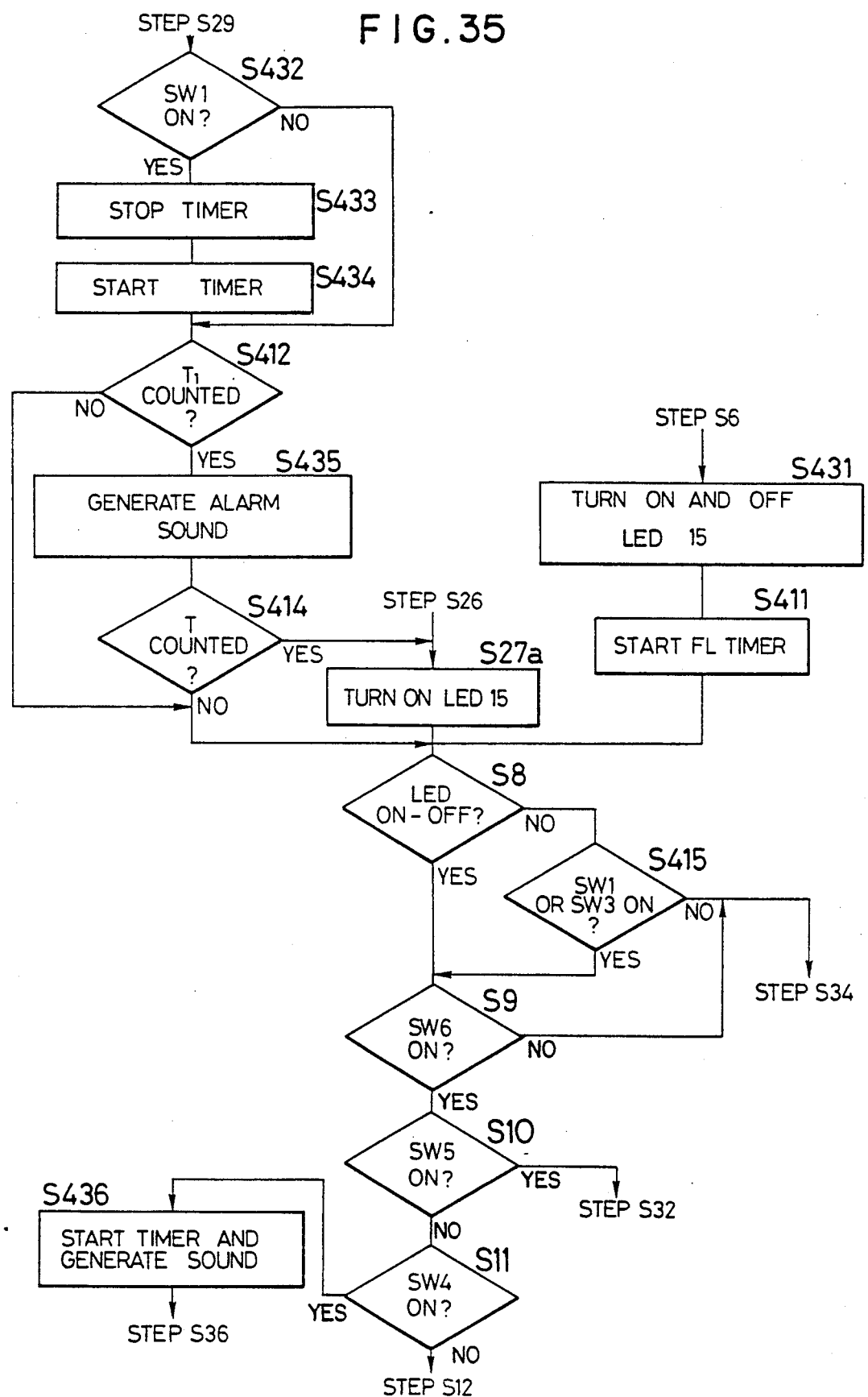
FIG. 35 is a flow chart showing the operation of a modification of the ninth embodiment.

The operation of the modification of the ninth embodiment is shown in the flow chart of FIG. 35. In FIG. 35, steps similar to the steps of FIG. 33 are given similar reference characters and need not be described.

At step S431, the LED 15 is turned on and off and at step S411, time counting is started by the counter circuit 14 and advance is made to step S8.

Also, after step S29, advance is made to step S432, where whether the half depression switch SW1 is closed is judged. If the step S432 is negated, advance is made to step S412, and if the step S432 is affirmed, at step S433, the time counting by the counter circuit 14 is once interrupted and at step S434, the counting of the predetermined time T is newly started and advance is made to step S412. At the step S412, whether the first time $T_1$ has elapsed from after the start of the time counting as described above is judged, and if the judgment is negative, advance is made to step S8. On the other hand if the step S412 is affirmed, at step S435, a signal is output to the driving circuit 20, which thus drives the sound element 30 to generate an alarm sound, whereafter advance is made to step S414. If the step S414 is affirmed, at step S27a, the LED 15 is turned on and the alarm sound is stopped.

Further, if at step S11, the closing of the self switch SW4 is determined, at step S436, the time counting for the self-timer is started and a sound is generated by the sound element 30 through the driving circuit 20, and when the time counting is terminated, the sound element 30 is stopped and advance is made to step S36.

According to the above-described procedure, the LED 15 is turned on and off for the predetermined time T from the start of the time counting at step S411, i.e., the start of the focus lock holding, till the termination of the time counting, i.e., the release of the focus lock holding, and the alarm sound by the sound element 30 is generated for the second time $T_2$ before the termination of the time counting.

Also, if during the time counting, the switch SW1 is closed and step S432 is affirmed, at step S433, the time counting is once terminated and at step S434, the counting of the predetermined time T is newly started. That is, if the half depression operation is performed during the holding of the focus lock, the time for time counting is extended. According to this, the holding time of the focus lock can be extended by a simple operation.

In the foregoing, the LED 15 has been turned on and off as long as the focus lock is held, and the alarm sound has been generated for the second time $T_2$, but alternatively, the design may be such that an alarm sound is also generated for the first time $T_1$. In this case, a first alarm sound may be generated for the first time $T_1$, and for example, a second alarm sound differing in frequency from the first alarm sound may be generated for the second time $T_2$. Also, the first time $T_1$ may be displayed by the LED 15 and an alarm sound may be generated for the second time $T_2$, and vice versa.

Further, there has been shown an example in which the sound element for informing that the time counting of the self-timer is going on is used also as the sound element for informing the photographer of the counting of the first time $T_1$ during the focus lock holding, but these may also be individually provided.

Furthermore, by performing the half depression operation when the holding of the focus lock is being done, the holding time is extended, but alternatively, this time extension may be effected with the full depression operation or with shutter release.

A tenth embodiment enables a photograph in focus to a desired object to be taken even if the distance of the desired object changes during the holding of the focus lock state.

In the tenth embodiment, during the holding of the focus lock state, immediately before a photo-taking lens driving start signal is generated by the closing of the switch SW2 operatively associated with the full depression operation of the release button, the distance to the object is calculated again by the distance measuring circuit 3 and input to the CPU, and this distance information is stored in the memory area. Further, the tenth embodiment has in the CPU selecting means for comparing the stored value of this distance information during the second distance measurement with the stored value of the distance information in the focus lock holding state, i.e., the stored value of the distance information stored during the closing of the switch SW1 operatively associated with the half depression of the release button and held unchanged even if the half depression of the release button is released and the half depression operation of the release button is again performed, and turning on and off the LED 18 and generating an alarm when there is a difference greater than a predetermined value between the two stored values.

Also, by the closing of the switch SW3, the photographing mode is cyclically changed over in the order of first and second focus lock holding modes and the normal mode. The first focus lock holding mode (FL1) refers to a mode for bringing about so-called release lock state in which an alarm is generated when the difference between the measured distance value in the focus lock holding state and the distance information obtained by second distance measurement is greater than a predetermined value and also, the photographing operation is inhibited even if the release button is fully depressed. The second focus lock holding mode (FL2) refers to a mode in which when the difference between said two types of distance information is greater than the predetermined value, an alarm is generated but release lock is not exerted and the photographing operation is performed.

Figure 36A:
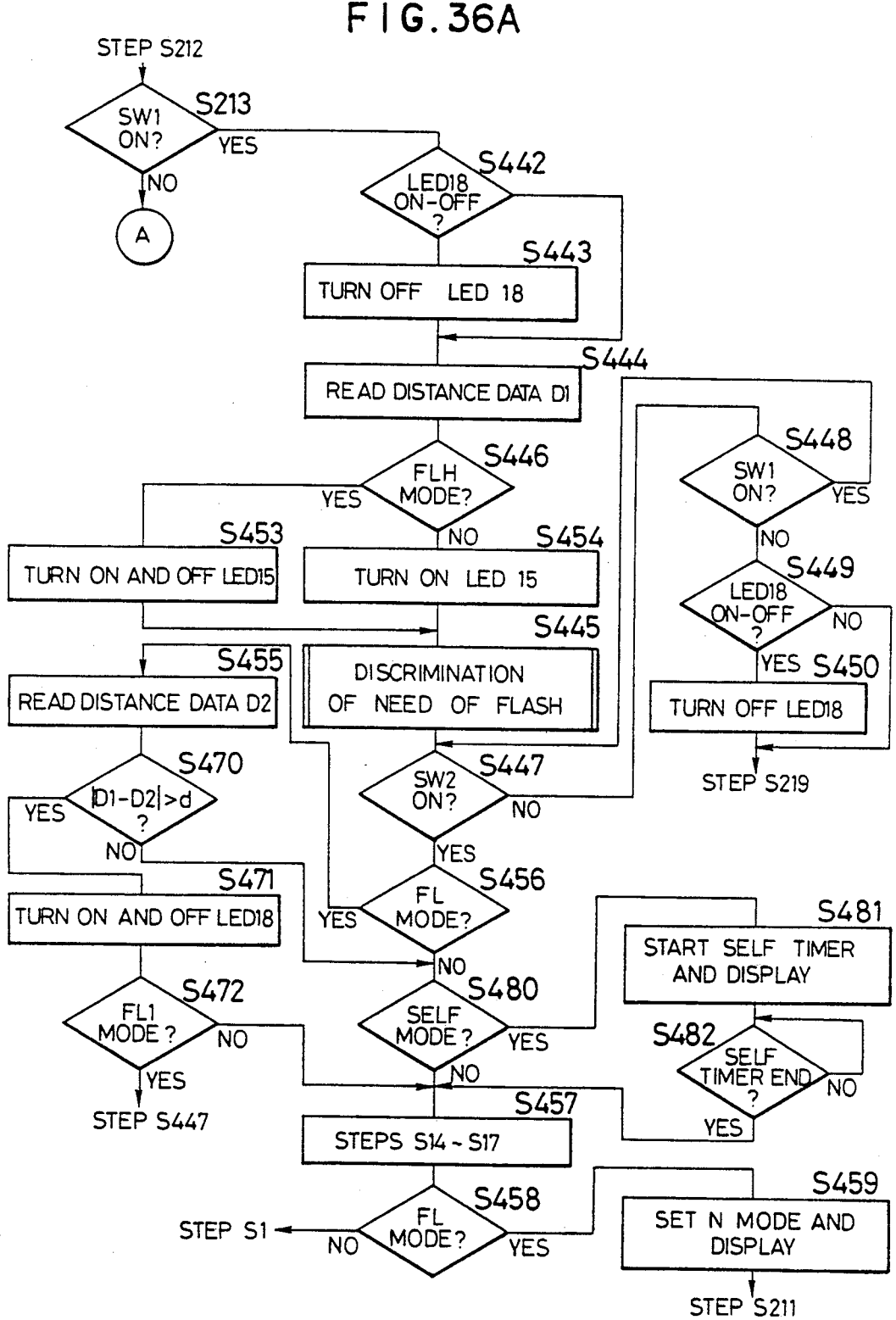
FIGS. 36A and 36B are flow charts showing the operation of a tenth embodiment of the present invention.
Figure 36B:
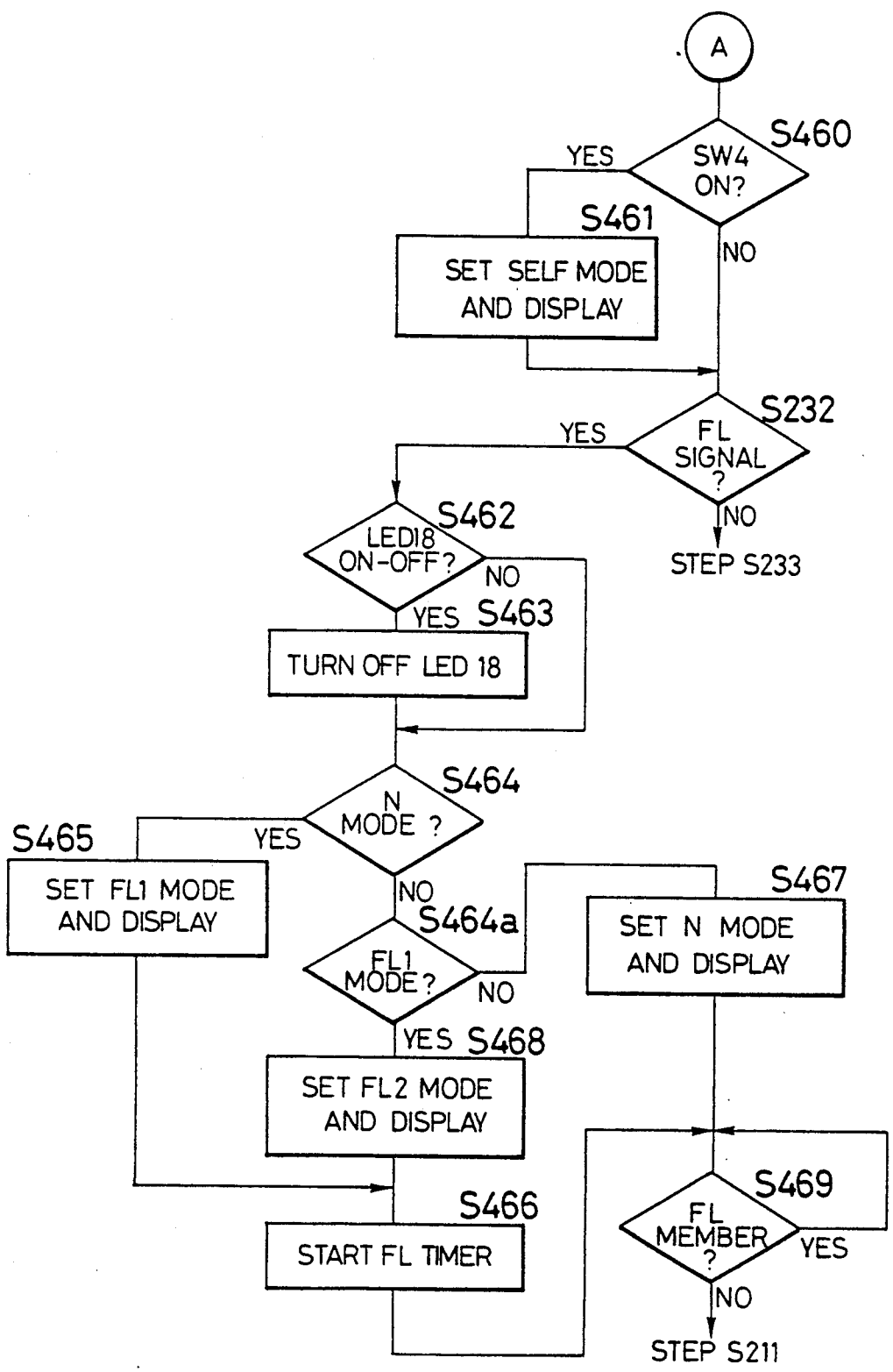

The operation of the tenth embodiment will hereinafter be described with reference to the flow charts of FIGS. 36A and 36B. The operation of the tenth embodiment partly overlaps FIG. 14 and therefore, the overlapping portions are omitted.

At step S213, whether the half depression switch SW1 operatively associated with the half depression operation of the release button has been closed is judged.

At step S442, whether the LED 18 is turned on and off is judged.

At step S443, the LED 18 which has so far continued to be turned on and off is turned off.

At step S444, the distance information from the distance measuring circuit 3 is read and stored in the memory area.

At step S446, whether the mode is the focus lock holding mode is judged. This judgment is done by examining whether the focus lock holding flag is set. If the judgment is affirmative, advance is made to step S453, and if the judgment is negative, advance is made to step S454.

At the step S453, the LED 15 is turned on and off to inform the photographer that the focus lock holding mode is set.

Conversely, at the step S454, the LED 15 is turned on to inform the photographer that the focus lock holding mode is not set but the normal mode is set.

At step S445, the process of determining whether the light emission of the electronic flash device is necessary depending on the luminance of the object is carried out.

At step S447, whether the swtich SW2 operatively associated with the full depression operation of the release button is closed is judged. If the judgment is negative, advance is made to step S448, and if the judgment is affirmative, the LED 15 is turned off and advance is made to step S456.

At step S448, whether the switch SW1 operatively associated with the half depression operation of the release button is again closed is judged.

At step S449, whether the LED 18 is turned on and off is judged. If the judgment is negative, advance is made to step S219, and if the judgment is affirmative, advance is made to step S450.

At step S456, whether the mode is the focus lock mode is judged. If the judgment is negative, advance is made to step S480, and if the judgment is affirmative, advance is made to step S455.

At the step S480, whether the mode is the self mode is judged. If the judgment is affirmative, advance is made to step S481, and if the judgment is negative, advance is made to step S457.

At the step S481, the time courting of the self-timer is started and the operation display is effected by the LED 16.

At step S482, whether the time counting of the self-timer has been completed is judged, and the step S482 is repeated until this time counting is completed.

At step S458, whether the mode is the focus lock holding mode is again judged. If the judgment is affirmative, advance is made to step S459, and if the judgment is negative, return is made to step S211.

At the step S459, the focus lock holding mode is released and the normal photographic mode is set and also, this effect is displayed by the liquid crystal device 25. Thereafter, the process returns to step S211.

If at step S16, an affirmative answer is given, that is, it is judged that the mode is the focus lock holding mode, at step S455, distance measurement is effected again and the distance information D2 is read and stored.

At step S470, by the closing of the switch SW1, the stored value of the distance information D1 at step S444 is compared with the stored value of the distance information D2 at step S455 during the focus lock holding mode after the closing of the switch SW2. That is, whether the difference |D1−D2| between the stored value of the distance information at the step S444 and the stored value of the distance information at the step S455 is greater than a predetermined value d is judged. If the judgment is negative, advance is made to step S480, and if the judgment is affirmative, advance is made to step S471.

At the step S471, the LED 18 is turned on and off to thereby warn that the distance information in the focus lock holding state and the distance information during photographing differ greatly from a predetermined value, and advance is made to step S472.

At the step S472, it is warned that the difference between the distance information in the first focus lock holding mode, i.e., the focus lock holding state, and the distance information during photographing is great and also, whether the mode is the mode in which release lock is exerted is judged. If the judgment is affirmative, return is made to step S447, and if the judgment is negative, advance is made to step S480.

If a negative answer is obtained at step S213, whether the switch SW4 operatively associated with the self-timer operation of the operating member has been closed is judged at step S460.

At step S461, the self mode is set and also this effect is displayed by the liquid crystal device 25.

At step S232, whether the focus lock holding signal has been output by the operation of the operating member is judged.

At step S462, whether the LED 18 is turned on and off is judged.

At step S463, the LED 18 which has so far continued to be turned on and off is turned off.

At steps S464 and S464a, whether the photographing mode at the current point of time is one of the first and second focus lock holding modes and the normal mode is judged. If the current mode is the first focus lock holding mode, advance is made to step S468; if the current mode is the second focus lock holding mode, advance is made to step S467; and if the current mode is the normal mode, advance is made to step S465.

At step S468, the second focus lock holding mode is set and also, this effect is displayed by the liquid crystal device 25. Thereafter, the process advances to step s466.

At the step S465, the first focus lock holding mode is set and also, this effect is displayed by the liquid crystal device 25.

At the step S466, the time counting of the timer in the focus lock holding mode is started.

On the other hand, at the step S467, the normal photographing mode is set and also, this effect is displayed by the liquid crystal device 25.

At step S469, whether an operation is exerted by the operating member is judged. If the judgment is affirmative, the step S469 is repetitively executed, and if the judgment is negative, return is made to step S211.

The loop of the focus lock holding state will now be described.

Neither of the operation of the release button and the self-timer operation of the operating member is performed after the start of the program, and at step S232, whether the switch SW3 has been closed by the operation of the operating member and the focus lock holding signal has been generated is judged. If an affirmative answer is obtained here, the process passes through step S462 or steps S462 and S463 and proceeds to steps S464 and S464a. Here, whether the photographing mode at the current point of time is one of the first and second focus lock holding modes and the normal mode is judged. In this case, the photographing mode is the normal mode and therefore, advance is made to step S465, where the first focus lock holding mode is set.

Also, when the switch SW3 is again closed in the state in which the first focus lock holding mode has been set, the second focus lock holding mode is set at step S468.

Further, when the switch SW3 is again closed in the state in which the second focus lock holding mode is set, the normal mode is set at step S467.

Steps S211 to S213, S442 and S443 are passed through and at step S444, the distance information D1 is read and stored.

Now, a description will be given of a case where at step S446, it is judged that the mode is the focus lock holding mode and further at step S470, the stored value of the distance information in the focus lock holding state and the object distance information during photographing differ greatly from a predetermined value.

If at step S446, it is judged that the mode is the focus lock holding mode and in the state in which the LED 15 is turned on and off, at step S447, the closing of the switch SW2 is recognized, at step S455, distance measurement is again effected and the distance information is read and stored. Thereafter, advance is made to step S470, where the stored value of the distance information D1 during the closing of the switch SW1 is compared with the stored value of the distance information D2 during the closing of the switch SW2 and immediately before the generation of the photo-taking lens driving start signal, and if the difference between the two is greater than a predetermined value, advance is made to step S471, where the LED 18 is turned on and off to warn and display that the difference between the two is greater than the predetermined value. Further, thereafter, at step S472, whether the mode is the first focus lock holding mode is judged, and if the judgment is affirmative, return is made to step S447, and if the judgment is negative, advance is made to step S480.

It is for the following reason that the first and second focus lock holding modes can be arbitrarily selected as the focus lock holding mode in this manner.

In the first focus lock holding mode, if the difference between the distance information in the focus lock holding state and the distance information during photographing is greater than a predetermined value, the LED is turned on and off to thereby give a warning and also release lock is exerted to inhibit the photographing operation, but depending on the photographing conditions, there is a case where an object differing greatly from the distance information in the focus lock holding state is photographed.

For example, when objects exist at the left and right off the distance measuring area (so-called middle-blank state), even if such focus lock that is in focus to the objects is held, the information obtained by a second distance measurement is often not of these objects, but of the background. The fact that the information obtained by the second distance measurement is the distance information of the background leads to a result that the difference between the distance information in the focus lock holding state and the distance information during photographing is greater than a predetermined value and thus, the photographing operation is inhibited.

Accordingly, in spite of the fact that the distance information of the objects is held as the distance information in the focus lock holding state, the distance information of the background is obtained by the second distance measurement with a result that it is judged that wrong distance information is held.

In such a case, it is preferable to select the second focus lock holding mode in which only warning is effected and the photographing operation is permitted without release lock being exerted.

Also during self-timer photographing, if the difference between the distance information stored at step S455 and the distance information stored at step S444 is greater than a predetermined value, the LED 18 is turned on and off and release lock is exerted to thereby inhibit the photographing operation. When the distance information read at step S455 substantially coincides with the distance information stored at step S444, self-timer photographing, i.e., the time counting of the self-timer, is started.

Thus, when the mode is the focus lock holding mode, and further the focus lock holding mode and the self mode, whether the difference between the distance information stored at step S444 and the distance information stored at step S455 is greater than the predetermined value is judged, and if the difference between the two types of distance information is greater than the predetermined value, the LED is first turned on and off to thereby display an alarm. Further, if the mode is the first focus lock holding mode, release lock is exerted to inhibit the photographing operation, and if the mode is the second focus lock holding mode, the photographing operation is permitted.

Accordingly, the photographer and the person who has been requested to photograph can easily judge whether the photographing is one which meets the intention, and when the photographer requests a third person to photograph, it never happens that an undesired photograph, not in focus to the object, is taken.

Figure 37:
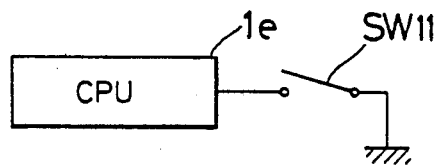
FIG. 37 is a block diagram showing portions of the construction of an eleventh embodiment of the present invention.

An eleventh embodiment described below is designed such that the number of frames to be photographed is set during the focus lock holding. A switch SW11 shown in FIG. 37 is a switch adapted to be closed in response to the operation of a frame number designating button for designating the number of frames to be photographed during the focus lock holding. When the focus lock holding mode is set by the depressing operation of the above-mentioned focus lock holding button and thereafter the frame number designating button is depressed with the focus lock holding button being not released but left depressed, the number of frames to be photographed during the focus lock holding is set in conformity with the frequency of the operation, i.e., the frequency of the closing of the switch SW11.

The operation of the eleventh embodiment will now be described with reference to the flow charts of FIGS. 38A and 38B, but this operation partly overlaps the operation of FIGS. 3A and 3B and those overlapping portions are omitted.

If at step S54, the closing of the focus lock holding switch SW3 is determined, advance is made to step S56, where whether the focus lock holding mode is set is judged. If the judgment is negative, at step S57a, the focus lock holding mode is set and advance is made to step S501.

At the step S501, the count value N of the number of frames to be photographed is set to zero, and at step S502, whether the switch SW11 is closed is judged. If the step S502 is affirmed, advance is made to step S503, where the count value N of the number of frames to be photographed is advanced by "+1", and advance is made to step S504. If the step S502 is negated, at step S505, whether N=0 is judged, and if the judgment is negative, advance is made to step S504, and if the judgment is affirmative, at step S506, N is rendered into N=1, and then advance is made to step S504.

At the step S504, the display to the effect that the focus lock holding mode has been set is effected by the liquid crystal display device 25 through the display circuit 13 and also, the count value N of the number of frames to be photographed is displayed. Then, advance is made to step S507, where whether the switch SW11 is still closed is judged. If the step S507 is affirmed, the process waits until the step S507 is negated, and if the step S507 is negated, at step S508, whether the switch SW3 is closed is judged. If the step S508 is affirmed, return is made to step S502, and if the step S508 is negated, return is made to step S51.

If step S56 is affirmed, at step S58a, the normal mode in which the focus lock holding is not effected is set and also, the display of the normal mode is effected by the liquid crystal display device 25 and advance is made to step S521. At the step S521, N is rendered into N=1, and then at step S522, whether the focus lock holding switch SW3 is closed is judged. If the step S522 is affirmed, the process waits until the step S522 is negated, and if the step S522 is negated, return is made to step S63.

At step S63, whether the full depression switch SW2 is closed is judged, and if the judgment is negative, advance is made to step S64.

If at step S63, the closing of the full depression switch SW2 is determined, photographing is effected at step S509. That is, the luminance information from the photometering circuit 2 is first read, whereafter the amount of lens movement is calculated on the basis of the stored distance information, and on the basis of the result of the calculation, the photo-taking lens is driven to the focusing position by the motor through the motor driving circuit 11. Then, the exposure value is calculated on the basis of the read luminance information, etc., and on the basis of the result of the calculation, the exposure devices such as the stop and the shutter are driven through the exposure control circuit 12 to thereby effect exposure. Thereafter, the film is wound up by one frame by the motor 10 through the motor driving circuit 11.

When these series of photographing processes are terminated, advance is made to step S510, where the count value N of the number of frames to be photographed is advanced by "−1". Then at step S511, whether N≦0 is judged, and if the judgment is negative, return is made to step S63, and if the judgment is affirmative, advance is made to step S78. At the step S78, the LED 15 is turned off, and then at step S72a, the normal mode is set and also, the display of the normal mode is effected by the liquid crystal display device 25 and return is made to step S51.

According to the above-described procedure, if the operation of the focus lock holding button is not released but the frame number setting button is operated after the focus lock holding mode has been set, the count value N of the number of frames to be photographed is increased by "1" during each operation, i.e., each time the switch SW11 is closed (steps S501–S508). If thereafter the operation of the focus lock holding button is released, the step S508 is negated, and the process returns to step S51. Even if the frame number setting button is never operated and the switch SW11 is not closed after the switch SW3 is closed at step S54, N=1 is set (steps S502, S505 and S506).

Also, when the switch SW2 is closed, advance is made from step S63 to step S509, where the photographing process is carried out, whereafter at step S510, the count value N of the number of frames to be photographed is advanced by "−1". At step S511, the process of steps S63 and S509–S511 is repeated until N≦0, that is, until the photographing of the number of frames to be photographed designated by the operation of the frame number designating button is terminated, whereafter at step S78, the LED 15 is turned off and also, at step S72a, the normal mode is set. That is, the focus lock holding mode is released.

A modification of the eleventh embodiment will now be shown. In this modification, it is possible to effect self-timer photographing a plurality of times on end, and the number of frames is designated by the operation of the above-described frame number designating button.

Figure 38A:
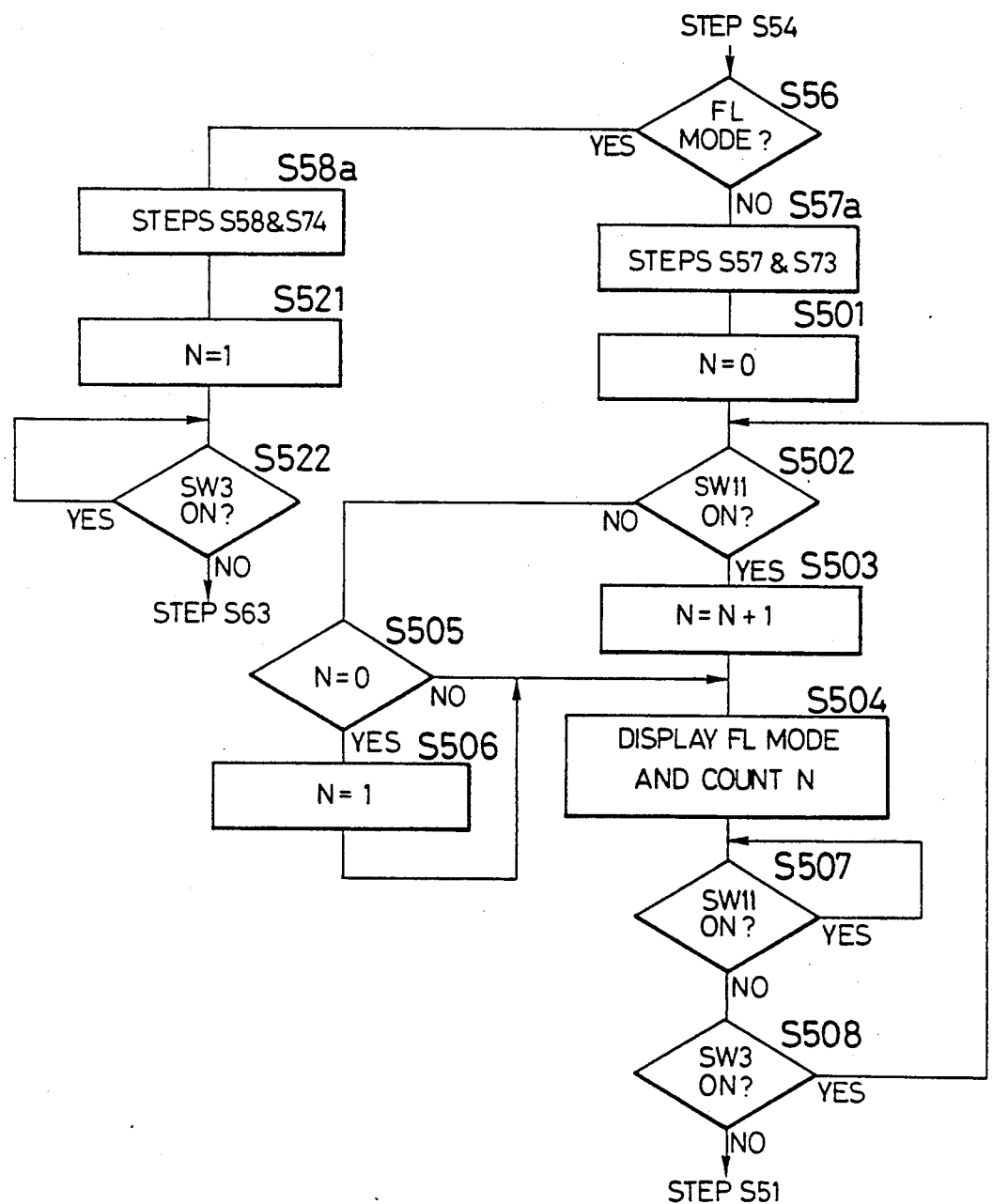
FIGS. 38A and 38B are flow charts showing the operation of the eleventh embodiment.
Figure 38B:
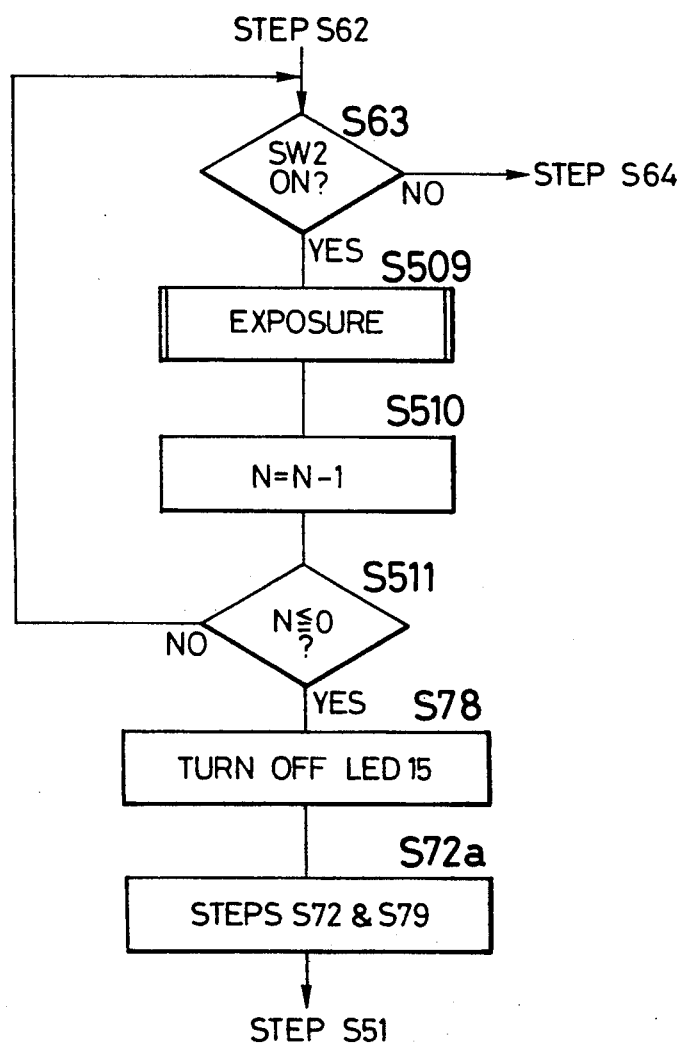
Figure 39A:
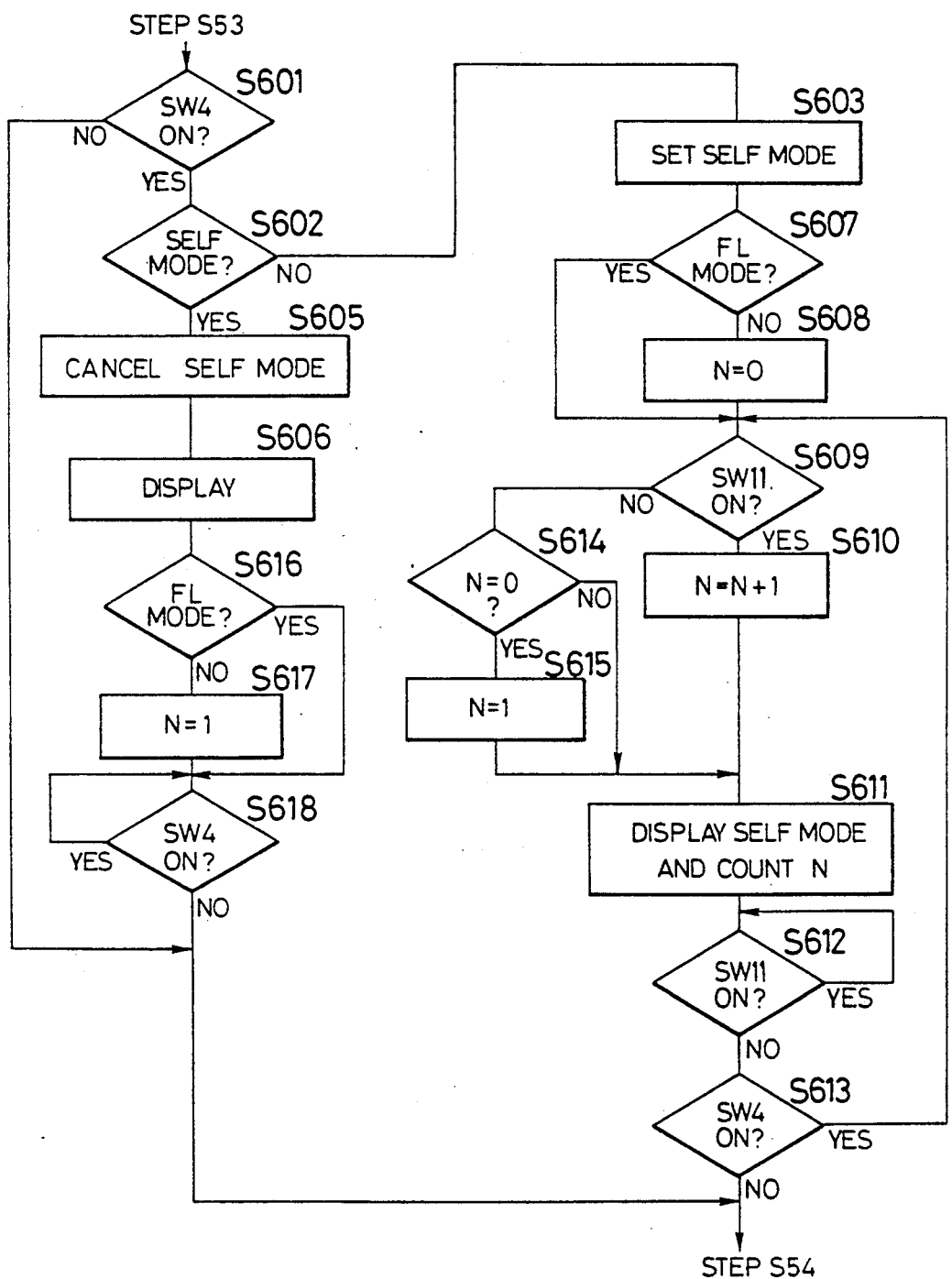
FIGS. 39A, 39B and 39C are flow charts showing the operation of a modification of the eleventh embodiment.
Figure 39B:
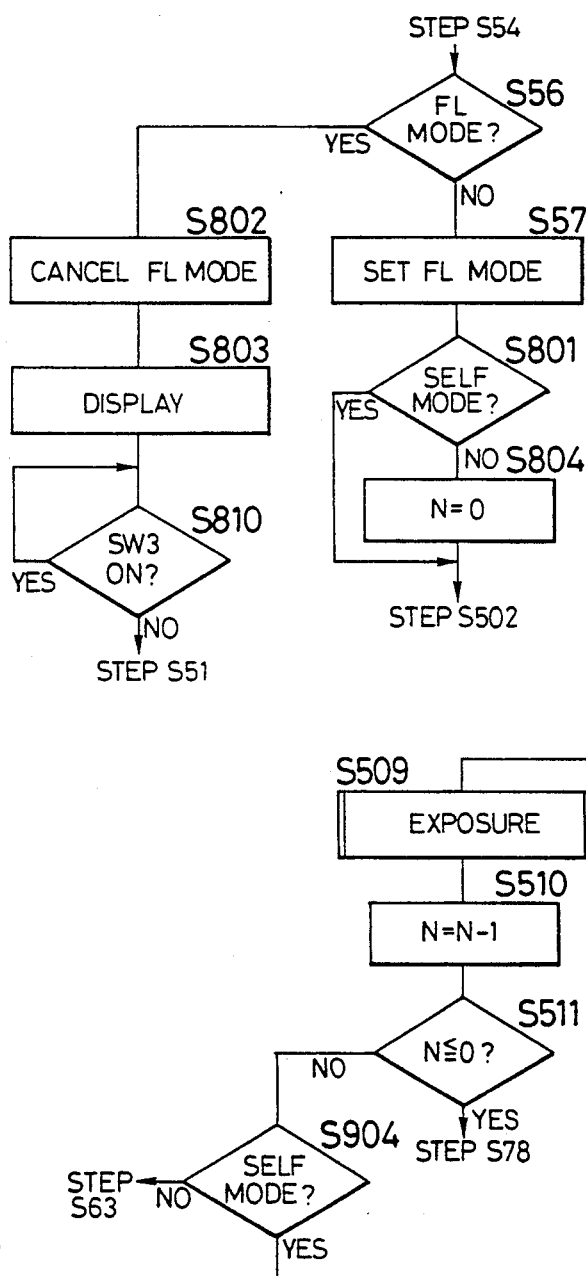
Figure 39C:
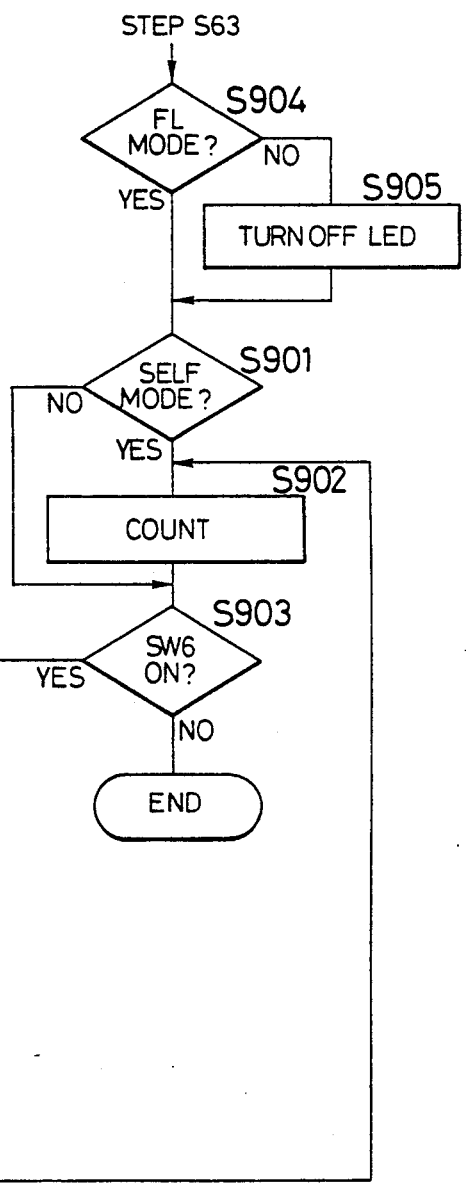

FIGS. 39A, 39B and 39C are flow charts showing the modification of the eleventh embodiment, and in these figures, steps similar to those of FIGS. 38A and 38B are given similar reference characters.

In FIG. 39A, if step S53 is negated after the process of the steps S51 and S52, advance is made to step S601, where whether the switch SW4 is closed is judged. If the step S601 is negated, advance is made to step S54, and if the step S601 is affirmed, at step S602, whether the self-timer mode is set is judged. If the step S602 is negated, at step S603, the self-timer mode is set and advance is made to step S607.

At the step S607, whether the focus lock holding mode is set is judged, and if the judgment is affirmative, advance is made to step S609, and if the judgment is negative, at step S608, the count value N of the number of frames to be photographed is rendered into zero and advance is made to step S609. At the step S609, whether the switch SW11 is closed is judged, and if the judgment is affirmative, at step S610, the count value N of the number of frames to be photographed is advanced by "+1" and advance is made to step S611. If the step S609 is negated, advance is made to step S614, where whether the count value N of the number of frames to be photographed is zero is judged. If the step S614 is negated, advance is made to step S611, and if the step S614 is affirmed, at step S615, the count value N is rendered into 1 and advance is made to step S611.

At the step S611, the display to the effect that the self-timer mode has been set is effected by the liquid crystal display device 25 through the display circuit 13 and also, the count value N of the number of frames to be photographed is displayed. Then at step S612, whether the switch SW11 is still closed is judged, and if the judgment is affirmative, the process waits until the step S612 is negated, and if the judgment is negative, advance is made to step S613. At the step S613, whether the switch SW4 is closed is judged, and if the judgment is affirmative, return is made to step S609, and if the judgment is negative, advance is made to step S54.

If step S602 is affirmed, at step S605, the self-timer mode is cancelled and also, at step S606, the display to that effect is effected and advance is made to step S616. At the step S616, whether the focus lock holding mode is set is judged, and if the judgment is affirmative advance is made to step S618, and if the judgment is negative, at step S617, the count value N is rendered into "1" and advance is made to step S618. That is, when neither of the self-timer mode and the focus lock holding mode is set, normal one-frame photographing is effected. At the step S618, whether the switch SW4 is still closed is judged. If the judgment is affirmative, the process waits until the step S618 is negated, and if the judgment is negative, advance is made to step S54.

Also, if the step S54 is affirmed, and then step S56 is negated, at step S57, the focus lock holding mode is set, whereafter at step S801, whether the self-timer mode is set is judged. If the step S801 is affirmed, advance is made to step S502. If the step S801 is negated, at step S804, N is rendered into N =0, and then advance is made to step S502. Further, if step S56 is affirmed, advance is made to step S802, where the focus lock holding mode is cancelled, and at step S803, the display to that effect is effected and advance is made to step S510.

Furthermore, if at step S63, the closing of the switch SW2 is determined, advance is made to step S904, where whether the focus lock holding mode is set is judged. If the step S904 is affirmed, advance is made to step S901, and if the step S904 is negated, at step S905, the LED 15 is turned off and advance is made to step S901. At the step S901, whether the self-timer mode is set is judged. If the step S901 is negated, advance is made to step S903, and if the step S901 is affirmed, at step S902, counting of a predetermined time is effected by the counter circuit 14 and advance is made to step S903. At the step S903, whether the power source switch SW6 is closed is judged, and if the judgment is affirmative, advance is made to step S509, and if the judgment is negative, the processing is terminated.

Also, if step S511 is negated, advance is made to step S904, where whether the self-timer mode is set is judged. If the step S904 is affirmed, return is made to step S902, and if the step S904 is negated, return is made to step S63.

According to the above-described procedure, if during the non-setting of the self-timer mode, the closing of the switch SW4 is determined at step S901, the self-timer mode is set at step S903, whereafter as long as the switch SW4 is closed, that is, as long as the self-timer mode setting button is depressed, the number of frames for self-timer photographing can be set by the switch SW11 as described above. When the switch SW2 is closed, at step S902, the counting of a predetermined time is effected, and after the completion of this time counting, photographing is effected, and this operation is repeated a number of times corresponding to the set number of frames to be photographed.

A twelfth embodiment of the present invention will now be described with reference to FIG. 40.

The camera in the present embodiment can accomplish double self-timer photographing by the operation of the switch SW4.

Figure 40:
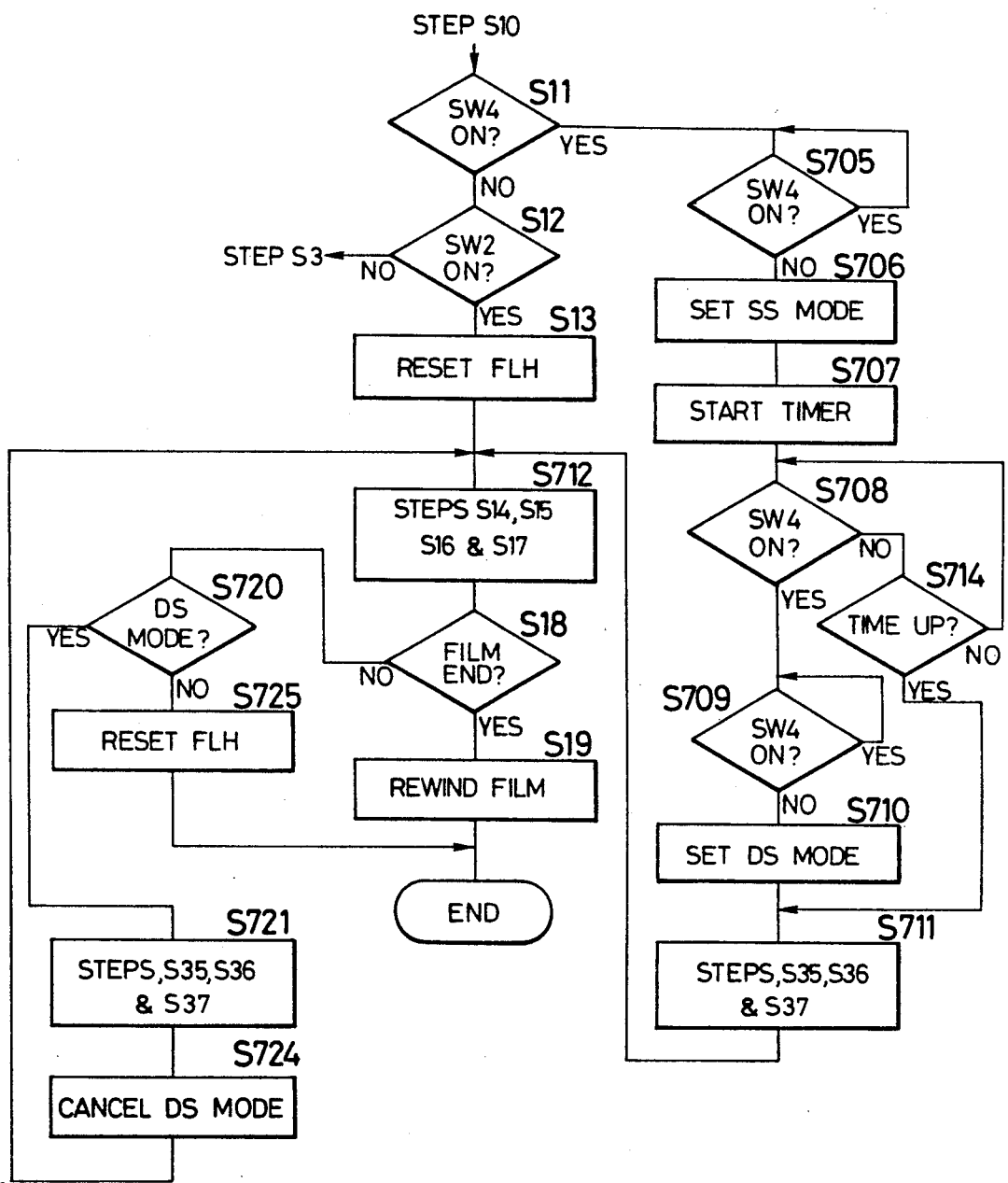
FIG. 40 is a flow chart showing the operation of a twelfth embodiment of the present invention.

In FIG. 40, steps similar to those of FIGS. 2A and 2B are given similar reference characters and some portions are omitted.

If at step S11, the closing of the switch SW4 is determined, at step S705, whether the switch SW4 is still closed is judged, and if the judgment is affirmative, the process waits until the step S705 is negated, and if the judgment is affirmative, advance is made to step S706. At the step S706, the single self-timer mode is set, and then at step S707, the timer for one second is started, and advance is made to step S708.

At the step S708, whether the switch SW4 is closed is judged, and if the judgment is negative, advance is made to step S714. At the step S714, whether the timer has counted one second is judged, and if the judgment is negative, return is made to step S708, and if the judgment is affirmative, advance is made to step S711. If the step S708 is affirmed, at step S709, whether the switch SW4 is still closed is judged, and if the judgment is affirmative, the process waits until the step S709 is negated, and if the judgment is negative, at step S710, the double self-timer mode is set and advance is made to step S711.

At the step S711, the counting of a predetermined time is effected by the counter circuit 14, and whether the LED 15 is turned on and off is judged, and the reading and storage of the distance information from the distance measuring circuit 3 is effected and advance is made to step S712.

At the step S712, the series of photographing processes of steps S14–S17 are terminated, whereupon at step S18, whether the terminal end of the film has been reached is judged, and if this judgment is negative, the winding-up of the film is completed whereafter at step S720, whether the double self-timer mode is set is judged. If the step S720 is negated, at step S725, the focus lock holding flag FLH is reset and also, the LED 15 is turned off to terminate the processing.

If the step S720 is affirmed, at step S721, a process similar to step S711 is carried out. At step S724, the double self-timer mode is cancelled and return is made to step S712.

We claim:

1. A camera including:
   driving means for driving a photo-taking lens;
   focus adjusting information producing means for producing focus adjusting information for driving the photo-taking lens;
   means for producing a photographing preparation signal;
   focus lock means responsive to said preparation signal for performing a focus lock operation according to said focus adjusting information;
   a focus lock hold operating member operable independently of said means for producing said photographing preparation signal;
   focus lock holding means responsive to a first operation of said focus lock hold operating member for holding said focus lock operation of said focus lock means irrespective of said preparation signal, said focus lock holding means stopping the holding of said focus lock operation of said focus lock means in response to a second operation of said focus lock hold operating member.

2. A camera according to claim 1, which further comprises display means for displaying that said focus lock holding means holds the focus lock operation of said focus lock means.

3. A camera according to claim 2, wherein said display means has a LED which is turned on and off when said focus lock holding means holds the focus lock operation of said focus lock means.

4. A camera according to claim 1, which further comprises barrier means for closing the front of said phototaking lens, and wherein said focus lock holding means stops holding the focus lock operation of said focus lock means in response to a closing operation of said barrier means.

5. A camera according to claim 1, which further comprises means for starting an exposure operation and resetting the operation of said focus lock means.

6. A camera according to claim 1, wherein said means for producing a photographing preparation signal comprises a shutter release actuating member.

7. A camera according to claim 6, wherein said shutter release actuating member has a first stage of operation at which said photographing preparation signal is produced and a second stage of operation which causes shutter release.

8. A camera including:
   driving means for driving a photo-taking lens;
   focus adjusting information producing means for producing focus adjusting information for driving the photo-taking lens;
   means for producing a photographing preparation signal;
   focus lock means responsive to said preparation signal for performing a focus lock operation according to said focus adjusting information;
   a focus lock hold operating member operable independently of said means for producing said photographing preparation signal, said focus lock hold operating member being capable of being in either a first operational state or a second operational state; and
   focus lock holding means responsive to said first operational state of said focus lock hold operating member for holding said focus lock operation of said focus lock means until said focus lock hold operating member is in said second operational state.

* * * * *